(12) United States Patent
Murphy et al.

(10) Patent No.: US 7,646,901 B2
(45) Date of Patent: Jan. 12, 2010

(54) SYSTEM AND METHOD FOR FACILITATING CARDIAC INTERVENTION

(75) Inventors: Gregory Murphy, Annandale, VA (US); Mitta Suresh, Richardson, TX (US); Albert Michael Davis, Richardson, TX (US)

(73) Assignee: Chase Medical, L.P., Richardson, TX (US)

( * ) Notice: Subject to any disclaimer, the term of this patent is extended or adjusted under 35 U.S.C. 154(b) by 1215 days.

(21) Appl. No.: 10/800,461

(22) Filed: Mar. 15, 2004

(65) Prior Publication Data

US 2004/0176679 A1   Sep. 9, 2004

Related U.S. Application Data

(63) Continuation of application No. 10/354,884, filed on Jan. 30, 2003, which is a continuation-in-part of application No. 10/135,465, filed on Apr. 30, 2002, now Pat. No. 7,327,862.

(60) Provisional application No. 60/288,173, filed on Apr. 30, 2001, provisional application No. 60/307,218, filed on Jul. 20, 2001, provisional application No. 60/318,024, filed on Sep. 7, 2001, provisional application No. 60/357,559, filed on Feb. 15, 2002.

(51) Int. Cl.
*G06K 9/00* (2006.01)
*G01N 3/00* (2006.01)
*G09B 23/28* (2006.01)

(52) U.S. Cl. ............................. 382/128; 378/1; 434/262

(58) Field of Classification Search ......... 434/262–272; 703/1–28; 382/128–132; 623/900–904; 378/1–210
See application file for complete search history.

(56) References Cited

U.S. PATENT DOCUMENTS 4,352,988 A   10/1982   Ishida (Continued)

FOREIGN PATENT DOCUMENTS

WO   01/16886   3/2001

OTHER PUBLICATIONS

International Preliminary Examination Report for PCT/US04/02604 mailed Dec. 21, 2004.

(Continued)

*Primary Examiner*—Daniel G Mariam
*Assistant Examiner*—Manav Seth
(74) *Attorney, Agent, or Firm*—Meyertons, Hood, Kivlin, Kowert & Goetzel, P.C.; Eric B. Meyertons

(57) ABSTRACT

One embodiment discloses a computerized method of facilitating cardiac intervention, comprising inputting patient data, creating a computerized interactive model of a heart based on the patient data, wherein the model comprises features, simulating at least one proposed cardiac intervention treatment by adding or deleting features to the model, and determining the effects of the proposed cardiac simulation upon the entire model. Simulations may be repeated to allow the user to determine an optimal cardiac intervention. Additionally, a template may be created from the model to use as a guide during the cardiac intervention.

102 Claims, 28 Drawing Sheets

U.S. PATENT DOCUMENTS

| | | | |
|---|---|---|---|
| 4,436,684 A | 3/1984 | White | |
| 4,777,962 A | 10/1988 | Watson et al. | |
| 5,072,384 A | 12/1991 | Doi et al. | |
| 5,151,856 A * | 9/1992 | Halmann et al. | 600/508 |
| 5,235,510 A | 8/1993 | Yamada et al. | |
| 5,239,591 A | 8/1993 | Ranganath | |
| 5,273,038 A | 12/1993 | Beavin | |
| 5,319,551 A | 6/1994 | Sekiguchi et al. | |
| 5,360,006 A | 11/1994 | Geiser et al. | |
| 5,375,156 A | 12/1994 | Kuo-Petravic et al. | |
| 5,415,048 A | 5/1995 | Diatschenko et al. | |
| 5,433,199 A | 7/1995 | Cline et al. | |
| 5,435,310 A | 7/1995 | Sheehan et al. | |
| 5,450,850 A | 9/1995 | Iinuma | |
| 5,509,084 A | 4/1996 | Tanaka | |
| 5,533,085 A | 7/1996 | Sheehan et al. | |
| 5,559,901 A | 9/1996 | Lobregt | |
| 5,570,430 A | 10/1996 | Sheehan et al. | |
| 5,601,084 A | 2/1997 | Sheehan et al. | |
| 5,612,885 A | 3/1997 | Love | |
| 5,633,951 A | 5/1997 | Moshfeghi | |
| 5,684,398 A | 11/1997 | Takiguchi et al. | |
| 5,687,737 A | 11/1997 | Branham et al. | |
| 5,704,791 A | 1/1998 | Gillio | |
| 5,713,937 A | 2/1998 | Nappholz et al. | |
| 5,734,739 A | 3/1998 | Sheehan et al. | |
| 5,741,215 A | 4/1998 | D'Urso | |
| 5,755,577 A | 5/1998 | Gillio | |
| 5,757,877 A | 5/1998 | Wilting | |
| 5,779,634 A | 7/1998 | Ema et al. | |
| 5,791,908 A | 8/1998 | Gillio | |
| 5,800,177 A | 9/1998 | Gillio | |
| 5,800,178 A | 9/1998 | Gillio | |
| 5,803,914 A | 9/1998 | Ryals et al. | |
| 5,807,256 A | 9/1998 | Taguchi et al. | |
| 5,817,022 A | 10/1998 | Vesely | |
| 5,839,440 A | 11/1998 | Liou et al. | |
| 5,889,524 A | 3/1999 | Sheehan et al. | |
| 5,892,515 A | 4/1999 | Kobayashi et al. | |
| 5,902,239 A | 5/1999 | Buurman | |
| 5,920,660 A | 7/1999 | Goto | |
| 5,923,770 A | 7/1999 | O'Donnell et al. | |
| 5,947,899 A | 9/1999 | Winslow et al. | |
| 5,954,648 A | 9/1999 | Van Der Brug | |
| 5,963,211 A | 10/1999 | Oikawa et al. | |
| 6,024,705 A | 2/2000 | Schlager et al. | |
| 6,045,512 A | 4/2000 | Roteliuk et al. | |
| 6,047,090 A | 4/2000 | Makram-Ebeid | |
| 6,074,419 A | 6/2000 | Healy et al. | |
| 6,106,466 A | 8/2000 | Sheehan et al. | |
| 6,145,048 A | 11/2000 | Klein | |
| 6,185,447 B1 | 2/2001 | Alley et al. | |
| 6,190,320 B1 | 2/2001 | Lelong | |
| 6,201,165 B1 | 3/2001 | Grant et al. | |
| 6,205,349 B1 | 3/2001 | Kim et al. | |
| 6,205,411 B1 | 3/2001 | DiGioia, III et al. | |
| 6,230,048 B1 | 5/2001 | Selvester et al. | |
| 6,241,699 B1 | 6/2001 | Suresh et al. | |
| 6,268,730 B1 | 7/2001 | Du | |
| 6,298,112 B1 | 10/2001 | Acharya et al. | |
| 6,315,735 B1 | 11/2001 | Joeken et al. | |
| 6,346,940 B1 | 2/2002 | Fukunaga | |
| 6,366,684 B1 | 4/2002 | Gerard et al. | |
| 6,373,920 B1 | 4/2002 | Hsieh | |
| 6,398,728 B1 | 6/2002 | Bardy | |
| 6,415,048 B1 | 7/2002 | Schneider | |
| 6,421,565 B1 | 7/2002 | Hemmingsson | |
| 6,438,403 B1 | 8/2002 | Cline et al. | |
| 6,442,417 B1 | 8/2002 | Shahidi et al. | |
| 6,445,183 B1 | 9/2002 | Shimizu et al. | |
| 6,447,453 B1 | 9/2002 | Roundhill et al. | |
| 6,447,454 B1 | 9/2002 | Chenal et al. | |
| 6,454,712 B1 | 9/2002 | Oonuki | |
| 6,454,776 B1 | 9/2002 | Tajima et al. | |
| 6,463,351 B1 | 10/2002 | Clynch | |
| 6,468,218 B1 | 10/2002 | Chen et al. | |
| 6,470,070 B2 | 10/2002 | Menhardt | |
| 6,473,488 B2 | 10/2002 | Menhardt | |
| 6,473,634 B1 | 10/2002 | Barni | |
| 6,482,146 B1 | 11/2002 | Alferness et al. | |
| 6,487,432 B2 | 11/2002 | Slack | |
| 6,491,511 B1 | 12/2002 | Duran et al. | |
| 6,493,571 B1 | 12/2002 | Bis et al. | |
| 6,496,560 B1 | 12/2002 | Lin et al. | |
| 6,510,337 B1 | 1/2003 | Heuscher et al. | |
| 6,522,324 B1 | 2/2003 | Bosma et al. | |
| 6,526,307 B2 | 2/2003 | Foo | |
| 6,535,623 B1 | 3/2003 | Tannenbaum et al. | |
| 6,545,678 B1 | 4/2003 | Ohazama | |
| 6,557,558 B1 | 5/2003 | Tajima et al. | |
| 6,559,641 B2 | 5/2003 | Thesen | |
| 6,573,717 B2 | 6/2003 | Thesen | |
| 6,574,304 B1 | 6/2003 | Hsieh et al. | |
| 6,587,541 B2 | 7/2003 | Menhardt | |
| 6,608,916 B1 | 8/2003 | Wei et al. | |
| 6,608,917 B1 | 8/2003 | Wei et al. | |
| 6,628,743 B1 | 9/2003 | Drummond et al. | |
| 6,801,643 B2 | 10/2004 | Pieper | |
| 6,840,246 B2 | 1/2005 | Downing | |
| 6,932,842 B1 | 8/2005 | Litschko et al. | |
| 7,136,540 B2 | 11/2006 | Kiyuna | |
| 7,225,011 B2 | 5/2007 | Mielekamp | |
| 7,327,862 B2 | 2/2008 | Murphy et al. | |
| 7,333,643 B2 | 2/2008 | Murphy et al. | |
| 7,371,067 B2 | 5/2008 | Anderson et al. | |
| 2001/0012913 A1 | 8/2001 | Iliff | |
| 2001/0029333 A1 | 10/2001 | Shahidi | |
| 2001/0031919 A1 | 10/2001 | Strommer et al. | |
| 2001/0036245 A1 | 11/2001 | Kienzle, III et al. | |
| 2002/0007294 A1 | 1/2002 | Bradbury et al. | |
| 2002/0016541 A1 | 2/2002 | Glossop | |
| 2002/0031204 A1 | 3/2002 | Vilsmeier | |
| 2002/0032377 A1 | 3/2002 | Thesen | |
| 2002/0035321 A1 | 3/2002 | Bucholz et al. | |
| 2002/0042566 A1 | 4/2002 | Matsuzaki et al. | |
| 2002/0070970 A1 | 6/2002 | Wood et al. | |
| 2002/0077540 A1 | 6/2002 | Kienzle, III | |
| 2002/0077541 A1 | 6/2002 | Kienzle, III | |
| 2002/0082498 A1 | 6/2002 | Wendt et al. | |
| 2002/0087075 A1 | 7/2002 | Bucholz | |
| 2002/0095313 A1 | 7/2002 | Haq | |
| 2002/0127523 A1 | 9/2002 | Edic et al. | |
| 2002/0167533 A1 | 11/2002 | Tirumalai et al. | |
| 2003/0000535 A1 | 1/2003 | Galloway, Jr. et al. | |
| 2003/0018251 A1 | 1/2003 | Solomon | |
| 2003/0038802 A1 | 2/2003 | Johnson et al. | |
| 2003/0069494 A1 | 4/2003 | Jolly | |
| 2003/0078494 A1 | 4/2003 | Panescu et al. | |
| 2003/0095697 A1 | 5/2003 | Wood et al. | |
| 2003/0114750 A1 | 6/2003 | Brock-Fisher et al. | |
| 2003/0187362 A1 | 10/2003 | Murphy et al. | |
| 2004/0006266 A1 | 1/2004 | Ustuner et al. | |
| 2004/0015081 A1 | 1/2004 | Kramer et al. | |
| 2004/0049115 A1 | 3/2004 | Murphy et al. | |
| 2004/0049116 A1 | 3/2004 | Murphy et al. | |
| 2004/0132006 A1 | 7/2004 | O'Donnell et al. | |
| 2004/0153128 A1 | 8/2004 | Suresh et al. | |
| 2004/0176678 A1 | 9/2004 | Murphy et al. | |
| 2004/0193042 A1 | 9/2004 | Scampini et al. | |
| 2005/0020929 A1 | 1/2005 | Murphy et al. | |
| 2005/0043609 A1 | 2/2005 | Murphy et al. | |
| 2005/0187461 A1 | 8/2005 | Murphy et al. | |
| 2005/0203580 A1 | 9/2005 | Prentice et al. | |
| 2005/0254700 A1 | 11/2005 | Nagata et al. | |

| | | | |
|---|---|---|---|
| 2006/0023924 A1 | 2/2006 | Asbeck et al. | |
| 2006/0062447 A1 | 3/2006 | Rinck et al. | |
| 2007/0014452 A1 | 1/2007 | Suresh et al. | |
| 2008/0317310 A1 | 12/2008 | Suresh et al. | |

OTHER PUBLICATIONS

International Search Report and Written Opinion for PCT/US04/02669 mailed Feb. 3, 2005.

Written Opinion for PCT/US04/02669 mailed Feb. 3, 2005.

Patel, N. C. et al., "Neurological Outcomes in Coronary Surgery: Independent Effect of Avoiding Cardiopulmonary Bypass" Ann. Thorac. Surg. 2002;74:400-6, Presented at the 38th Annual Meeting of the Society of Thoracic Surgeo Fort Lauderdale, FL, Jan. 28-30, 2002.

Imamaki, M. et. al., "Prediction of improvement in regional left ventricular function after coronary artery bypass grafting" J. Cardiovascular Surg. Oct. 2002; vol. 43, No. 5: pp. 603-607.

Cootes, T. F. et al., "Constrained Active Appearance Models" (http://citeseer.nj.nec.com/cache/papers/cs/22292/http:zSzzSzwww.wiau.man.ac.ukzSz~bimzSzPaperszSziccv2001.pdcootes01constrained.pdf) Proc. Int. Conf. on Computer Vision Jul. 9-12, 2001, vol. I, pp. 748-754, 2001.

nerac.com "tech track: cardiac MRI", Question No. 1193837.005, Apr. 11, 2003.

nerac.com "tech track: Florence H Sheehan", Question No. 1199989.005, Feb. 28, 2003.

nerac.com "tech track: cardiac MRI", Question No. 1193837.005, Apr. 12, 2003.

F. P. van Rugge et. al., "Magnetic Resonance Imaging during dobutamine Stress for detection and localization of coronary artery disease" Circulation 1994; 90, No. 1, pp. 127-138.

Antman, Elliott M. et al., "Abciximab Facilitates the Rate and Extent of Thrombolysis—Results of the Thrombolysis in Myocardial Infarction (TIMI) 14 Trial", Circulation, Jun. 1, 1999, pp. 2720-2732.

Keegan, Jennifer et al., "Interleaved Spiral Cine Coronary Artery Velocity Mapping", Magnetic Resonance in Medicine, vol. 43, 2000, pp. 787-792.

Medina, R. et al., "Reconstruction of Three-Dimensional Shapes in Biplane Angiography: a Fuzzy and Evolutionary Approach", Computers in Cardiology, Hannover, Germany, Sep. 1999, 26, pp. 663-666.

Miles, K.A., "Measurement of tissue perfusion by dynamic computed tomography", The British Journal of Radiology, 1991, vol. 64, No. 761, pp. 409-412.

Mochizuki, Teruhito et al., "Demonstration of Acute Myocardial Infarction by Subsecond Spiral Computed Tomography-Early Defect and Delayed Enhancement", Circulation, 1999, 99, pp. 2058-2059.

Rumberger, John A. et al., "Use of Ultrafast Computed Tomography to Quantitate Regional Myocardial Perfusion: A Preliminary Report", Journal of the American College of Cardiology, vol. 9, No. 1, Jan. 1987, pp. 59-69.

J.M. Guccione et al., "Passive Material Properties of Intact Ventricular Myocardium Determined from a Cylindrical Model" Journal of Biomechanical Engineering, vol. 113, Feb. 1991.

K.D. Costa et al., "A Three-Dimensional Finite Element Method for Large Elastic Deformations of Ventricular Myocardium: I-Cylindrical and Spherical Polar Coordinates" Journal of Biomechanical Engineering, Nov. 1996, vol. 118, pp. 452-463.

P.J. Hunter et al., "Modeling the mechanical properties of cardiac muscle" Progress in Biophysics & Molecular Biology, 69 (1998) pp. 289-331.

R. Mazhari et al., "Integrative Models for Understanding the Structural Basis of Regional Mechanical Dysfunction in Ischemic Myocardium" Annals of Biomedical Engineering, 2000, vol. 28, pp. 979-990.

Hurst et al., "Hurst's The Heart, Arteries and Veins, 9th Edition" McGraw-Hill, 1998, Chapters 18-20, pp. 623-684.

Y. Sun et al., "A comprehensive model for right-left heart interaction under the influence of pericardium and baroreflex" The American Journal of Physiology, 1997, pp. H1499-H1515.

Makhijani, V. B. et al., "Three-dimensional coupled fluid—Structure simulation of pericardial bioprosthetic aortic valve function" ASAIO Journal, 1997, 43:M387-M392.

Olszewski, M. E., "Segmentation of Cardiac Magnetic Resonance Images Using Multidimensional Active Appearance Models", Department of Electrical and Computer Engineering, The University of Iowa, Apr. 2001.

Di Donato, M. et al. "Regional Myocardial performance of non-ischaemic zones remote from anterior wall left ventricular aneurysm—Effects of aneurysmectomy", European Heart Journal, (1995) 16, 1285-1292.

F.H. Sheehan et. al., "Advantages and applications of the centerline method for characterizing regional ventricular function" Circulation 1986; 74, No. 2, pp. 293-305.

T.F. Cootes and C. J. Taylor, "Statistical Models of Appearance for Computer Vision" Jul. 10, 2000 http://cvl.umiacs.umd.edu/users/nanda/Academics/Academic.html.

E. R. Holman et. al., "Detection and Quantification of Dysfunctional Myocardium by Magnetic Resonance Imaging" Circulation 1997; vol. 95, No. 4; pp. 924-931.

van der Geest, Rob J. et al., "Comparison Between Manual and Semiautomated Analysis of Left Ventricular Volume Parameters from Short-Axis MR Images", Journal of Computer Assisted Tomography, vol. 21, No. 5, 1997, pp. 756-765.

Weiss, Robert M. et al., "Evaluation of Cardiovascular Structure and Function with Electron-Beam Computed Tomography", Marcus Cardiac Imaging, 1996, vol. 2, Chapt. 53: 820-828.

Dai, Xiaolong et al., "Left-Ventricle Boundary Detection from Nuclear Medicine Images", (http://www4.ncsu.edu/eos/users/w/wes/homepage/daiHTML/cmrg__JDI.fm3.html#FN1) Journal of Digital Imaging, vol. 11, No. 1, Feb. 1998.

nerac.com "RetroSearch: Active Appearance Models", Question No. 1199989.009, Sept. 15, 2003.

U.S. Appl. No. 10/135,465, filed Apr. 30, 2002, Murphy et al.

U.S. Appl. No. 10/800,433, filed Mar. 15, 2004, Murphy et al.

U.S. Appl. No. 10/768,403, filed Jan. 30, 2004, Murphy et al.

U.S. Appl. No. 10/769,745, filed Jan. 30, 2004, Suresh et al.

U.S. Patent Application entitled A System and Method for Facilitating Cardiac Intervention, Jan. 30, 2004, Murphy et al.

International Search Report and Written Opinion for PCT/US04/02604 mailed Oct. 6, 2004.

Kim, R. J. et al. "The Use of Contrast-Enhanced Magnetic Resonance Imaging to Identify Reversible Myocardial Dysfunction" The New England Journal of Medicine, vol. 343, No. 20, Nov. 16, (2000), 1445-1452.

McEachen II, J. C. et al. "Shape-Based Tracking of Left Ventricular Wall Motion" IEEE Transactions on Medical Imaging, vol. 16, No. 3, Jun. (1997), 270-283.

Chalana, V. et al. "A Multiple Active Contour Model for Cardiac Boundary Detection on Echocardiographic Sequences" IEEE Transactions on Medical Imaging, vol. 15, No. 3, Jun. (1996), 290-298.

Setarehdan, S. K. et al. "Automatic Left Ventricular Feature Extraction and Visualisation from Echocardiographic Images" Computers in Cardiology (1996), 9-12.

Jacob, G. et al. "Robust Contour Tracking in Echocardiographic Sequences" 6th International Conference on Computer Vision. ICCV '98 Bombay, Jan. 4-7, 1998 IEEE International Conference on Computer Vision, New York, NY: IEEE, US, Jan. 4, (1998), pp. 408-413.

Gerber, B. L. et al. "Accuracy of Contrast-Enhanced Magnetic Resonance Imaging in Predicting Improvement of Regional Myocardial Function in Patients After Acute Myocardial Infarction" Circulation, vol. 106, No. 9, Aug. 27, (2002), 1083-1089.

Prokop, M. et al. "Use of Maximum Intensity Projections in CT Angiography: A Basic Review" Scientific Exhibit, vol. 17, No. 2, Mar.-Apr. (1997), 433-451.

Office Action for U.S. Appl. No. 10/135,465 mailed on Jul. 17, 2006, available in PAIR.

Office Action for U.S. Appl. No. 10/135,465 mailed on Feb. 21, 2007, available in PAIR.

Notice of Allowance for U.S. Appl. No. 10/135,465 mailed on Sep. 13, 2007, available in PAIR.

Office Action for U.S. Appl. No. 10/354,884 mailed on Nov. 1, 2006, available in PAIR.

Office Action for U.S. Appl. No. 10/354,884 mailed on Jul. 19, 2007, available in PAIR.

Office Action for U.S. Appl. No. 10/640,370 mailed on Mar. 5, 2008, available in PAIR.

Office Action for U.S. Appl. No. 10/713,911 mailed on Aug. 23, 2007, available in PAIR.

Office Action for U.S. Appl. No. 10/768,403 mailed on Mar. 6, 2007, available in PAIR.

Notice of Allowance for U.S. Appl. No. 10/768,408 mailed on Sep. 21, 2007, available in PAIR.

Office Action for U.S. Appl. No. 10/769,745 mailed on Sep. 5, 2007, available in PAIR.

Supplemental Search Report for PCT/US04/02604 mailed Sep. 6, 2006.

International Search Report and Written Opinion for PCT/US07/61239 mailed Nov. 19, 2007.

* cited by examiner

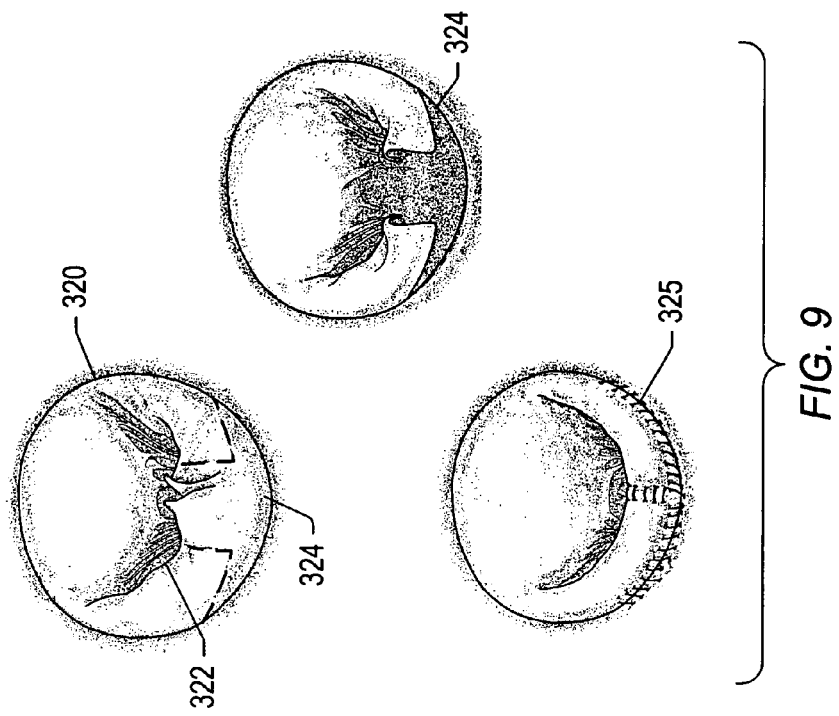
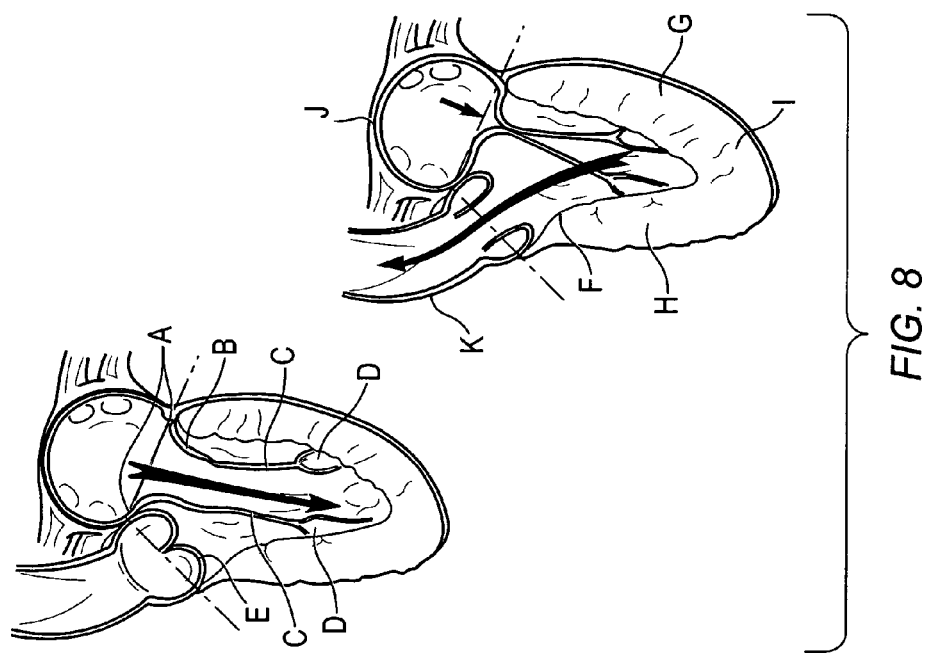
FIG. 9
FIG. 8

WALL THICKNESS SYSTOLE
$d_s = CL_{SO} - CL_{SI}$

WALL THICKNESS DIASTOLE
$d_d = CL_{DO} - CL_{DI}$ $X_A$ & $Y_A$ ARE POINTS ON BORDER ZONE IN THIS PLANE

SYSTEM AND METHOD FOR FACILITATING CARDIAC INTERVENTION

PRIORITY CLAIM

This application is a continuation of U.S. patent application Ser. No. 10/354,884 entitled "A System and Method for Facilitating Cardiac Intervention" filed on Jan. 30, 2003, which is a continuation-in-part of U.S. patent application Ser. No. 10/135,465 entitled "A System and Method for Facilitating Cardiac Intervention" filed on Apr. 30, 2002, now U.S. Pat. No. 7,327,862 which claims priority to Provisional Patent Application No. 60/288,173 entitled "Method of Analyzing Factors for Preoperative Left Ventricular Segment Reconstruction" filed on Apr. 30, 2001; which further claims priority to Provisional Patent Application No. 60/307,218 entitled "Method of Analyzing Factors for Preoperative Left Ventricular Segment Reconstruction" filed on Jul. 20, 2001; which further claims priority to Provisional Patent Application No. 60/318,024 entitled "Method of Analyzing Factors for Valve Surgery" filed on Sep. 7, 2001; which further claims priority to Provisional Patent Application No. 60/357,559 entitled "Method of Analyzing Factors for Treatment of Cardiac Disease" filed on Feb. 15, 2002.

RELATED PATENTS

This patent application incorporates by reference in its entirety U.S. patent application Ser. No. 10/135,465 entitled "A System and Method for Facilitating Cardiac Intervention," filed on Apr. 30, 2002.

BACKGROUND OF THE INVENTION

1. Field of the Invention

This invention relates generally to systems for identifying the features that contribute to the cardiac performance of an individual patient through the use of imaging methods, and in particular to a computerized system and method for facilitating and assessing cardiac intervention methods.

2. Description of the Related Art

The circulatory system of a human works as a closed system where the effects of one part of the system are felt by all other parts of the system. For example, if a person's blood pressure rises then there is a corresponding pressure decrease in the venous system, the decrease is much smaller than the increase in the arterial side because of the fact that venous vasculature is more compliant than the arterial vasculature. Within the circulatory system the key component is the heart. Any change to any component of the heart will have an effect felt throughout the entire system.

The primary function of a heart in an animal is to deliver life-supporting oxygenated blood to tissue throughout the body. This function is accomplished in four stages, each relating to a particular chamber of the heart. Initially, deoxygenated blood is received in the right auricle of the heart. This deoxygenated blood is pumped by the right ventricle of the heart to the lungs where the blood is oxygenated. The oxygenated blood is initially received in the left auricle of the heart and ultimately pumped by the left ventricle of the heart throughout the body. The left ventricular chamber of the heart is of particular importance in this process as it is responsible for pumping the oxygenated blood through the aortic valve and ultimately throughout the entire vascular system.

A myocardial infarction (i.e., a heart attack) may not affect two different people in the same manner. The extent of the damage due to an infarction is based on many factors, such as; location of the infarction, extent of collateral flow in the blockage area, health of the heart prior to infarction, etc. A person's unique damage will have a corresponding unique effect on his/her entire cardiac system. For example, the infarction damage in one patient may be isolated to a small section of the ventricle wall. In another person, the infarction may involve not only the ventricle wall but also the septum. In still another person, the infarction might involve the papillary muscles. Over time, these unique damages will cause the heart to respond in different ways in an attempt to keep the circulatory system operating optimally.

Various treatments are currently employed to repair, replace or mitigate the effects of damaged components of the heart. Some of these treatments involve grafting new arteries onto blocked arteries, repairing or replacing valves, reconstructing a dilated left ventricle, administering medication, or implanting mechanical devices. All these treatments apply standard repairs to unique problems with a minimum of analysis as to what the optimum intervention should involve. Typically, the current procedures do not involve analyzing the performance of the cardiac system after the treatment to see what effect the treatment has had on the entire system. For example, a patient with blocked arteries may undergo a standard treatment of placing 5-6 grafts on their heart due solely to a short visual inspection of angiographic films that show some stenosis of the arteries of the heart. No analysis is performed to see if placing 3-4 grafts will achieve the same perfusion of the myocardium as the 5-6 grafts. It is simply a situation where the physician decides that more is better, which may not be true. Placing 5-6 grafts requires more surgical time, longer pump runs, and incisions into numerous areas of the body to recover the needed grafts. This increases morbidity to the patient and may contribute to death of the patient who may not tolerate the additional stress of a longer, more invasive procedure. On some patients, the extra grafts may be needed, since collateral flow, or flow from other arteries, is not sufficient to perfuse the entire myocardium. On other patients, the grafts may not be needed, since sufficient flows will be generated from fewer grafts. Currently, the physician has no way of knowing if the total number of grafts that he put in was appropriate.

A similar procedure is used to place stents in a vessel. Stents are placed in vessels based on an assessment of blockage and ability to access the obstructed area. No method of analysis is performed to determine the effects of placing a stent, to analyze how many stents should be placed, and/or to determine if the placement of stents produces a better result than bypassing.

The current process for repairing and replacing valves relies heavily on the physician's knowledge and intuition. There is no precise way to determine how much a valve or structural component needs to change or what the effect of that change will be. The current procedure for determining if the correct repair was made is to complete the repair, remove the patient from cardiopulmonary bypass, and let the heart start beating. When the heart's performance reaches a normal range, an echocardiography is taken of the valve to ensure that it is not regurgitant. If the repair left some regurgitation, then the patient must go back on cardiopulmonary bypass, the heart must be stopped again, reopened, and additional repair work must be performed. This checking procedure is repeated after the second repair to ensure that the procedure has been correctly done. This procedure subjects the patient to unnecessary risks by exposing them to longer than necessary bypass runs and reperfusion injuries each time the heart is weaned of cardioplegia. This procedure also takes up valuable operating room and staff time. This multiple repair scenario for valve procedures is typical for most patients. Additionally, this assessment method only assesses one factor related to the performance of the valve and ventricle regurgitation. A physician may perform a procedure, which corrects the existing problem, but the procedure may create another problem or diminish the performance of the ventricle. The physician has little, if any, way to know if he compromised ventricle performance, since current analytical tools only look for flow across the valve. It would be desirable to have available methods to identify and evaluate the positioning of the valve apparatus, the attached tissue, and their combined performance.

Similarly, it would be desirable to have improved methods to determine when to replace or repair a valve. Typically, this is left to the judgment of the physician based on a review of two-dimensional echocardiography studies. Physicians who are unfamiliar with repair techniques may opt for replacement when repair is not only possible but also the best course of action for the patient. Typically, a valve replacement will be done without knowing what effect it will have on the other elements of the mitral valve apparatus, left ventricle, left atrium and the overall functioning of the heart. For example, a replacement that attaches the chordae tendinae to the new valve may have a much different effect on the ventricle than a replacement that excludes the chordae tendinae. It would be useful to have a method to assist the physician in making this assessment. Repairs are typically undertaken to shorten the chordae and annulus without knowing what effect the repairs will have on the entire apparatus. The current solution is to make the repair and let the heart beat to see what the repair has done.

What is needed, therefore, is a reliable method and apparatus to allow a physician to determine which elements of the heart are not contributing to, or are decrementing from, the performance of the heart. It is also desirable to have a method and apparatus to allow the physician to simulate the treatment on a portion of those elements and see the effect the treatment has on the other elements and the heart as a whole prior to performing the surgery.

SUMMARY

In one embodiment, a computerized system and method of facilitating cardiac intervention is disclosed. A computerized method includes inputting patient data and creating a computerized interactive model of a diseased heart based on the patient data. The computerized interactive model may include at least one feature that simulates at least one proposed cardiac intervention treatment. A proposed cardiac intervention may be simulated by adding, deleting, and/or modifying at least one feature of the model. A simulation may include determining the effects of the proposed cardiac intervention upon the entire model. A simulation may be repeated to allow the user to determine an optimal cardiac intervention. Specific surgical procedures may be modeled using the methods outlined herein. Additionally, a template may be created from the model to use as a guide during the surgical procedure. Cardiac instruments may be designed from the model and/or images created. Cardiac instruments may include patient specific templates and/or patient specific instruments for use before, during, and/or after a cardiac intervention.

Some embodiments are directed to the preoperative analysis of a patient's heart condition and computer assisted manipulation of the patient's heart to simulate procedures. Procedures that may be simulated include, but are not limited to, coronary artery bypass grafting, stent placement, surgical ventricular repair, valve repair and replacement, and implantation of devices.

An embodiment of a method of diagnosing disease of a human heart may include providing one or more images of heart tissue from the heart to a computer system. A method may include comparing one feature of one image of the one or more images of heart tissue from the heart to one or more reference features in a database to assess a state of the heart. In some embodiments, a plurality of images may be provided to a computer system and an at least a three-dimensional model created from at least some of the images. A feature of the multi-dimensional model/image may be compared to a database of heart features. In other embodiments, a system may include a CPU. A system may include system memory coupled to the CPU. System memory may store one or more computer programs executable by the CPU. The computer programs may be executable to perform the method. In an embodiment, a carrier medium may store program instructions executable to carry out the method of diagnosing a disease in a heart. In some embodiments, a report for the diagnosis of the heart may be prepared.

In an embodiment, a method of assessing treatments for disease of a human heart may include providing at least one image of heart tissue from the heart to a computer system. An image may include a plurality of features. A first modification may be performed on at least one of the plurality of features. One or more second modifications may be performed on at least one of the plurality of features. The first modification may be compared to at least one of the second modifications. In some embodiments, a plurality of images may be included and an at least a three-dimensional model created from some of the images. An image of the results may be created by a computer system.

In an embodiment, a method of assessing surgical procedures for a human heart may include providing at least one image of heart tissue from the heart to a computer system. One or more features derived from the image may be modified. An affect of the modification may be assessed. An assessment may be carried out by a computer system. A modification of one or more features may be carried out by a computer system. In some embodiments, a plurality of images may be included and an at least three-dimensional model created from some of the images. An image of the results may be created by a computer system.

In an embodiment, a method of designing cardiac instruments may include providing at least one image of heart tissue from a human heart to a computer system. A method may include creating a pattern of at least a portion of at least one cardiac instrument using at least one image. In some embodiments, a plurality of images may be included and an at least three-dimensional model created from some of the images. An image of the results may be created by a computer system. Images created by a computer system of a design of a cardiac instrument may be used to assist in the manufacturing of the instrument.

In an embodiment, a method of determining a volume of a heart may include providing a plurality of images of at least a portion of the heart to a computer system. A method may include assessing a volume in the portion by using the computer system to assess areas on the image. In some embodiments, a plurality of images may be included and an at least three-dimensional model created from some of the images. An image of the results may be created by a computer system. In one embodiment, an end diastolic volume of a heart may be assessed by a computer system if at least one provided image depicts the heart in a substantially expanded condition. In one embodiment, an end systolic volume of a heart may be assessed by a computer system if at least one provided image depicts the heart in a substantially contracted condition.

In an embodiment, a method of determining an ejection fraction of a human heart, may include providing a plurality of images of heart tissue from the heart to a computer system. A method may include assessing at least a first volume and a second volume of a portion of a heart by using the computer system to assess areas on at least two of the images. The volumes may include at least one end diastolic volume and at least one end systolic volume. In some embodiments, a plurality of images may be included and an at least three-dimensional model created from some of the images. An image of the results may be created by a computer system.

In an embodiment, a method of assessing a viability of tissue in a human heart may include providing one or more images of tissue from the human heart to a computer system. A method may include assessing viability of the heart tissue by using the computer system to assess a contrast between two or more sections in at least one image. In some embodiments, a plurality of images may be included and an at least three-dimensional model created from some of the images. An image of the results may be created by a computer system. In some embodiments, a method of assessing a viability of tissue in a human heart may include providing at least one image of tissue from the heart to a computer system. The method may include dividing at least one image into a plurality of sections. The section may or may not be regular and/or evenly distributed. A value may be assigned to at least one of the sections. The value may be a function of a feature of the section. The value of at least one of the sections may be used to assess viability of the heart tissue in or proximate to at least one of the sections. A feature of the section may include the color of the feature. Color may include grayscale as well.

In some embodiments, a method to assess motion of tissue in a human heart may include providing a plurality of images of tissue from the heart to a computer system. The plurality of images may be used to create one or more three-dimensional images of the heart tissue. Motion of at least one section of the three-dimensional image may be assessed to assess asynergy of the heart tissue. One or more three-dimensional images of the assessed asynergy may be created by a computer system.

In an embodiment, a method to assess transmurality of scarring of tissue in a human heart may include providing at least one image of tissue from the heart to a computer system. An extent of heart tissue scarring may be assessed by using the computer system to assess a contrast between at least two sections in at least one image. One or more three-dimensional images of the assessed transmurality may be created by a computer system. Progressive coloring of the assessed transmurality may be used in the created image to display the extent of scarring.

In an embodiment, a method of assessing viability of human heart tissue may include providing at least one image of heart tissue from a human heart to a computer system. A wall thickness of the heart tissue may be assessed by using the computer system to assess a contrast between at least two sections in at least one image. One or more three-dimensional images of the assessed shape may be created by a computer system. Progressive coloring of the assessed wall thickness may be used in the created image to display the extent of tissue thin enough to be considered "dead" tissue.

In some embodiments, a method of assessing a mitral valve in a human heart may include providing at least one image of heart tissue from a human heart to a computer system. A state of a mitral valve in the heart may be assessed by using the computer system to assess one or more distances between two papillary muscles of the heart and/or one or more angles between a mitral valve and one or more papillary muscles. One or more at least three-dimensional images of the assessed condition of a mitral valve may be created by a computer system. In one embodiment, a distance between portions of a human heart may be assessed. The distance may be between two papillary muscles, a papillary muscle and a mitral valve, and/or a papillary muscle and another portion of a human heart. A method may include locating at least two reference points on at least one image of the heart tissue. One or more distances in the heart tissue may be assessed by using the computer system to assess a distance between a plurality of reference points. In one embodiment, images provided to a computer system may be used to assess angles in a human heart. Two or more reference lines and/or planes may be located in at least one image of human heart tissue. Reference lines may be used to assess one or more angles in a heart.

In an embodiment, a method of assessing blood flow in a human heart may include providing at least two images of heart tissue from the heart, a velocity of fluid through a portion of a human heart and a time frame over which the images were collected to the computer system. Fluid flow through a portion of a human heart may be assessed by using the computer system to assess areas on the images. One or more at least three-dimensional images of the assessed blood flow may be created by a computer system.

In some embodiments, a method of analyzing a shape of human heart tissue may include providing at least one image of heart tissue from a human heart to a computer system. At least one image may be divided into a plurality of sections. A shape of the heart tissue may be assessed by using the computer system to assess a curvature of at least one of the sections. One or more three-dimensional images of the assessed shape may be created by a computer system.

In an embodiment, a method of assessing mitral regurgitation in a human heart may include providing at least two images of heart tissue from a human heart and a velocity of blood as a function of time through a portion of the heart to a computer system. A mitral regurgitation of the heart may be assessed by using the computer system to assess at least a first and second volume of a portion of the heart and blood flow through a portion of the heart.

In some embodiments, a method of assessing a viability of human heart tissue may include providing at least two images of heart tissue from a human heart to a computer system. At least one reference point may be assigned to at least two images of the heart tissue. A viability of the heart tissue may be assessed by using the computer system to assess relative movement of at least one of the reference points between at least two images of the heart tissue. One or more three-dimensional images of the assessed viability may be created by a computer system. Progressive coloring of the assessed viability may be used in the created image to display the extent of nonviable tissue.

In an embodiment, a method of assessing heart reconstruction procedures may include providing at least one image of heart tissue from a human heart to a computer system. At least one of the images may include at least a portion of a mitral valve. At least one feature derived from the image may be modified. At least one of the features modified may include at least a portion of the mitral valve. An affect of the modification on one or more features derived from the image may be assessed. One or more three-dimensional images of the assessed results of the virtual heart reconstruction may be created by a computer system.

In an embodiment, a method of assessing cardiac electrical activity may include providing one or more images of heart tissue from a human heart to a computer system. One or more features of the image may be modified. An electrical affect of the modification on one or more features derived from the image may be assessed. One or more three-dimensional images of assessed electrical effects of the modification may be created by a computer system. Progressive coloring of the assessed viability may be used in the created image to display the extent of an electrical effect.

In one embodiment, a method of assessing a treatment of heart tissue from a human heart may include providing one or more images of heart tissue from the heart to a computer system. One or more features of the image may be modified. The computer system may be used to compare the modification of at least one feature of the image to one or more heart reference features in a database to assess the state of the human heart. The database may include data from one or more prior treatments of heart tissue from one or more human hearts.

In an embodiment, a method of creating multi-dimensional human heart tissue images may include providing a plurality of images of human heart tissue to a computer system. One or more of the images of human heart tissue may have been collected using a specified protocol. The plurality of images may be at least two-dimensional. At least one second image may be created using the computer system. The second image may be at least three-dimensional.

In some embodiments, a method of remotely assessing treatment of a human heart may include providing a heart procedure assessment program accessible via a network. At least one image of heart tissue from the heart may be provided to the heart procedure assessment program. The heart procedure assessment program may be accessed remotely to assess a procedure for treatment of the heart.

In one embodiment, a method of assessing a surgical procedure on a human heart may include allowing a user to perform a modification to at least one feature of the heart using a computer system. A performance of the user may be assessed by comparing the user's modification to a database of modifications.

In an embodiment, a method of assessing plication strategies on heart tissue from a human heart may include providing at least one image of heart tissue to a computer system. At least one of the images comprises at least a portion of an interior chamber of the heart. At least a portion of an interior chamber may be reconstructed. An effect of a reconstruction of at least a portion of the interior chamber on at least another portion of the heart may be assessed. One or more three-dimensional images of assessed plication strategies of the modification may be created by a computer system. Progressive coloring of the assessed plication may be used in the created image.

In some embodiments, a method of enhancing images may include providing at least two images of the heart tissue to a computer system. At least one image may include an enhanced portion. At least a portion of at least one image may be enhanced by combining at least a portion of at least one of the images with at least the enhanced portion of a second image.

In an embodiment a system may function to employ any of the methods described herein. The system may include a CPU. The system may include a system memory coupled to the CPU. The system memory may store one or more computer programs executable by the CPU. One or more computer programs may be executable to perform any of the methods outlined herein.

In some embodiments, a carrier medium may function to store program instructions The program instructions may be executable to implement a method as described herein.

In an embodiment, a report may include a description of a result or an effect of a method as described herein.

In some embodiments, a method as described herein may include assessing a cost to be charged to a user for using the method based on a number of times the user applies the method.

BRIEF DESCRIPTION OF THE DRAWINGS

Advantages of the present invention may become apparent to those skilled in the art with the benefit of the following detailed description of the preferred embodiments and upon reference to the accompanying drawings in which:

FIG. 8 depicts different features of a heart;

FIG. 9 depicts an embodiment of repairing a mitral valve by excising a portion of the valve and regrafting the leaflets;

Figure 1:
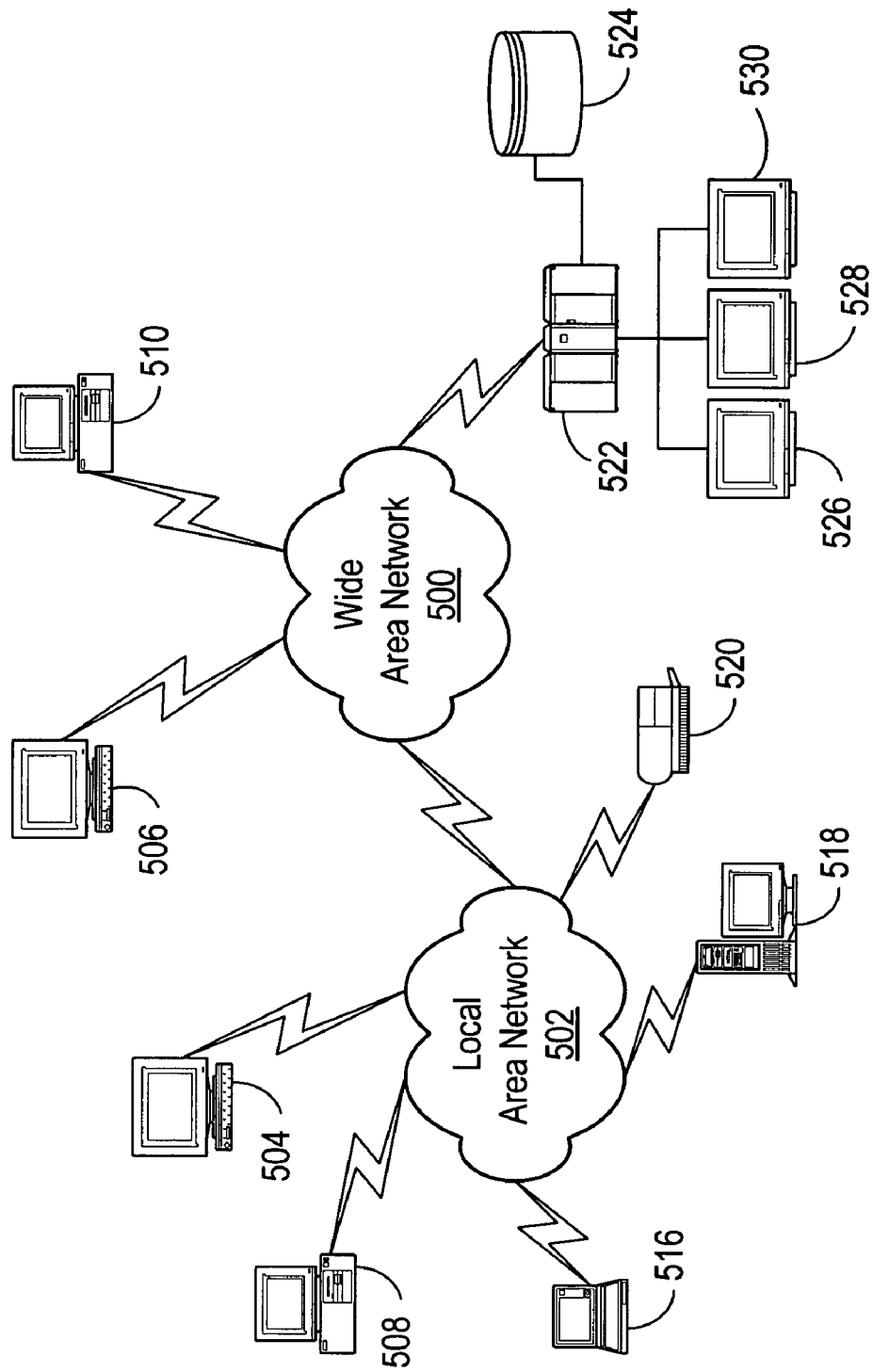
FIG. 1 depicts a network diagram of an embodiment of a wide area network that may be suitable for implementing various embodiments.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Methods and apparatus of various embodiments will be described generally with reference to the drawings for the purpose of illustrating the particular embodiments only, and not for purposes of limiting the same. The illustrated embodiments address the ability of the physician to accurately assess the effects of cardiac disease on an individual patient and to use an appropriate treatment to restore the cardiac system to its optimal or best acceptable condition. In one embodiment, this is accomplished by using an analytical tool that takes images of the patient's own heart and collects other data related to the functioning of the heart. The collected data may be used to create a multi-dimensional finite element model and/or image of the heart. The multi-dimensional finite element image of the patient's heart may interact and respond to other models or a set of models. For example, the model of the patient's heart may also be connected to a model of the circulatory system and/or a model of the cardiac system. These models, in combination, may simulate the performance of the heart and its effect on the circulatory system. The use of these models may allow a physician to determine the appropriate areas of the heart to be repaired, replaced, or otherwise medically treated for the patient. The models may also allow the physician to determine the effects that the treatment may have on the portions of the heart and/or on the entire heart.

In an embodiment, a cardiac intervention process may include diagnosis, designing and/or manufacturing cardiac instruments, creating a procedure for cardiac modification, and/or prescribing a treatment of a cardiac disease. A cardiac disease may include any cardiac irregularity. A cardiac irregularity may be associated with a structural defect or abnormality of a heart. Other cardiac irregularities may be associated with a chemical or hormonal imbalance. Additional cardiac irregularities may include electrical abnormalities (e.g., arrhythmia). A method may include analyzing and performing a virtual treatment of a cardiac irregularity. A method of performing a virtual cardiac intervention may be performed on a computer system. A computer system may be a local computer system, including, but not limited to, a personal computer. Other embodiments may include remote systems or two or more computers connected over a network.

FIG. 1 illustrates a wide area network ("WAN") according to one embodiment. WAN 500 may be a network that spans a relatively large geographical area. The Internet is an example of a WAN. WAN 500 typically includes a plurality of computer systems that may be interconnected through one or more networks. Although one particular configuration is shown in FIG. 1, WAN 500 may include a variety of heterogeneous computer systems and networks that may be interconnected in a variety of ways and that may run a variety of software applications.

One or more local area networks ("LANs") 502 may be coupled to WAN 500. LAN 502 may be a network that spans a relatively small area. Typically, LAN 502 may be confined to a single building or group of buildings. Each node (i.e., individual computer system or device) on LAN 502 may have its own CPU with which it may execute programs, and each node may also be able to access data and devices anywhere on LAN 502. LAN 502, thus, may allow many users to share devices (e.g., printers) and data stored on file servers. LAN 502 may be characterized by a variety of types of topology (i.e., the geometric arrangement of devices on the network), of protocols (i.e., the rules and encoding specifications for sending data and whether the network uses a peer-to-peer or client/server architecture), and of media (e.g., twisted-pair wire, coaxial cables, fiber optic cables, and/or radio waves).

Each LAN 502 may include a plurality of interconnected computer systems and optionally one or more other devices such as one or more workstations 504, one or more personal computers 508, one or more laptop or notebook computer systems 516, one or more server computer systems 518, and one or more network printers 520. As illustrated in FIG. 1, an example of LAN 502 may include at least one of each of computer systems 504, 508, 516, and 518, and at least one printer 520. LAN 502 may be coupled to other computer systems and/or other devices and/or other LANs 502 through WAN 500.

One or more mainframe computer systems 522 may be coupled to WAN 500. As shown, mainframe 522 may be coupled to a storage device or file server 524 and mainframe terminals 526, 528, and 530. Mainframe terminals 526, 528, and 530 may access data stored in the storage device or file server 524 coupled to or included in mainframe computer system 522.

WAN 500 may also include computer systems connected to WAN 500 individually and not through LAN 502 such as, for purposes of example, workstation 506 and personal computer 510. For example, WAN 500 may include computer systems that may be geographically remote and connected to each other through the Internet.

Figure 2:
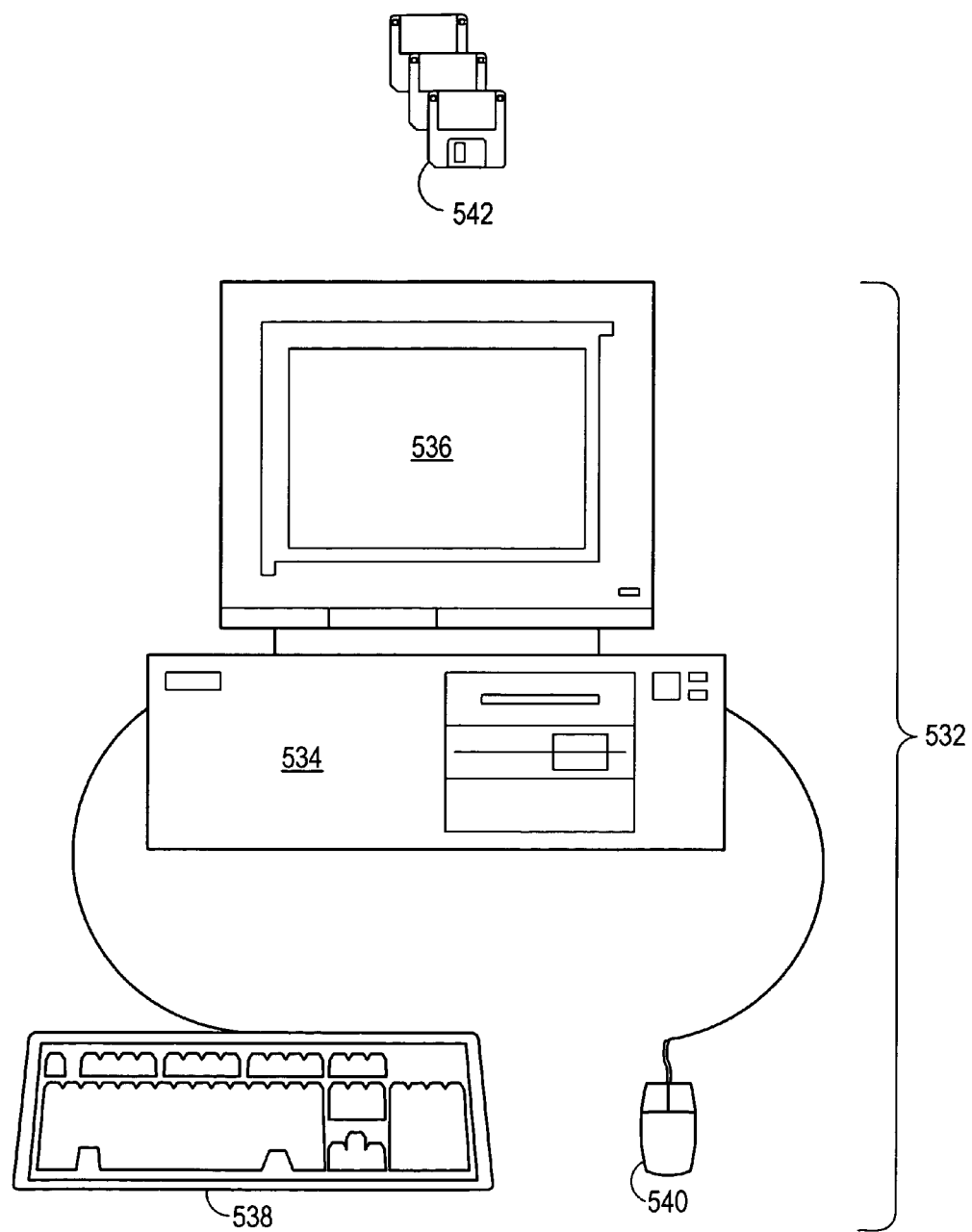
FIG. 2 depicts an illustration of an embodiment of a computer system that may be suitable for implementing various embodiments.

FIG. 2 illustrates an embodiment of computer system 532 that may be suitable for implementing various embodiments of a system and method for restricting the use of secure information. Each computer system 532 typically includes components such as CPU 534 with an associated memory medium such as floppy disks 542. The memory medium may store program instructions for computer programs. The program instructions may be executable by CPU 534. Computer system 532 may further include a display device such as monitor 536, an alphanumeric input device such as keyboard 538, and a directional input device such as mouse 540. Computer system 532 may be operable to execute the computer programs to implement a method for facilitating cardiac intervention as described herein.

Computer system 532 may include memory medium on which computer programs according to various embodiments may be stored. The term "memory medium" is intended to include an installation medium, e.g., a CD-ROM, or floppy disks 542, a computer system memory such as DRAM, SRAM, EDO RAM, Rambus RAM, etc., or a non-volatile memory such as a magnetic media (e.g., a hard drive or optical storage). The memory medium may also include other types of memory or combinations thereof. In addition, the memory medium may be located in a first computer that executes the programs or may be located in a second, different computer that connects to the first computer over a network. In the latter instance, the second computer may provide the program instructions to the first computer for execution. In addition, computer system 532 may take various forms such as a personal computer system, mainframe computer system, workstation, network appliance, Internet appliance, personal digital assistant ("PDA"), television system, or other device. In general, the term "computer system" generally refers to any device having a processor that executes instructions from a memory medium.

The memory medium may store a software program or programs operable to implement a method for restricting the use of secure information as described herein. The software program(s) may be implemented in various ways, including, but not limited to, procedure-based techniques, component-based techniques, and/or object-oriented techniques, among others. For example, the software program(s) may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 534 executing code and data from the memory medium may include a means for creating and executing the software program or programs according to the methods and/ or block diagrams described herein.

Figure 3:
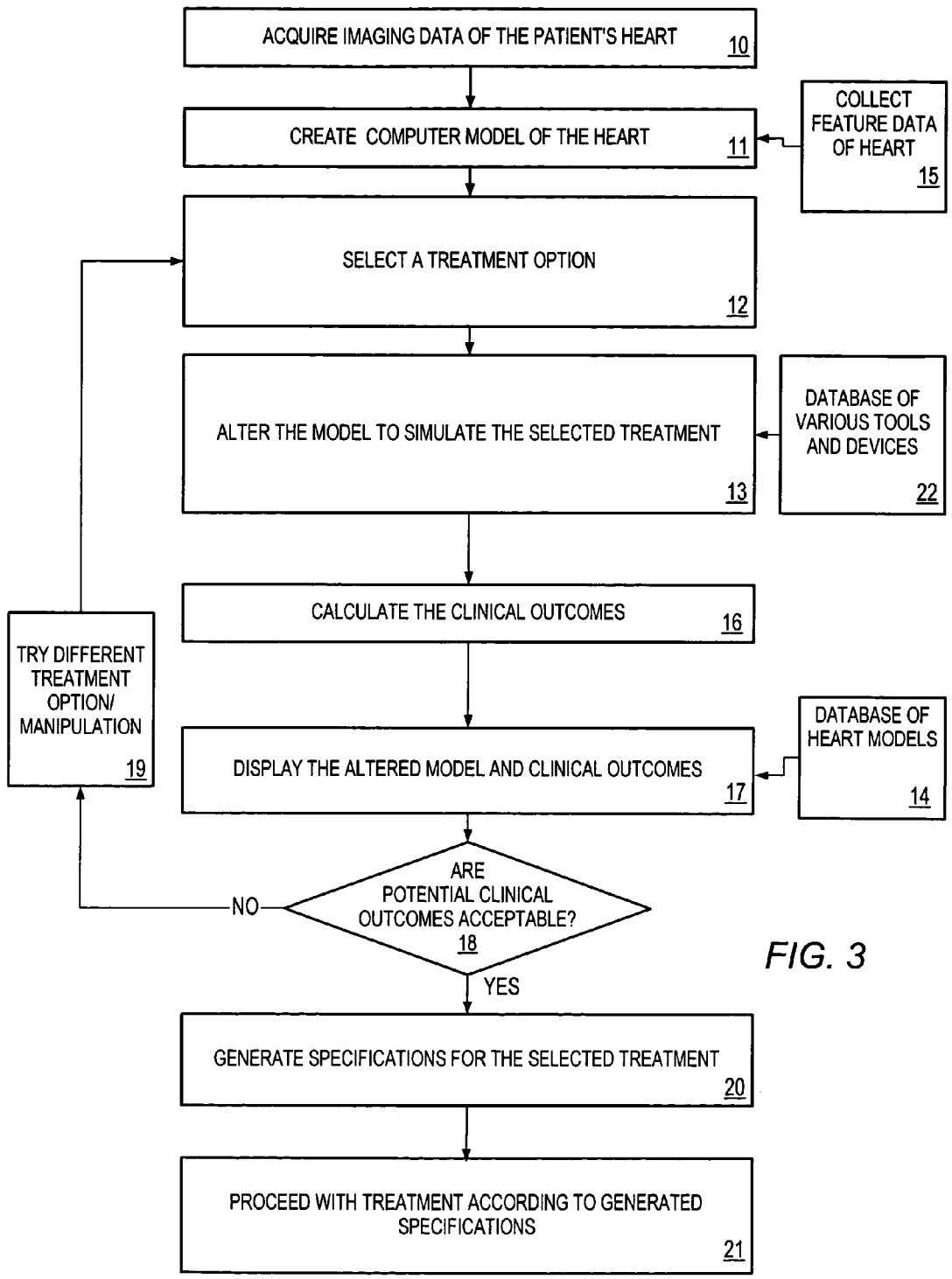
FIG. 3 depicts a flowchart of a method for performing a virtual interactive cardiac valve correction.

One embodiment of a cardiac intervention method may include a system and method for capturing the geometry of the heart and its components using imaging technologies. FIG. 3 depicts a flowchart of an interactive method for determining a treatment for a cardiac condition. The method begins with acquiring image data of the heart (10). Image data may be collected using a variety of imaging technologies that include, but are not limited to, MRI imaging, echocardiography, or PET. These imaging systems are common in most hospitals and the leading manufacturers of these systems are General Electric, Siemens and Phillips. Additional features of the patient's heart may also be collected (15). Some additional features of the patient's heart that may be captured and/or calculated include:

a. Myocardial stiffness
b. Ventricle wall thickness
c. Heart rate
d. Ventricle wall tension
e. Right and left ventricle volumes
f. Mitral Valve Annulus
g. Chordae Tendinaea
h. Papillary Muscles
i. Mitral Valve Leaflets
j. Ventricle Endocardium Border
k. Ventricle Epicardium Border
l. Aortic valve annulus
m. Aortic valve cusps
n. Tricuspid valve apparatus
o. Pulmonary valve apparatus
p. Ventricle wall thickness
q. Ventricles areas of akinesia
r. Ventricle areas of dyskinesia
s. Ventricle areas of asynergy
t. Ventricle preload
u. Ventricle filling pressure
v. Heart's arterial system
w. Heart's flow through the arterial system
x. Heart's venous system
y. Left and right atrium volumes
z. Left and right atrium wall thickness.

Some or all of these features may be used to create a computer model of the patient's heart (11). In some embodiments, a computer model of the heart is a multi-dimensional finite element computer model. A computer model may include a mathematical model of a heart. A mathematical model may include an image or graphical representation of one or more of the dimensions of a computer model. One example of a multi-dimensional model is a three-dimensional model that displays not only the three dimensions of a geometry of a heart but may also depict this geometry as it changes over time. Other dimensions that may be modeled include physiological factors such as the production of hormones. For example, the heart produces a hormone B-type natriuretic peptide in reaction to increased wall stress. The production of this hormone could be depicted in the generated computer model. Another non-limiting example of a dimension of a heart model may include electrical activity of a heart.

Software producing the model may run on a personal computer, or it may run at a central location accessible by one or more personal computers. The computer model may be produced using a computer at one location and the model delivered to a different computer at another location.

A multi-dimensional model of a patient's heart may allow a physician to visually inspect the status of many elements of a heart. The physician may use the computer model to assess and/or determine the condition of the patient's heart. Assessing information or data, as generally used herein, may be generally defined as qualitatively deriving or extrapolating a result from provided data. Determining information or data, as generally used herein, may be generally defined as a quantitative derivation or extrapolation of a result from provided data. Information assessed and/or determined from a computer model of the patient's heart and from the features of the heart may include, but is not limited to:

a. Areas of the mitral, aortic, tricuspid or pulmonary valves that may need to be repaired or replaced and what affect each repair may have on the other components.

b. What vessels are blocked and may need to be grafted, where to graft and what effect the revascularized muscle may have on the other components.

c. What areas of the ventricle are akinetic, dyskinetic or hibernating, to show what areas may be excluded during ventricular restoration and what effect the exclusion may have on the other components and aspects of the ventricle and heart.

d. How a patient's heart may respond to medication treatment.

e. The effects of placement of a corecap-restraining device, Myosplint shape changing device, or other device on the outside of the ventricle and how these devices may affect the heart.

f. The effects of chordae length adjustment or papillary base relocation on the heart.

g. The effects of placement of any ventricular assist device on the heart.

h. The vessels that are blocked and may need to be stented, where to stent and the effect the revascularized muscle may have on the other components of the heart.

i. Determining and/or assessing possible electrical effects in the heart (e.g., arrhythmia) arising as a result of the proposed cardiac interventions.

j. Assessing fluid flow (e.g., blood) across a portion of the heart (e.g., the aorta) using at least some data from existing imaging and measuring protocols (e.g., CMR).

k. Assessing mitral regurgitation for a specific patient.

l. Assessing a percent of viable and/or nonviable tissue for the heart. Images acquired from, for example, an MRI may be provided to a computer system where the images have been enhanced. The images may have been enhanced using techniques such as gadolinium enhancement of the MRI. Enhancement techniques such as these may improve the contrast between viable and nonviable tissue in MRI images.

m. Analyzing a shape of the heart or a portion of a heart as well as assessing an affect occurring from reshaping or reconstructing a portion of a heart. During analysis, a heart may be divided into one or more sections or segments. A curvature of each of the sections may be measured. A computer system may be used to automatically measure a curvature of a section. The computer system may assess the shape of an interior chamber of the heart by determining the curvature of a plurality of sections. Determined curvatures may be added together to assess a shape of the heart.

n. A volume in a portion of a heart (e.g., an interior chamber of a human heart) may be assessed using the method and/or system described herein.

o. An end diastolic volume of a portion of a heart from a specific patient may be assessed by providing at least one image to a computer system.

p. An end systolic volume of a portion of a heart from a specific patient may be assessed by providing at least one image to a computer system.

q. An ejection fraction may be assessed by a computer system.

r. Motion of at least a portion of a heart may be analyzed to assess a viability of the portion of the heart.

s. A shape of at least a portion of a heart may be assessed by providing at least one image to a computer system.

t. A degree of transmurality of a portion of heart tissue scarring might be assessed by a computer system.

u. A thickness of at least a portion of a wall may be assessed.

v. Distances and angles between papillary muscles may be assessed. In an embodiment, distances and/or angles between papillary muscles and a portion of the heart may be assessed. Assessed angles and/or distances may be used to assess a condition of a mitral valve.

w. Flow of a fluid across a portion of a heart may be assessed. The fluid may include blood and/or some physiological fluid. The portion of the heart may include the aorta.

x. Mitral regurgitation of a human heart may be assessed by providing at least one image of a heart to a computer system.

y. Viability of human heart tissue may be assessed by assigning reference points to an image constructed by a computer system using patient specific data provided. Motion over time of the reference points may assist in assessing viability of human heart tissue by comparing the motion to "normal" heart tissue.

z. Particular procedures may be assessed. For example, plication procedures may be assessed using a computer system.

Based on a physician's analysis of the functioning of the heart and the properties of the various components of the heart (e.g., the analysis listed above), a physician may make a diagnosis of the heart condition. Based on the diagnosis of the heart, the physician may choose a treatment option (12).

A model may assist the physician in the selection of a treatment option (12). After the physician has selected a treatment option, the physician may alter the computer model of the patient's heart (13) to simulate the proposed treatment of the heart. For example, the computer software may allow the physician to alter the model by placing one or more synthetic devices in various portions of the computer model of the heart. The computer software, in certain embodiments, may include a database (22) that includes computer models of a variety of tools and devices that may be used for a variety of treatments. Altering the computer model of the patient's heart may involve importing one or more of these tools or devices into the computer model from the database (22).

The computer model may also be used to analyze what effects the selected virtual treatment may have on the patient's heart. The insertion of cardiac devices or the performance of a surgical technique may alter the geometry of a patient's heart. The modeling software may alter the model of the patient's heart (14) in response to the selected treatment. The physician may view the altered computer model to determine the geometrical effect of the proposed treatment. For example, the placement of a synthetic device into the heart may alter the shape and size of the heart. If a surgical procedure is contemplated by the physician, the computer software may simulate the outcome of the surgery.

Additionally, the computer software may determine the effect of the treatment on various features of the patient's heart. For example, the software may calculate physiological properties of the heart based on known properties of hearts (16). The results of these calculations may be displayed in the computer model of the patient's heart (17). In addition to the altered computer model, the potential outcomes displayed may include, but are not limited to, the following:

a. The estimated performance of the valves and ventricle after the procedure; e.g., regurgitation, reduced flow across the valves, ejection fraction, etc.

b. The flow through the grafts or stents and what areas of the myocardium the grafts or stents may perfuse.

c. The volume and contractile state of the ventricle after excluding tissue.

d. The positioning and performance of the valve apparatuses after reconstruction of the ventricle.

e. The effects that a drug or combination of drugs may have on the entire heart.

The physician may use the displayed information to diagnose the outcome of the proposed treatment on a patients heart (18). Diagnosing the effect of the procedure on a cardiac irregularity, where cardiac irregularities may include, but are not limited to, structural, chemical, and/or electrical irregularities may include comparing the simulated computer model of the outcome of the treatment to what is generally accepted to one skilled in the art as a healthy/normal heart. Cardiac treatments may be assessed/determined by analysis of a model of each procedure (procedure not being limited merely to a surgical procedure). Treatments may also be assessed relative to a database of heart models, where the database of heart models may include, but is not limited to, data from prior cardiac surgical procedures and/or treatments, expert opinions (e.g., cardiac surgeon specialists), and/or data derived and/or extrapolated from prior cardiac surgical procedures/treatments and/or expert opinions.

Cardiac surgical procedures specifically may be assessed. Surgical procedures may be assessed at least partially by the computer system, the computer system having been provided data at least in the form of two-dimensional images. The computer system may be provided a plurality of images. A user may modify at least one feature derived from the image. The feature may represent a portion of a heart (e.g., structural feature of the heart). In an embodiment, the feature may represent some aspect or characteristic of the heart (e.g., electrical or chemical). A feature may be modified virtually. A modification of a feature may be assessed. Assessment of a modification may include determining an effect that modifying at least one feature has on at least one other feature.

The designing and manufacture of surgical instruments may also be accomplished by methods set forth herein. The computer system may use the computer model of a patient's heart to design a cardiac instrument for a surgical procedure based on the information provided. A cardiac instrument may include, but is not limited to, an actual surgical tool employed by a surgeon during an operation, a patch, or a template. In an embodiment, designs for a cardiac instrument may be used to manufacture the instrument.

The physician, after analysis of the modified computer model, is able to select the displayed intervention (18) or to decide to try another treatment or modify the current intervention (19). When the physician decides to attempt another treatment, the cycle may repeat itself by returning to the treatment option portion of the method. When the physician accepts the potential clinical outcomes, the model may produce one or more specifications for the selected treatment (20). These specifications may lead to the development of a template, or tools or devices, to guide the physician in translating the virtual intervention on the model to the actual intervention on the heart (21). Tools and devices may include cardiac instruments such as ventricle patches, ventricle shapers, and sizers. A computer system may assist in designing cardiac instruments using the images as a model to produce patient specific devices. In some cases templates, tools or devices may not be needed to perform the intervention and specifications. In such cases, the computer may prepare specifications for performing the selected surgical procedure. Additional devices may be generated from the models to help the physician implement the surgical procedure that the model may have predicted to provide the best outcome. Furthermore, the use of some or all of the above listed factors may be used to evaluate the post-treatment condition of the patient. A database of (14) of surgical pathologies, treatments and outcomes may be gathered, maintained, and analyzed to further refine the treatment of cardiac diseases and disorders. The database may include heart models that may be used for comparison with the altered model of the patient's heart.

Post-treatment imaging such as MRI, PET and echocardiography scanning of the above listed measurement points may show the physician how well the patient has done in treatment. The images of the patient's heart before treatment and the model depiction of the treated heart, along with the predicted performance characteristics, may all be saved in a database. A physician may compare actual data with predicted data and determine how to improve his technique to achieve the theoretical best results. Long-term follow up is enhanced when current images of the heart may be compared to pre- and post-treatment images of the heart. Images may be analytically compared for small changes in the heart's geometry and alignment. If small changes are detected early, less invasive measures may be taken to stop or slow the progression of the abnormality. Users may also use this database to pull up data on past patients who may have similar characteristics as the current patient under consideration, and compare his current treatment options to the past ones. Such methods may further contribute to improvement of techniques.

In an embodiment, the method and systems described in FIG. 3 may be used to determine an appropriate treatment for cardiac valve correction. In a cardiac valve correction procedure, imaging information of the patient's ventricle is collected (10). Other information such as, but not limited to, stiffness, wall thickness, heart rate, wall tension, ventricle volume, valve apparatus locations, and epicardium and endocardium borders may be needed to convert the data to a multi dimensional model of the ventricle.

Figure 4:
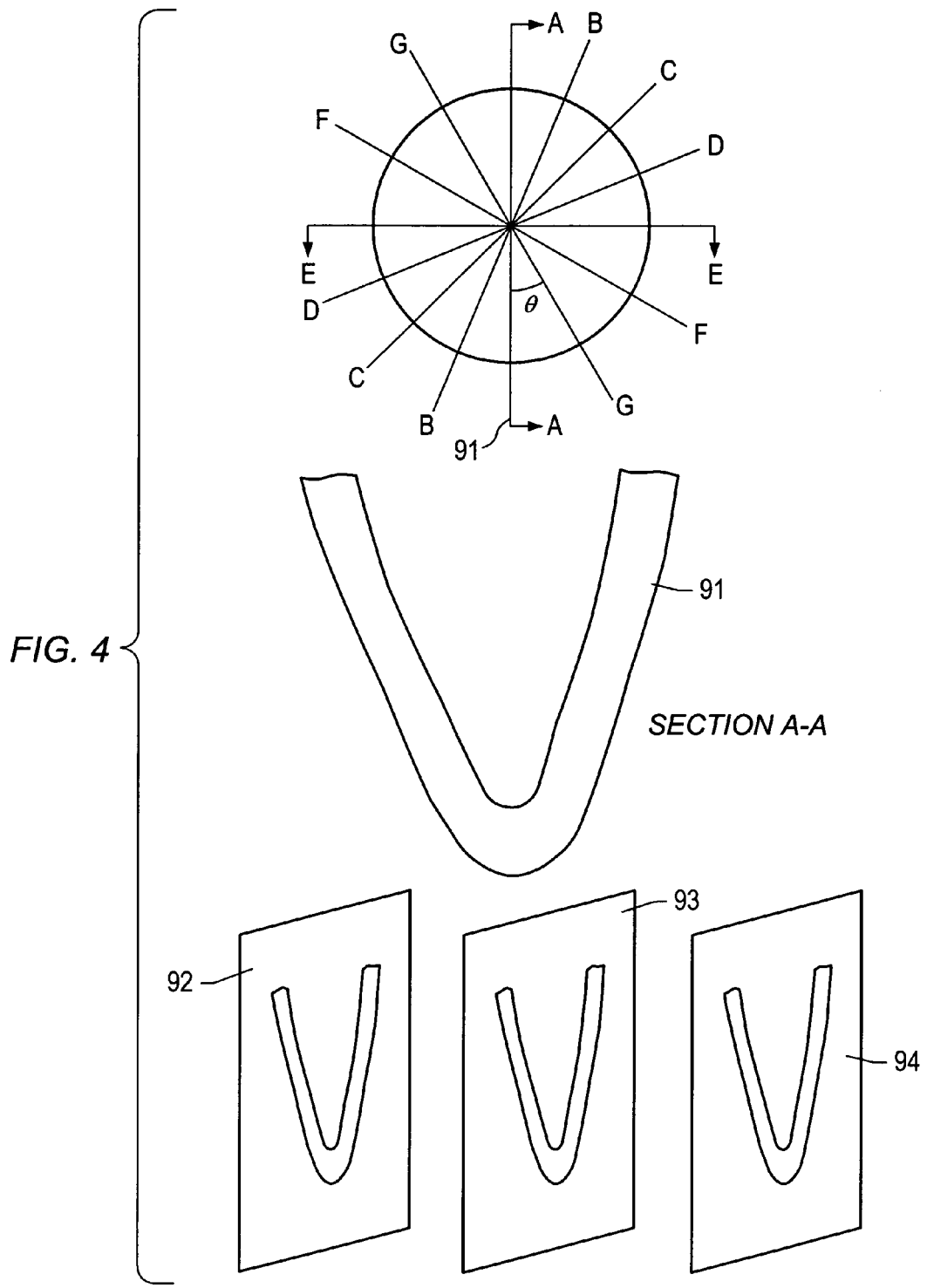
FIG. 4 depicts sectional views along the long axis of a heart obtained using MRI and Echocardiography.
Figure 5:
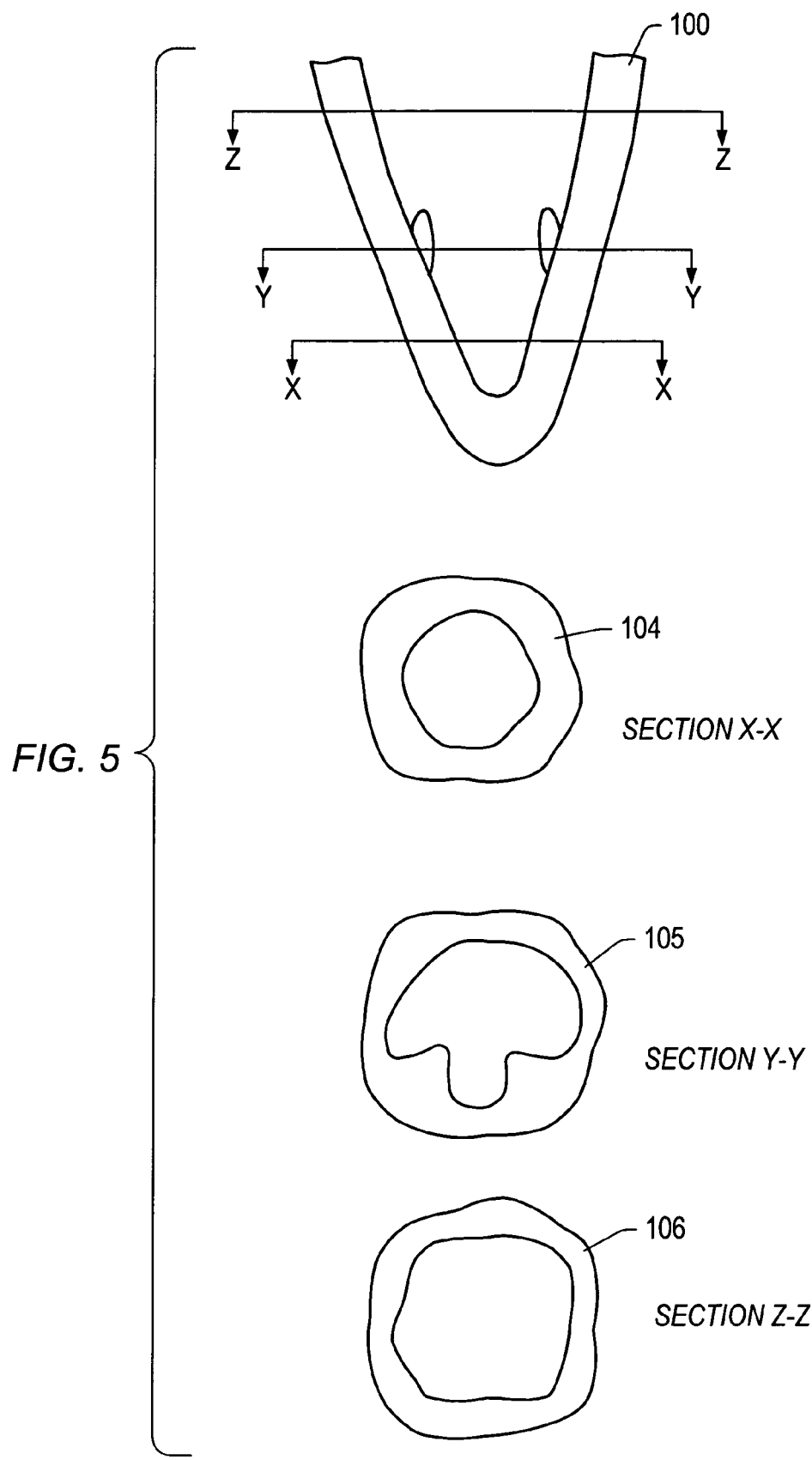
FIG. 5 depicts sectional views along the short axis of a heart using MRI and Echocardiography.

The imaging data is often acquired as sectional views (see, for examples FIGS. 4, 5). For example, sectional views of a portion of a heart along the long axis are depicted in FIG. 4. Each sectional view (91, 92, 93, and 94) is taken along a different cross section of the portion of the heart. Sectional view 91 represents the image of the portion of the heart along plane AA. Other sectional views (92, 93, and 94) are collected along other planes (e.g., BB, CC, DD, EE, FF, or GG). Alternatively, data may be collected along the short axis of the portion of the heart as depicted in FIG. 5. FIG. 5 depicts three cross-sectional views (104, 105, and 106) of the heart 100 along planes XX, YY and ZZ (respectively). In some embodiments, data from both long axis and short axis scans of the heart may be used to prepare the computer model. It should be understood that the data from the long and short axis scans may be redundant and sectional data along only one axis may be necessary to create a model.

Figure 6:
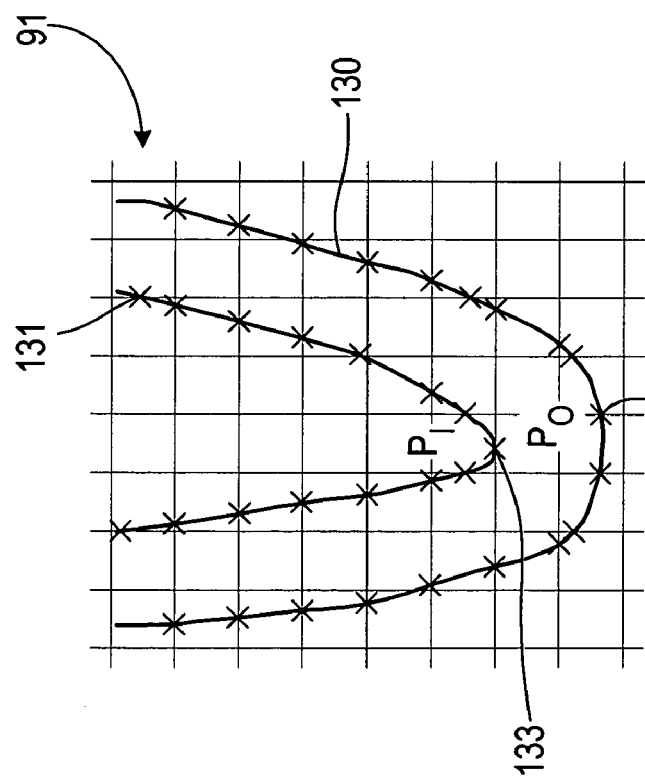
FIG. 6 depicts an embodiment of a model created from MRI images.

After the sectional views have been collected, the views may be combined to generate a three-dimensional computer model of the heart. One method of combining these sectional views and converting them into a model may be done by overlaying the sectional views on an XY grid. FIG. 6 shows cross-sectional view 91 of the heart along the long axis at plane AA from FIG. 4 with a grid superimposed over the cross-section. The points of intersection of endocardium ($P_I$, 133) and the epicardium ($P_O$, 132) with the grid lines are identified in XY coordinates, as depicted in FIG. 6. Similarly, XY coordinates of the other cross-sections (e.g., cross-sections 92, 93, and 94) are also identified using a grid. Since the angular relationship between each plane is known (e.g., angle θ between planes AA and GG as depicted in FIG. 4), all the data points may be converted into XYZ coordinates. The boundary layer generated by connecting the internal points $P_I$ of each cross-section defines the endocardial boundary 131, and the boundary layer generated by connecting the external points $P_O$ of each cross-section defines the epicardial boundary 130. In this manner, the heart may be defined in a three-dimensional space. Once the three-dimensional model is created, a time frame of the heart over which all the images were made may be added to show the heart movement during its cardiac cycle. In this manner a "four-dimensional" heart model may be created.

Figure 7:
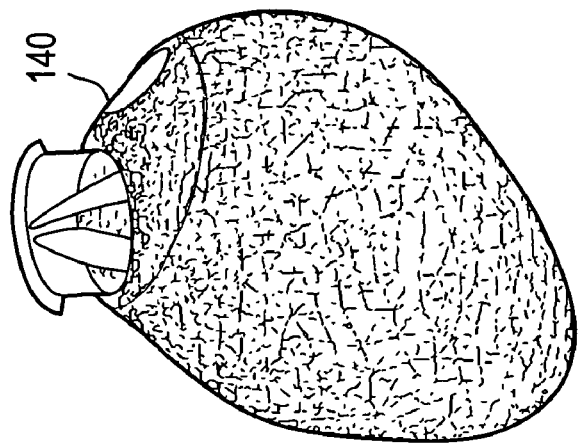
FIG. 7 depicts an embodiment of a model of a heart with a finite element grid.

Once the multi dimensional object is defined, it may be converted to elements of a finite element model and a finite element mesh that represent the heart and its components to create model 140 as depicted in FIG. 7. Some of the components of the heart that may be identified as different features of a finite element model are listed below (depicted in FIG. 8), but the apparatus and method is not limited to these components:

| | |
|---|---|
| a. Mitral valve annulus | A |
| b. Mitral valve leaflets | B |
| c. Chordae Tendinae | C |
| d. Papillary muscles | D |
| e. Aortic valve with cusps | E |
| f. Left ventricle outflow tract | F |
| g. Left ventricle walls | G |
| h. Septum | H |
| i. Myocardium of the heart | I |
| j. Left atrium | J |
| k. Ascending aorta | K. |

These elements may have different structural properties. The structural properties of myocardium and other cardiac structures may be obtained from various sources in literature. For example, properties of the ventricle myocardium may be found in, J. M. Guccione et. al., "Passive Material Properties of Intact Ventricular Myocardium Determined from a Cylindrical Model", Journal of Biomechanical Engineering Vol. 113, February 1991. Once all the structures are geometrically defined and structural properties are known, a finite element model may be created. The general creation of finite element models is well known in the art. A method of converting a defined object to a finite element mesh is described in U.S. Pat. No. 5,892,515, and is herein incorporated by reference. "Finite element analysis" is a mathematical approach to solving large (complex) problems. Generally, the subject is segmented into many pieces that have closed form solutions. That is, each piece is definable by a linear equation, and hence is a "finite element." Collectively, the linear equations of the pieces form a system of equations that are simultaneously solvable. Computer programs for simulating finite element analysis in various applications exist. For example, design engineers use finite modeling programs. Typically, many thousands of elements are created to model a subject object and in particular three-dimensional objects. For each element, there is geometric information such as an x-y-z coordinate at a point in the element, an element type, material property, stress value, displacement, thermal value, etc. Such information is definable by linear equations for the elements. To that end, finite analysis is employed to model the subject object. Examples of finite modeling programs include: ABAQUS by Hibbitt, Karlsson, and Sorensen, Inc. of Pawtucket, R.I., ANSYS by Swanson Analysis Systems Inc. of Houston, Pa.; SUPERTAB by Structural Dynamics Research corp. of Ohio; and, PATRAN by PDA Engineering of Costa Mesa, Calif.

Once a finite element model of the heart has been created, an image of the heart and some of its features may appear on a monitor to allow the physician to interact with the model. An image as illustrated in FIG. 7 may be displayed along with relevant data on the state of the heart (e.g., ventricle volume, blood pressure, ejection fraction, heart rate). In an embodiment, an image may be three-dimensional. In other embodiments, an image may be four-dimensional, where the fourth dimension is time. Multi-dimensional images may include "dimensions" other than geometric dimensions or time. Multi-dimensional images may include dimensions that are essentially characteristics or aspects of a particular feature of the heart.

In an embodiment, an image may be interactively connected to a model to allow the physician to simulate the effects of the treatment before it is administered. For example, a pull down menu may be accessed to select the type of treatment desired (see FIG. 3, (12)). Treatments for the correction of a cardiac valve may be listed. Examples of possible cardiac valve treatments include, but are not limited to inserting a synthetic valve (e.g., a St. Jude mechanical valve or a Baxter tissue valve), insertion of an annuloplasty ring, and/or performing a surgical repair (e.g., moving papillary muscle locations, surgical ventricular repair, bypass grafting, mitral valve repair, etc.). A physician may select the mitral valve option to shorten the chordae tendinae or tighten the mitral annulus. In the case of the chordae tendinae, the model may separate the chordae elements from the entire model and present it to the physician to allow the physician to interact with the elements. Once the physician has shortened the chordae tendinae, the model presents the image of the new shorter element and presents an image of the other elements with the effect that the shortening of the chordae tendinae has had on them along with clinical outcomes (16)(17).

Figure 10:
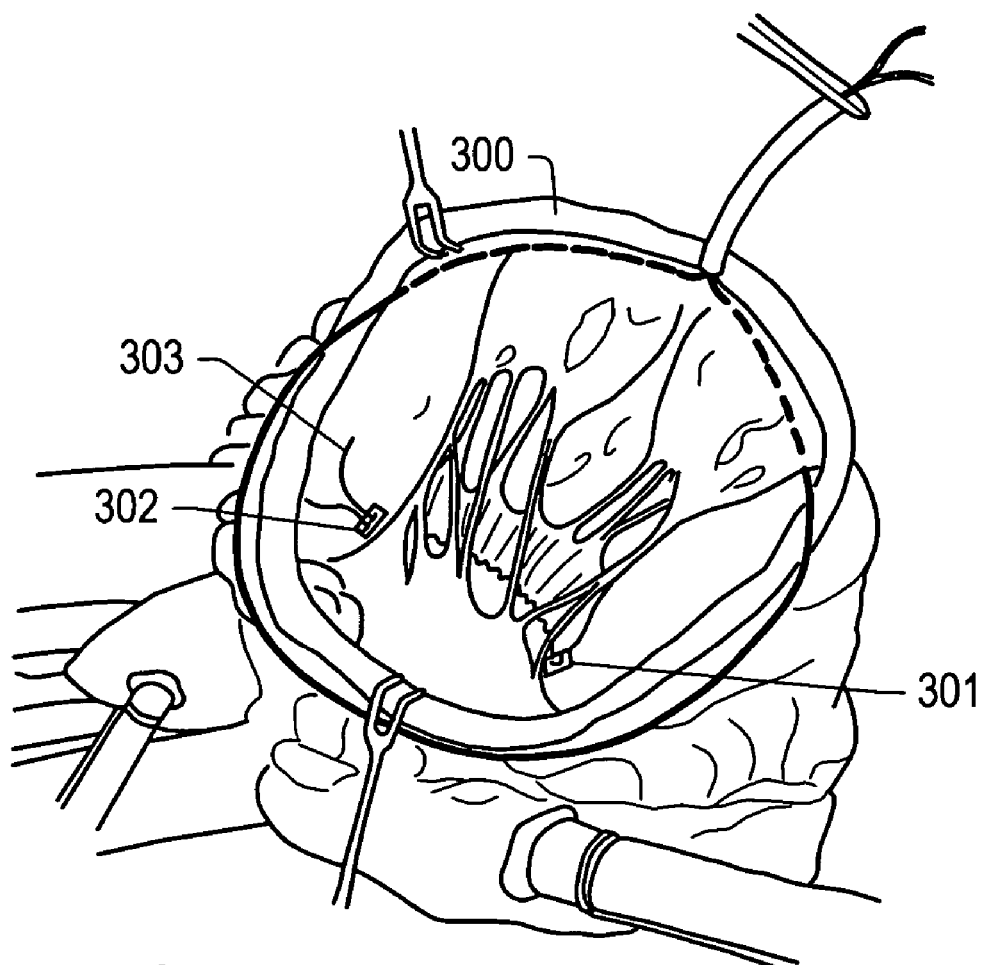
FIG. 10 depicts an embodiment of tightening a mitral annulus with a suture.

FIG. 9 depicts an embodiment of a surgical repair of a mitral valve by excising a portion of the valve and regrafting the leaflets. A mitral valve may require tightening during reconstruction of a portion of a heart. Typically, a mitral valve may need to be reconstructed when there exists mitral regurgitation in a diseased heart. A level of mitral regurgitation may be acceptable depending on the circumstances of the patient. An amount of acceptable mitral regurgitation is typically determined by a patient's doctor or surgeon. Mitral regurgitation may be generally described as a leaking of fluids (e.g., blood) back into an interior chamber of the heart. Mitral regurgitation leads to inefficient pumping of the heart. One solution to mitral regurgitation may be tightening of the annulus of the mitral valve. Tightening the annulus of the mitral valve may reduce or even eliminate mitral regurgitation. FIG. 9 depicts a tightening of annulus 322 of mitral valve 320. Portion 324 of mitral valve 320 may be excised from mitral valve 320. Ends of mitral valve 320 may be pulled in towards one another to tighten or restrict annulus 322. Sutures 325 may couple the ends of mitral valve 320 together to finish reconstruction of mitral valve 320. FIG. 10 depicts an embodiment of a surgical procedure in heart 300. The surgical procedure depicted is that of a tightening of a mitral annulus with suture 303. Suture 303 may be inserted through openings 301 and 302. Suture 303 may be tightened to restrict the annulus as opposed to excising a portion of the mitral valve.

The interaction between the physician and the model may come in various forms. A pull down menu standard to most software programs could present the physician with a list of options, such as selecting the type of scalpel to use, the type of suture material, etc. The physical characteristics of these implements may be entered into a database (22) that a model may access. Once the physician has selected the implement to use, a box or another pull down menu may appear asking for further information on how to use the implement. For example, with a scalpel the box will ask the physician how long and how deep he wants to make the incision. The physician will then be asked to identify by click with a mouse or stylus the start point and end point of the incision. In other examples, a surgeon or user may manipulate an instrument (e.g., a scalpel) by selecting the instrument with a mouse and manipulating the instrument by dragging it across the image with the mouse. In an embodiment, a user may manipulate an image with virtual instruments with some form of virtual interaction devices (e.g., gloves in electronic communication with a computer system).

In an embodiment, after a particular action or modification is complete, the modification may be displayed as part of an image. Referring back to the virtual surgery described in the preceding paragraph, an incision may appear on the model corresponding to the input of the physician and sized appropriately for the heart according to the characteristics of myocardium, or other . . . that are built into the finite element model (14). Methods to model the physical properties of the heart may exist to create the manipulation portion of the model. A method to create a finite element model of the heart is written about by K. D. Costa et. al., "A Three-Dimensional Finite Element Method for Large Elastic Deformations of Ventricular Myocardium: I-Cylindrical and Spherical Polar Coordinates", Journal of Biomechanical Engineering, November 1996, Vol. 118 pp. 452-463, which is incorporated herein by reference. The physical properties of the elements of the heart on which to base the finite element equations for the features may be found in, Hunter P. J., et. al., "Modeling the mechanical properties of cardiac muscle", Progress in Biophysics & Molecular Biology 69 (1998) pp. 289-331, which is incorporated herein by reference. Modeling the diseased areas of the left ventricle has been described in Rez Mazhari, et. al., "Integrative Models for Understanding the Structural Basis of Regional Mechanical Dysfunction in Ischemic Myocardium", Annals of Biomedical Engineering, Vol. 28, pp. 979-2000, which is incorporated herein by reference. The properties of the ventricle myocardium may be found in, J. M. Guccione et. al., "Passive Material Properties of Intact Ventricular Myocardium Determined from a Cylindrical Model, Journal of Biomechanical Engineering Vol. 113, February 1991, which is incorporated herein by reference.

In an embodiment, a user may save the results from a particular modification of a feature. A user may desire to repeat a procedure modifying different features and/or modifying the previously modified feature in a different manner. A user (e.g., a physician or surgeon) may compare effects of different modifications and procedures to assist in determining an optimal procedure. A physician may save the results of a first intervention described above and repeat the procedure in a different manner (19) to compare the outcomes of different interventions. The physician may select the optimal outcomes (18) and perform the procedure in that manner. Optimal outcomes may be based on a variety of cardiac performance parameters including, but not limited to, ejection fraction, end systolic volume, stroke volume index, cardiac output, mitral regurgitation, pulmonary artery pressure, mean arterial pressure, percentage of asynergy. Optimal outcomes are very physician dependent, some physicians may prefer higher ejection fraction and may be willing to tolerate slight mitral regurgitation. Other physicians will tolerate no mitral regurgitation and accept a lower ejection fraction to achieve no regurgitation through the mitral valve. When a physician is satisfied that the intervention is the optimal possible for this patient, he may accept the intervention. A model may produce specifications to assist the physician in performing a selected intervention (20). For example, a specification may be simply a display of the final length of the chordae. The specifications for more complicated procedures may result in the production of patient specific devices, which may assist the physician with translating the virtual intervention to an actual intervention on the patient. The patient specific devices may be simple variations to the existing devices (e.g., a customized annuloplasty ring) or they may be more complex devices (e.g., a prosthetic mitral apparatus). With the information provided by the computer model the physician may proceed with the intervention as defined by the specifications with some assurance that the result is optimal (21).

In an embodiment, a computer system may compare effects of different modifications of one feature and/or different features. A computer system may compare different affects of different selected procedures at the request of a user. A computer system may automatically compare different affects of different selected procedures for a user. This may assist in automating a determination of an optimal procedure for a cardiac intervention. In an embodiment, a computer system may compare effects of entered procedures to similar procedures stored in a database to assist in determining an optimal procedure.

In a cardiac treatment embodiment, not only may different cardiac virtual surgeries be compared, but also other cardiac interventions may be compared. Other cardiac interventions may not only be compared to a virtual cardiac surgery, but may as well be compared to one another. Other cardiac interventions may include such non-limiting examples as medicinal treatment with known pharmaceutical drugs or hormonal therapy. Cardiac interventions such as these may be part of a database accessible by a user. A user may simply select particular interventions (e.g., a pharmaceutical drug) from a pull down menu or any virtual selection tool commonly known in the art.

In an embodiment, a separate model or models may be used to determine the clinical outcomes of a proposed procedure. For example, the physiological and hemodynamic conditions of the heart may be modeled. The physiological properties of the heart are well understood and are written about in numerous publications including Hurst et. al., Hurst's The Heart, McGraw-Hill, 1998, which is incorporated herein by reference.

Figure 11:
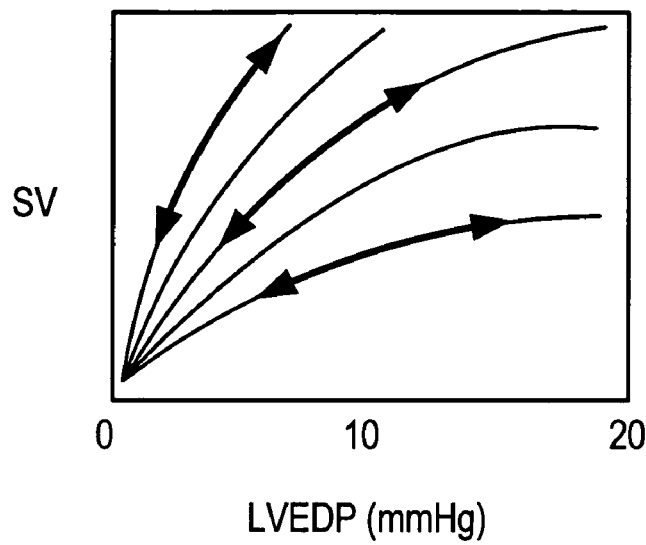
FIG. 11 depicts an embodiment of a Frank-Starling curve.
Figure 12:
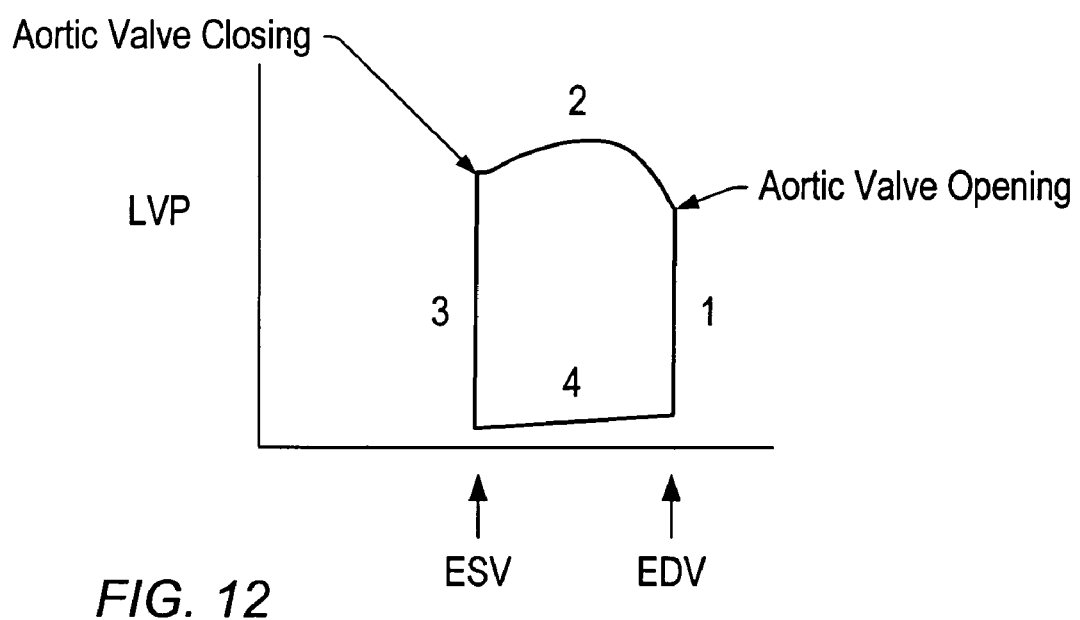
FIG. 12 depicts an embodiment of a graph of pressure volume loops during a cardiac cycle.

FIG. 11 depicts a Frank-Starling curve of a ventricle. The heart has the intrinsic capability of increasing its force of contraction when preload is increased. Preload may be defined as the initial stretching of the cardiac myocytes prior to contraction and is related to the sarcomere length. When venous return is increased to the heart, ventricular filling and hence preload (depicted in FIG. 11 as the left ventricular end-diastolic pressure (LVEDP)) increases. This stretching of the myocytes causes an increase in force generation which enables the heart to eject the additional venous return, thereby increasing the stoke volume (SV). Thus, increasing venous return and ventricular preload leads to an increase in stroke volume as shown in the FIG. 11. Frank Starling curves vary from heart to heart based on various factors, like contractility, wall stress, sphericity index, diseased state, etc. The curve that best matches a given patient may be obtained by comparing the patient specific characteristics to those of other patients in a database of other heart models (14, FIG. 3). FIG. 12 depicts an embodiment of a graph of pressure volume loops during a cardiac cycle.

A hemodynamic model, for example, has been developed and published by Professor Ying Sun, et. al., "A comprehensive model for right-left heart interaction under the influence of pericardium and baroreflex", The Amerimay Journal of Physiology, 1997, pp. H1499-H1514, which is incorporated herein by reference. The hemodynamic and physiological models may interact with the finite element model to show the physician what effect his interaction has had on the other elements and/or the whole heart. Physiological models may vary from very simple, such as an equation of a curve of Stroke Volume vs. End Diastolic Volume as in the Frank-Starling curve (FIG. 11), to much more complicated computational biology models. Hemodynamic models may also vary from simple models of the pressure drop vs. flow relationship to complex computational flow dynamics like the one published by Makhijani et. al. "Three-dimensional coupled fluid—Structure simulation of pericardial bioprosthetic aortic valve function", ASAIO Journal 1997; 43:M387-M392, which is incorporated herein by reference.

Figure 13:
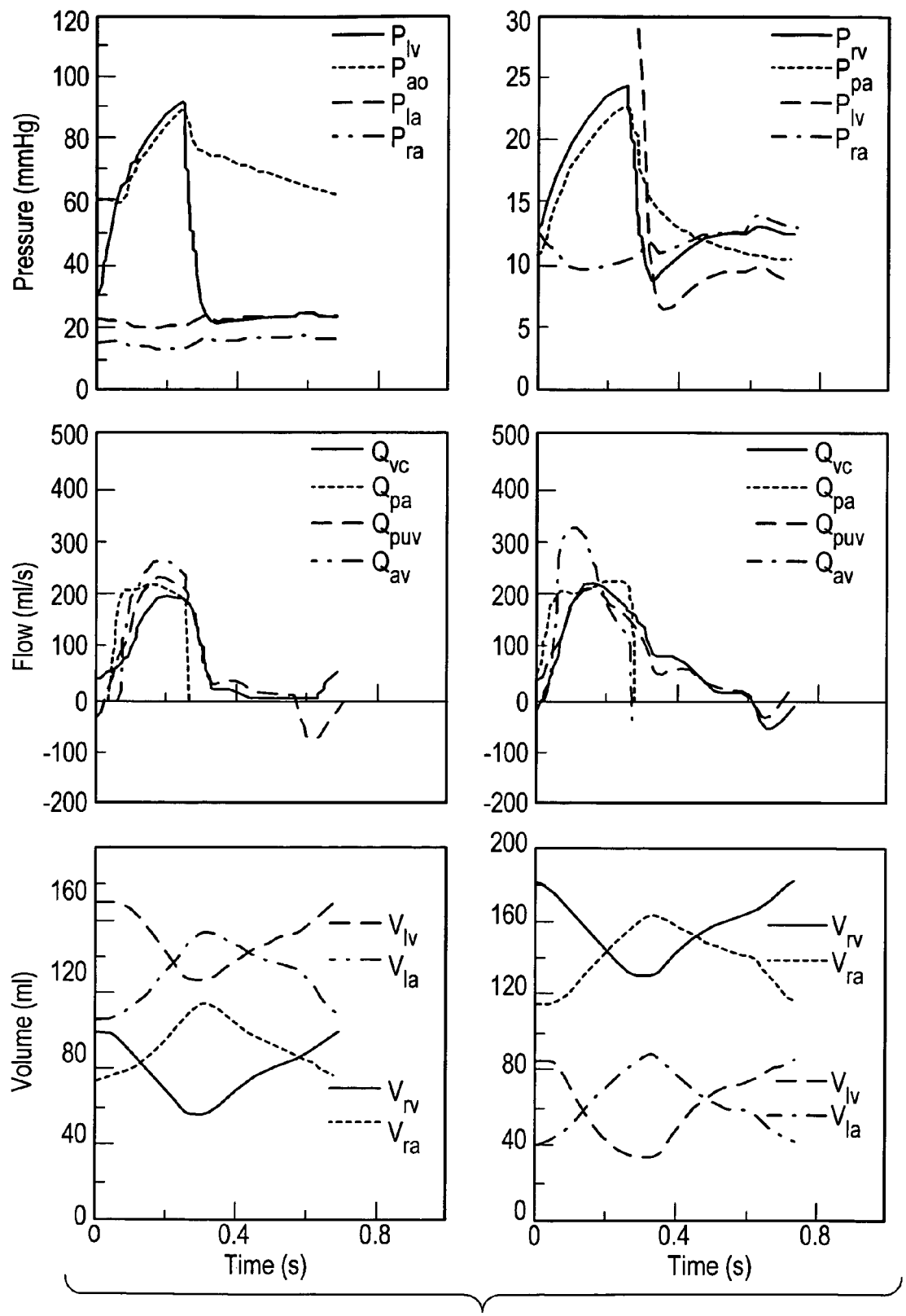
FIG. 13 depicts an embodiment of outputs from a hemodynamic model of a heart and circulatory system.
Figure 14:
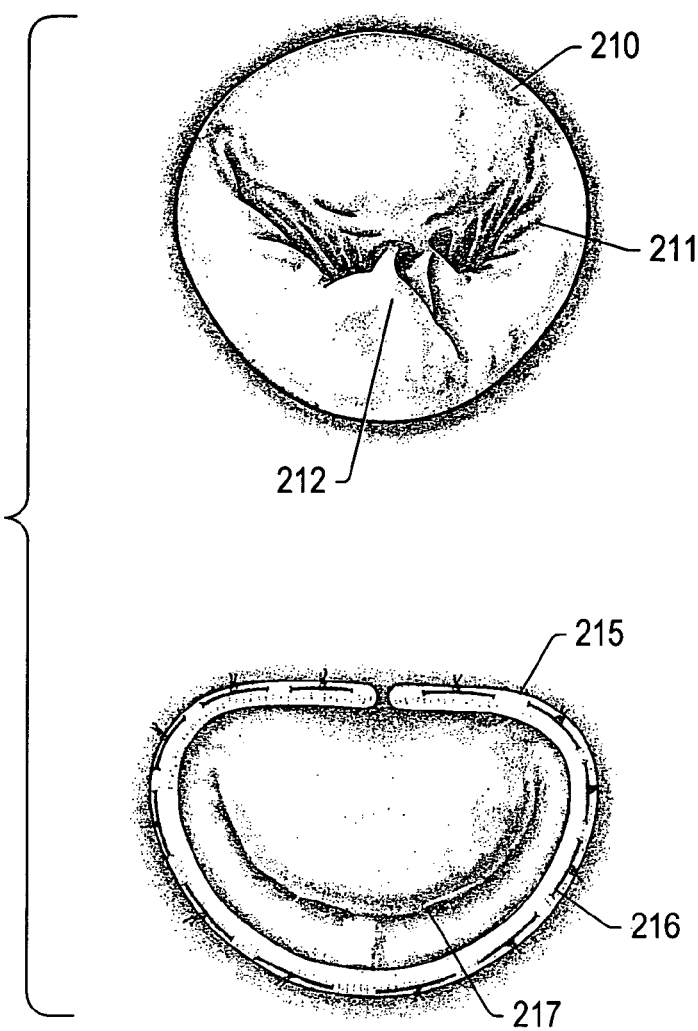
FIG. 14 depicts an embodiment of a mitral valve with an insufficiency and a valve after it is corrected with an annuloplasty ring.

In an embodiment, a placement of an annuloplasty ring may be simulated to show its effect on annulus 211, connected tissue 212, and ventricle 210 (see FIG. 14). The patient's heart may be imaged (10). The image may be converted to a finite element model (11). Software may allow the physician to select the type of treatment desired (12). The physician may be able to access a database to select a device to be used (22). An annuloplasty ring would be an example of a device selected. The model may display to the physician the mitral valve. The model may allow the physician to instruct the model on where to position the ring. In some embodiments, a model may suggest where to position an annuloplasty ring based on a desired outcome of the procedure. The desired outcome may be indicated by the physician. The model may assess which suture to use in securing the ring. The model may assess how much tension to put on the sutures. The model may assess a distance between each bite etc (13). The model may apply the intervention to the mitral valve annulus, the other elements of the mitral valve, the other components of the ventricle, and/or the heart as a whole (16). The software may recreate the image on the monitor to show the physician the effects of his interaction (17). The potential clinical outcomes (18) may be assessed through use of the model and interaction with the physiological and hemodynamic models such as the graphs depicted in FIG. 13. In FIG. 13, hemodynamics for left heart failure are on the left and right heart failure are on the right. $p_{lv}$—left ventricular pressure, $p_{ao}$—Aortic pressure, $p_{la}$—Left atrial pressure, $p_{ra}$—right atrial pressure, $p_{rv}$—right ventricular pressure, $p_{pa}$—pulmonary arterial pressure, $p_{ra}$—right atrial pressure, $q_{vc}$—flow through venacava, $q_{pa}$—flow through aortic valve, $v_{lv}$—volumen of left ventricle, $v_{la}$—volume of left atrium, $v_{rv}$—volume of right ventricle, $v_{ra}$—Volume of right atrium. In an embodiment, a simulation may show an annuloplasty ring's effect on the size and/or orientation of the annulus. A simulation may show an effect the ring may have on the connected tissue, e.g., does it affect the length of the chordae tendinae, shape of the ventricle, etc. A model may be analyzed to show the surface area of the opening of the shortened annulus, how much flow may come through that opening, and/or how the change in flow may affect the ventricle. The model may predict if there is a mitral valve prolapse.

In an embodiment, a database of medical devices (for example, the device depicted in FIGS. 14-18) may be created and accessed to allow the simulation of the devices. These devices may be tested for physical properties and the physical properties encoded into a finite element model, as has been done for elements of the heart described above. The finite element models for the devices may be stored in the database (22). The devices may be accessed by the physician by selecting the object by its common name. For example, prosthetic valves and/or prosthetic valve apparatus (mechanical and bioprosthetic) may be called upon to place different artificial valves into the heart. The performance of the heart with the different valves may be assessed to select the correct valve for the patient. The model might also give estimated values of post-surgery performance of the heart. The model may display estimated ejection fraction, regurgitation, sphericity of ventricle, volume of the ventricle, percentage of shortening on the long and short axis, and maximum and minimum flows across the valves, and/or tension in chordae. In some instances, it is likely that off the shelf devices do not provide optimum results. For example, annuloplasty rings come in various sizes. It is likely that for a given patient, when a smaller size is used, the annuloplasty ring may end up creating more than acceptable tension in the chordae. Using the next size of the annuloplasty ring may lead to mitral insufficiency. In a situation where available sizes of the device are insufficient, the model may come up with a specification for the ring that falls between those two sizes. A patient specific designed device may offer the best possible outcome for the patient.

Figure 15:
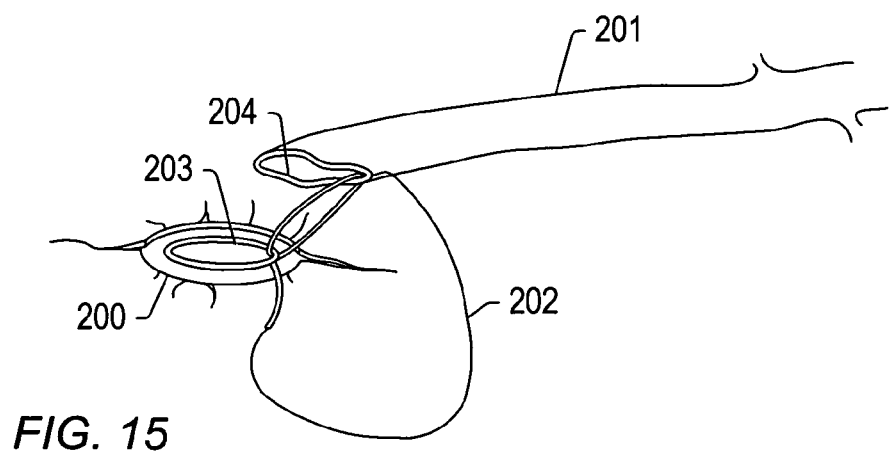
FIG. 15 depicts one embodiment of anastomosis.

FIG. 15 depicts one embodiment of a model of anastomosis in a heart. Anastomosis is generally defined as an opening created by surgical, traumatic, and/or pathological means between two normally separate spaces or organs. An anastomosis may be an artificially created connection between two structures, organs or spaces. It most commonly refers to a connection which is created surgically between two tubular structures, such as a transected blood vessel or loop of intestine. For example, when a segment of intestine is resected, the two remaining ends are sewn or stapled together (anastomosed), and the procedure is referred to as an intestinal anastomosis. Examples of surgical anastomoses are colostomy (an opening created between the bowel and the abdominal skin) and arterio-venous fistula (an opening created between an artery and vein) for hemodialysis. A pathological anastomosis may result from trauma or disease and may involve veins, arteries, or intestines. These are usually referred to as fistulas. In the cases of veins or arteries, traumatic fistulas usually occur between artery and vein. Traumatic intestinal fistulas usually occur between two loops of intestine (eneteroenteric fistula) or intestine and skin (enterocutaneous fistula). FIG. 15 depicts a virtual model wherein a tubular structure 201 (e.g., a vein) includes opening 204. Openings 200 and 204 may be coupled with sutures 202 and 203 during an anastomosis.

FIG. 14 depicts one embodiment of a model of a mitral valve with an insufficiency and a virtual model of the valve after it is corrected with an annuloplasty ring. Annuloplasty may be generally defined as any of a variety of techniques that may be used to support or repair a valve after repair. The annulus is the outer border or limit of the valve structure. An annuloplasty supports that outer ring after repair. An annuloplasty ring is a particular embodiment of a support structure that may be used during an annuloplasty procedure. FIG. 14 depicts annulus 211, connected tissue 212, and ventricle 210. To correct the insufficiency, annuloplasty ring 215 may be coupled to ventricle 210 around the mitral valve. Annuloplasty ring 215 may be coupled to ventricle 210 using sutures 216. Upon completion of the procedure, insufficiencies should be removed and result in corrected mitral valve 217.

Figure 16:
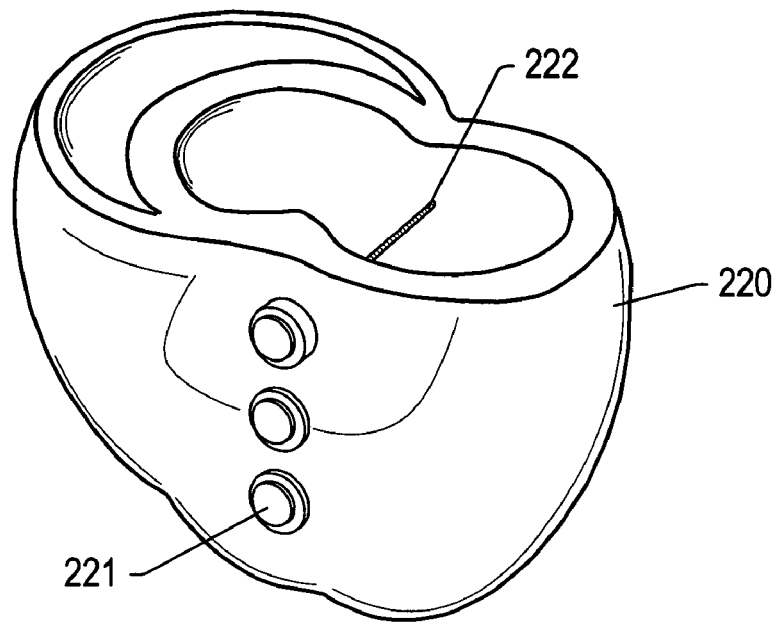
FIG. 16 depicts an embodiment of a placement of a Myocor splint.

FIG. 16 depicts one embodiment of a model with a Myocor splint. A Myocor splint essentially is a large suture that is used to create a Batista ventriculectomy-type exclusion of a portion of the left ventricle to improve left ventricular geometry and reduce wall tension. FIG. 16 depicts Myocor splints 221 and 222 positioned in ventricle 220.

Figure 17:
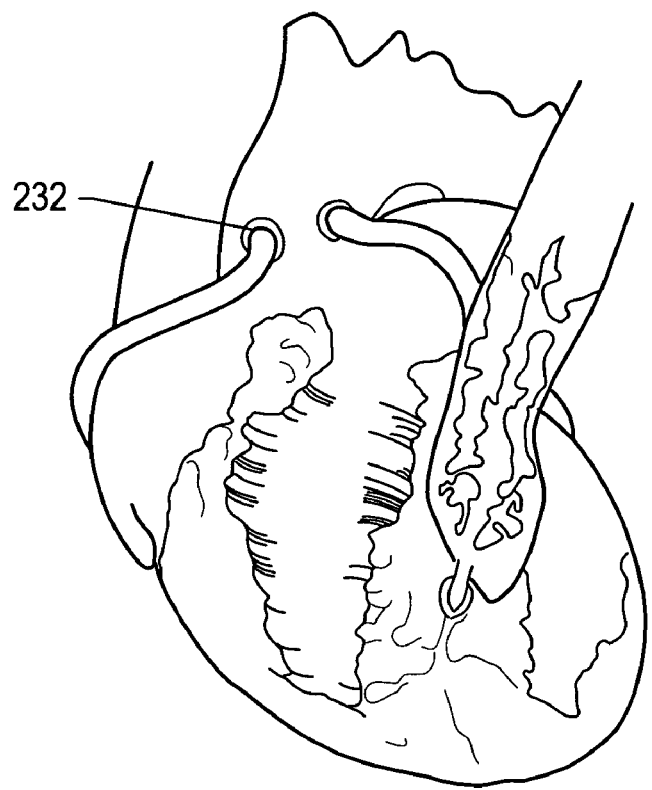
FIG. 17 depicts an embodiment of a mechanical heart valve.
Figure 18:
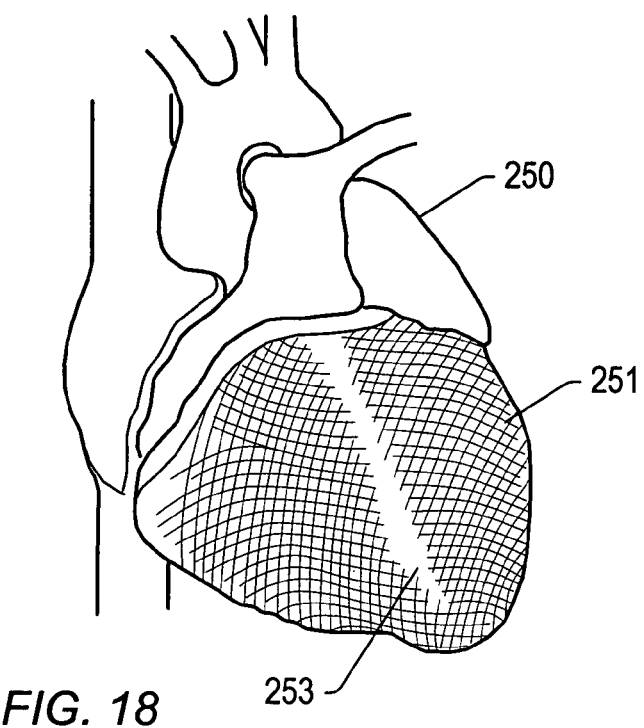
FIG. 18 depicts an embodiment of an acorn corcap.

FIG. 17 depicts a model of a mechanical heart valve 232. FIG. 18 depicts one embodiment of a model of an acorn corcap. Acorn corcap 253 may be positioned around ventricle 251 of heart 250 to prevent further dilatation and to reduce wall stress.

In an embodiment, a user may be able to enter specifications for a device in a database that is not quite appropriate for a specific patient. For example, a specification may call for a patch for a left ventricle. Patches for the left ventricle may exist in a database; however, an appropriate size may not be listed in the database. A user may enter specific specifications for a device (e.g., a patch) so that the device is closer to an appropriate size for a patient. In a situation where a device or instrument is already present in a database, a computer system may ask a user if the user desires to enter specifications different from specifications for the device currently in the database. If the user indicates a desire to enter in a new or different specification, the user may be prompted to enter data specifically tailored to that particular device. Although the computer system may be designed to automatically determine optimal specifications based on patient specific data entered, allowing a user to enter their own specification may allow for more flexibility. Advantages arising from this type of flexibility may include allowing a user to try different approaches to a procedure not outlined in an existing database. Other advantages may include assisting modeling software from becoming stuck in a local minimum of a modeling extrapolation. The flexibility of the software may be valuable as a training tool for cardiac interventions. The software may allow inexperienced surgeons to see effects virtually stemming from different approaches to conventional procedures.

In an embodiment, a method of assessing a surgical procedure on a human heart may include allowing a user to perform a modification to at least one feature of the heart using a computer system. The computer system may create an image of the modification. The created image may be at least a three-dimensional image. A performance of the user may be assessed by comparing the user's modification to a database of modifications. The computer system may assess the performance of the user. The computer system may assign a score to the user's performance. The assigned score may be relative to other performances.

In an embodiment, a user may be able to enter specifications for an instrument or device not in the database. A computer system may allow a user to enter specifications for the device in a number of formats. In much the same way the system converts two-dimensional images into three-dimensional and higher images, the system may be able to convert two-dimensional images of devices into three-dimensional images and models of devices. A computer system may be able to extract the necessary data and specifications from two-dimensional images of a device to use in virtual modeling of a surgical procedure. Alternatively, a user may enter in a set of dimensions for the specific device.

Figure 19:
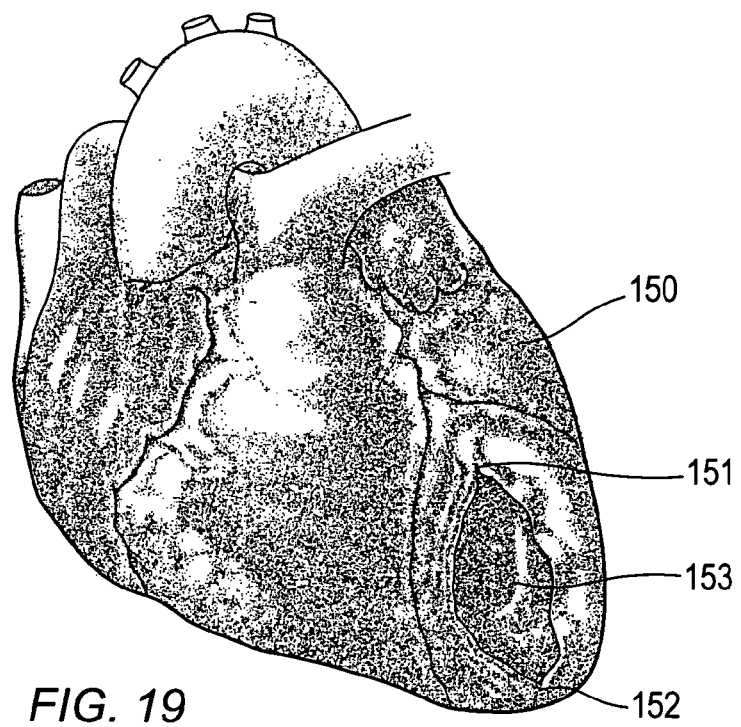
FIG. 19 depicts an embodiment of making an incision into a heart.
Figure 20:
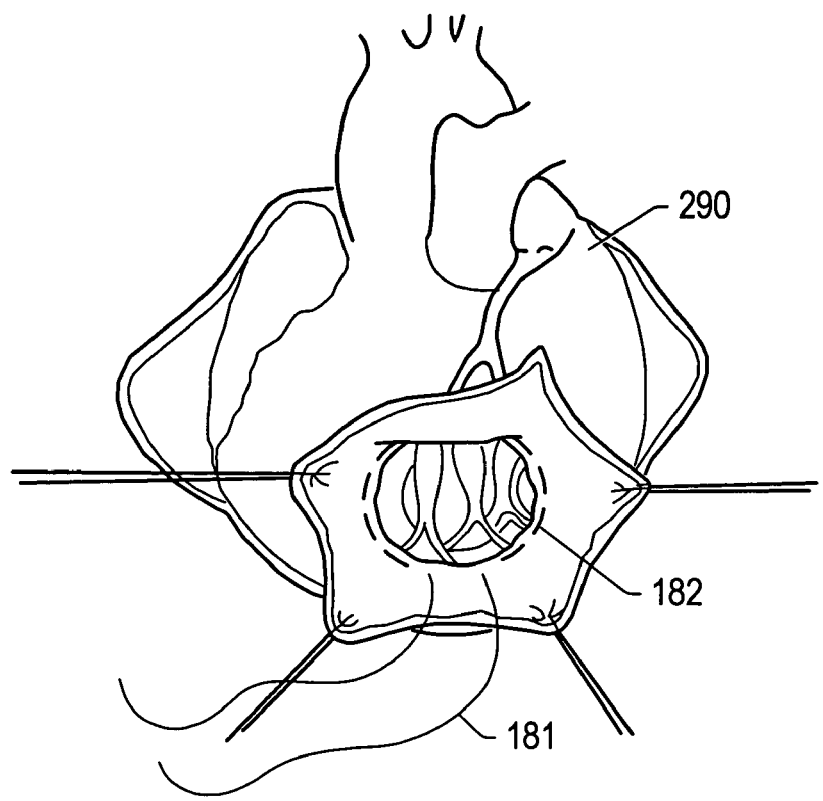
FIG. 20 depicts an embodiment of a Fontan Stitch—creation of neck for placement of a patch.
Figure 21:
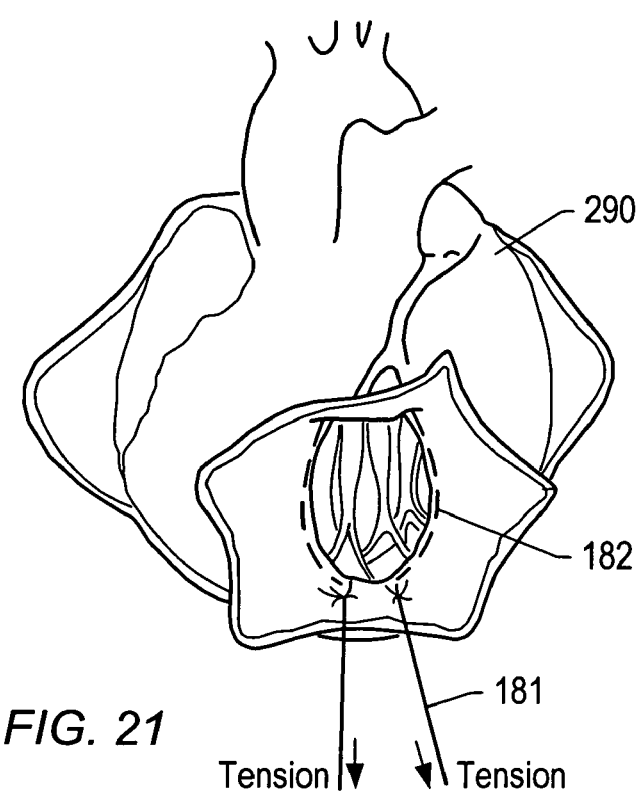
FIG. 21 depicts an embodiment of reforming a ventricle to give a new volume to the ventricle.

In some embodiments, the software method depicted in FIG. 3 may be used to model a surgical procedure. Images of a heart and specifically the ventricle are taken (10) and a finite element mesh model is created of the ventricle and of the features as described previously (11). A user chooses a treatment option (12) (e.g., surgical ventricular repair). The user, using pull down menus or another standard interactive means, chooses the implements that are needed to perform the surgical procedure (12). The physician may perform the treatment by interacting with the image and the model (13). Interacting with the model, the physician may, for example, select a scalpel. The surgeon may identify where and/or how to incise the ventricle with the selected scalpel (as depicted in FIG. 19). After a user makes an incision, the user then identifies the tissue he wants to exclude and may place a Fontan stitch 182 with suture 181, as depicted in FIG. 20. When the physician excludes tissue, the model eliminates the sections of the finite model that correspond to this area from the calculations of the ventricle parameters and outcomes. A model may keep these elements solely as graphical depictions. A model may try various degrees of volume reduction of the ventricle and/or changes in the shape of the ventricle. A computer system may attempt these types of reconstruction automatically and/or upon a request from a user. The finite element model may calculate this change in shape of the ventricle and calculate how this change has affected the other features of the ventricle and the heart.

Figure 22:
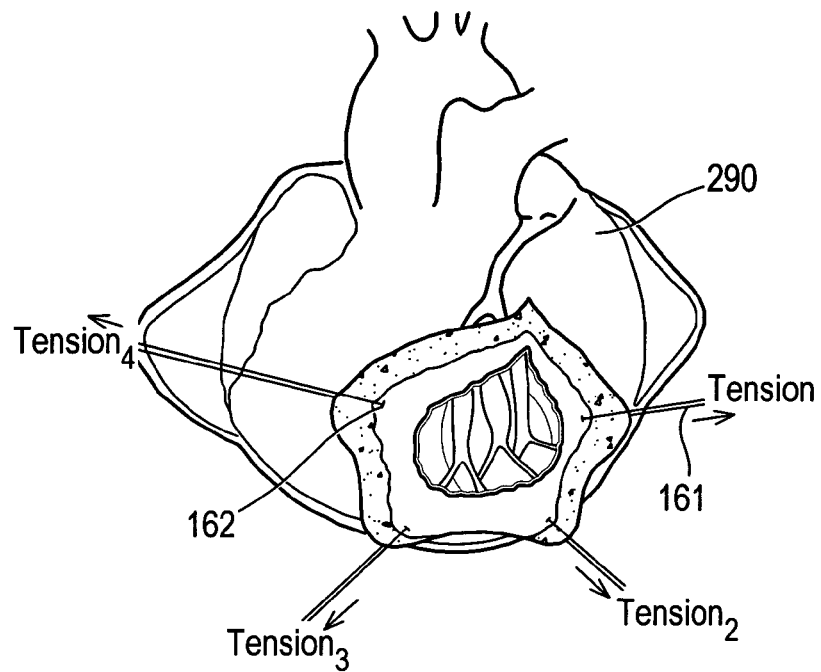
FIG. 22 depicts an embodiment of placing sutures and opening an incision in a ventricle.
Figure 23:
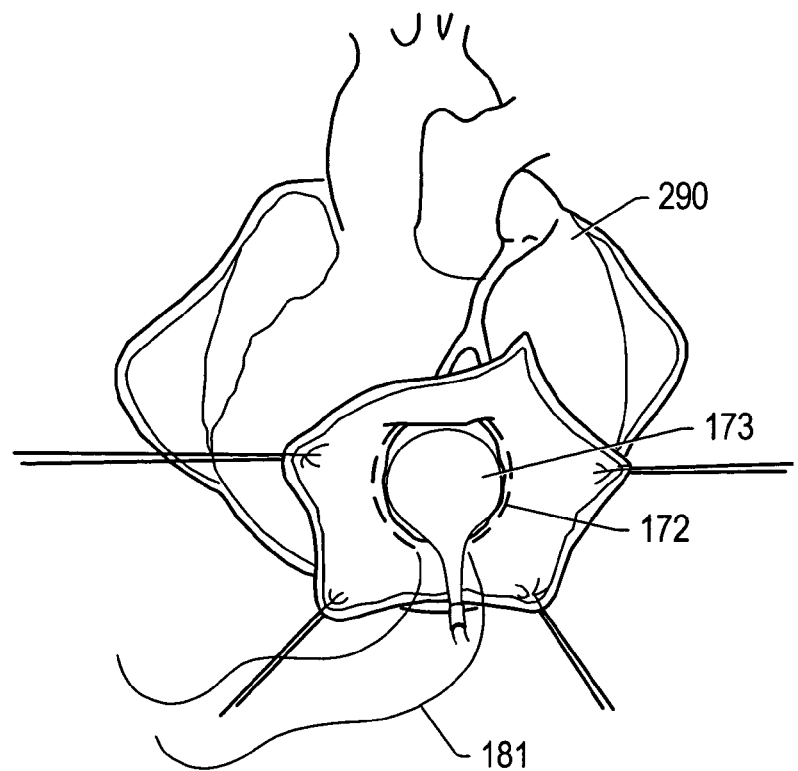
FIG. 23 depicts an embodiment of a sizing and shaping device placed into a ventricle.
Figure 24:
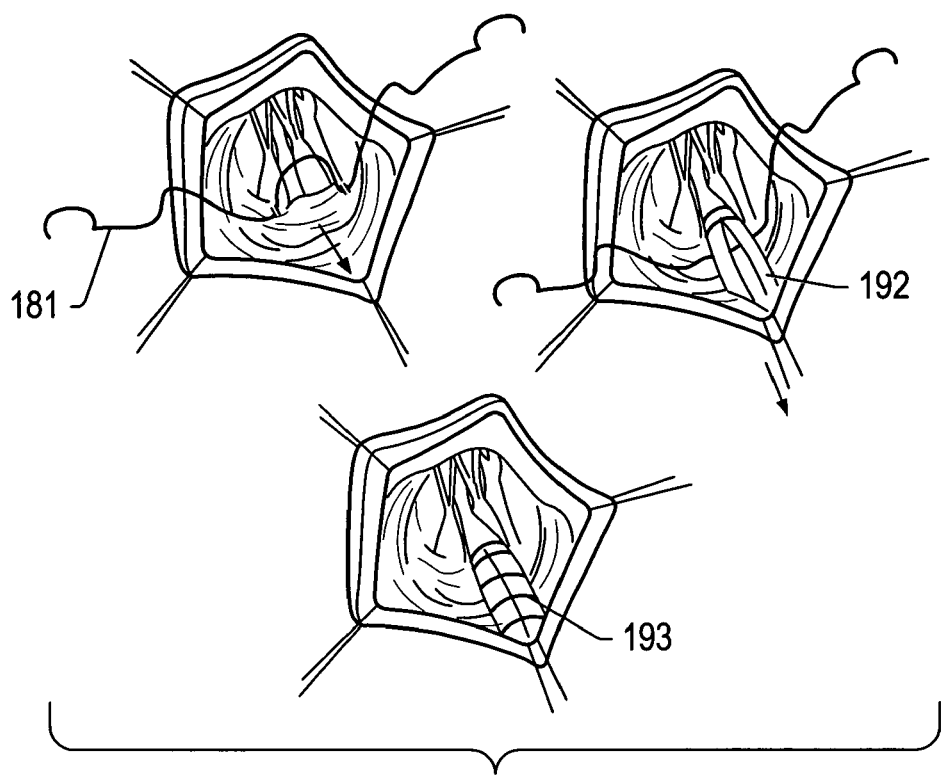
FIG. 24 depicts an embodiment of suture placement to imbricate stretched tissue.

FIGS. 19-24 depict embodiments of a sequence of a surgical procedure modeled on a virtual heart. The embodiment depicted is that of a left ventricle reconstruction. FIG. 19 depicts an embodiment of making an incision from point 151 to 152, thus forming opening 153 in ventricle 150. FIG. 22 depicts a placement of sutures 161 and 162 and opening up an incision in a ventricle during an actual surgical procedure. FIG. 23 depicts a representation of shaper 173 placed in opening 172 of ventricle 150. FIG. 23 depicts an example of how a ventricle is reconstructed during an actual surgical procedure. FIG. 20 depicts an embodiment of a Fontan Stitch. In one embodiment, during an actual surgical procedure, a surgeon may want to imbricate 193 stretched tissue 192 (as depicted in FIG. 24). During an assessment of a virtual procedure, a computer system may instruct a user what features of a heart could be modified to achieve the desired result including using such methods as depicted in FIGS. 19-24.

Figure 25:
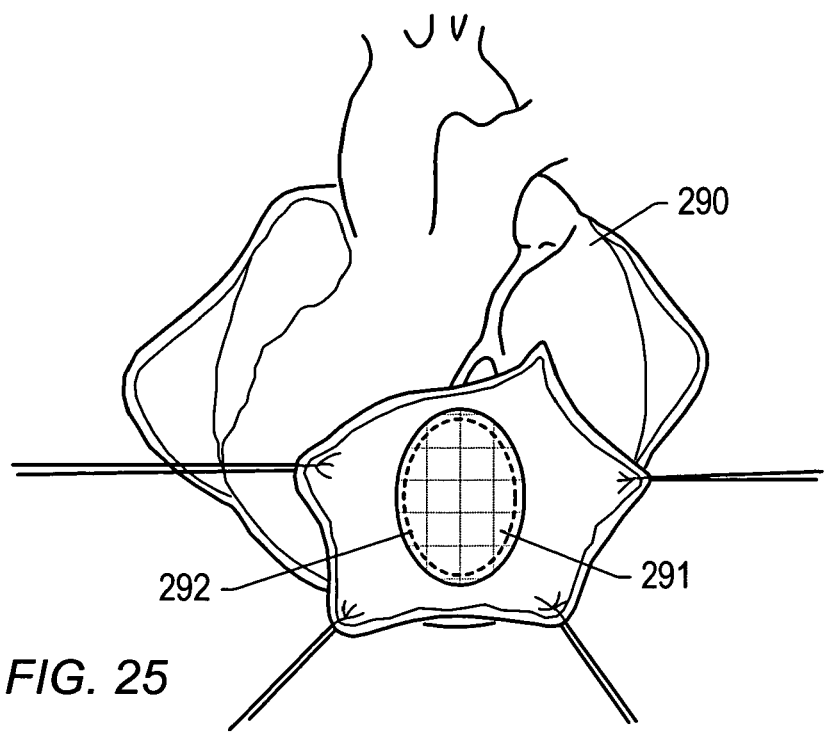
FIG. 25 depicts an embodiment of placement of a patch to close an opening in a ventricle.
Figure 26:
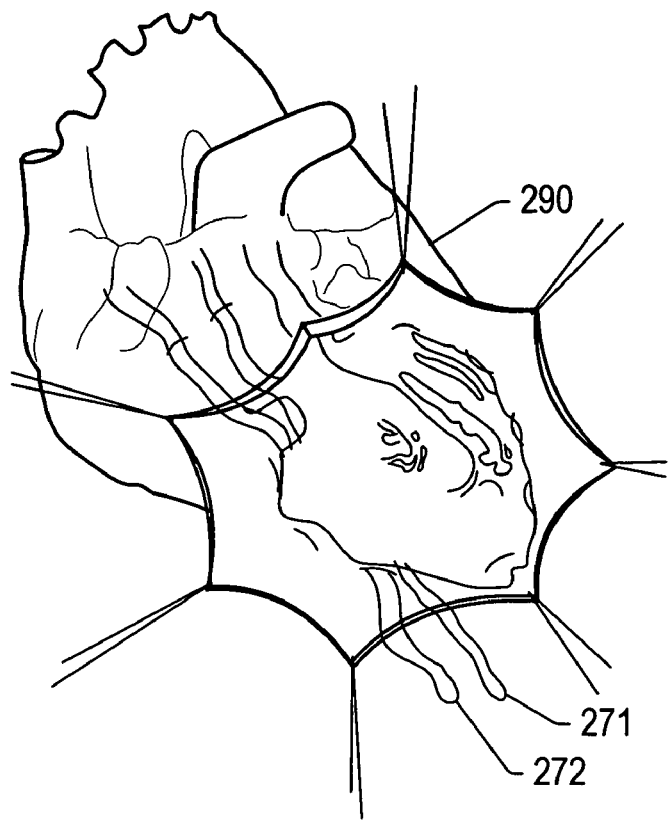
FIG. 26 depicts an embodiment of a buttress suture.

In an embodiment, as a model reshapes a ventricle to make it smaller, it may show the effect this has on other structures like the mitral apparatus. The model may show the new location of the papillary muscles, new angle of the chordae tendinae to the mitral annulus, etc. The finite element model may use known methods described herein to calculate the reaction of different features to changes in another element. For example, geometric alterations may in turn have effects on various other cardiac performance characteristics (e.g., smaller ventricles may have lower wall stress and may result in better contractility). A model may prompt a user to choose a patch to cover the opening that may be left in the ventricle and to reinforce the septum (see FIG. 25). FIG. 25 depicts an embodiment of a portion of a left ventricle reconstruction. FIG. 25 depicts patch 291 coupled with sutures 292 to left ventricle 290. If the opening in the ventricle is small (e.g., less than 3 centimeters), the model may tell the user to close the opening in the ventricle without a patch. The user may identify the suture placement locations as described previously and specify the amount of tension to be placed on the sutures. FIG. 26 depicts an embodiment of one type of suture: a buttress suture. Sutures 271 and 272 may be used to provide support to the heart. The model may depict the opening being closed with these sutures.

Figure 27:
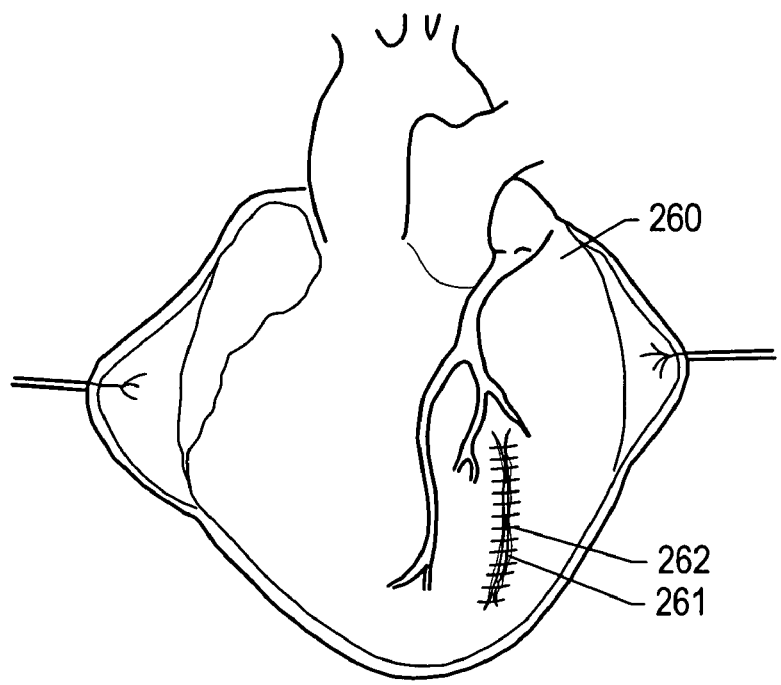
FIG. 27 depicts an embodiment of a linear closure of an opening in a heart.

In an embodiment, a model may accomplish a virtual closure of an opening by taking the boundary layers at the edge of the opening and moving them towards each other. When the boundary layers meet, the model recalculates the finite element model shapes that should depict the closure area. For example, if the finite element model is made of triangles, the triangles on the boundary layer may be smaller than the average triangle in the model. When the two smaller triangles on the boundary layers meet at the closure line, the smaller triangles may be combined into one average sized triangle. FIG. 27 depicts an embodiment of actual linear closure 261 of an opening in heart 260 using sutures 262.

In an embodiment, a finite element model embodiment may interact with an outcome predictor (16). The outcome predictor may include a hemodynamic model, a physiological model, and other models for calculating features of the heart model. These models may interact until the physiological and hemodynamic models are within tolerances of known physiological and hemodynamic constraints and/or balanced in an acceptable manner. Known physiological and hemodynamic constraints may be part of a database (14). Known physiological and hemodynamic constraints may be based on an average gathered from different resources (e.g., cardiac surgery textbooks and journals). An acceptance criteria, in certain embodiments, may be a stroke volume index (SVI) selected to be between ~22 and ~50 ml/mt$^2$, a pulmonary artery pressure (PAP) selected to be within ~10 to ~25 mmhg, an ejection fraction selected to be above ~30%, and/or an end systolic volume index (ESVI) selected to be between ~25 and ~60 ml/mt$^2$. If after 50 attempts, for example, the models do not become balanced, the software may ask the physician to alter his intervention. Once the models are balanced, the model may display the ventricle with the new shape and volume to the physician. The computer system may display potential clinical outcomes such as ejection fraction, mitral regurgitation, etc. (17). The physician may accept these clinical outcomes (18). If these outcomes are not acceptable, the physician may return to the original model and image (19) to try a new treatment. The physician may choose to modify the initial treatment with the model. The physician may perform multiple iterations of the procedure. The physician may compare clinical outcomes of multiple iterations of the procedure to determine which procedure is optimal for the patient. When the physician accepts the intervention that is optimal for the patient, the model may create specifications (20) to help the physician translate the simulated intervention to an actual procedure (21). The model may assess the size, shape and volume of the ventricle desired. The model may create a unique shaping and sizing device for the patient from this information to assist the physician in performing the procedure.

Figure 28:
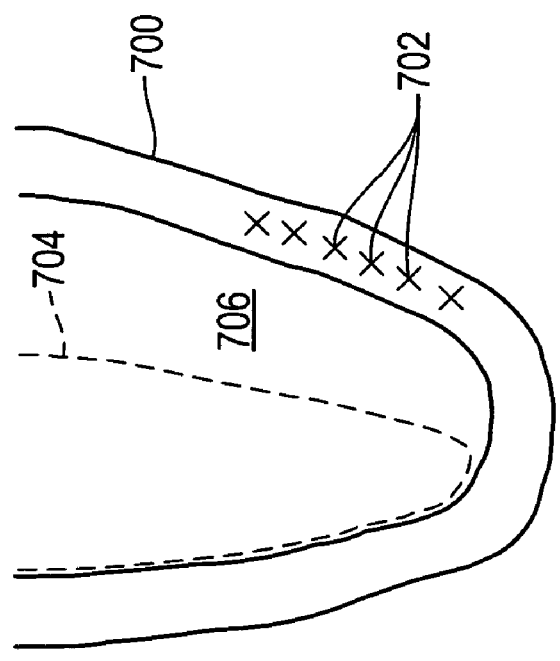
FIG. 28 depicts an embodiment of a proposed plication procedure.

In some embodiments, particular surgical procedures may be assessed by a computer system. One embodiment includes assessing a plication procedure (depicted in FIG. 28). At least one image may be provided to a computer system. A computer system may create at least a three-dimensional image of a heart. A user may modify interior chamber 706 (e.g., left ventricle) of the heart virtually. In an embodiment, a user may mark locations for proposed clips 702 on the image of heart 700. A computer system may assess a result of the proposed placement of clips 702. An image of a result of the plication procedure may be created by a computer system. For example, positioning clips 702 as depicted in FIG. 28 may result in interior chamber 706 of heart 700 being reconstructed into a shape indicated by demarcation line 704. In some embodiments, a user may virtually indicate on an image of a heart a final shape the user desires interior chamber 706 to take. A computer system may assess an optimal placement of clips 702 in heart 700 to achieve the user's desired goal.

In some embodiments, distances and angles between papillary muscles and other portions or features of a heart may be assessed using portions of an imaging method described herein. The positions and/or angles of papillary muscles to each other or to a mitral valve of a heart are useful indicators for assessing a condition of a heart. One problem with current imaging technology (e.g., MRI) is that it is difficult to determine the exact point of intersection of one or both papillary muscles. This difficulty arises from the problems of most imaging techniques in obtaining an image of the point of intersection of a beating heart.

Figure 29:
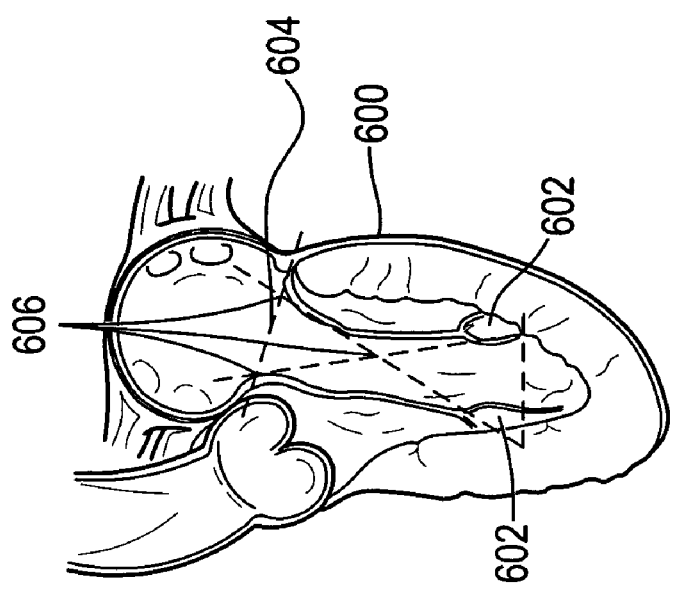
FIG. 29 depicts an embodiment of a cross-sectional view of a heart including papillary muscles and the mitral valve.

In an embodiment, a plurality of images (e.g., from an MRI) may be provided to a computer system. At least a two-dimensional image along the y-axis may be extrapolated from the images provided to the computer system (depicted in FIG. 29). In certain embodiments, at least a three-dimensional image may be created from the plurality of images. A computer system may assess the position of one or both papillary muscles 602 in heart 600. The computer system may assess a point of intersection 604 between one or both papillary muscles 602 and an endocardial wall using image enhancement and contrast identification as described herein. A computer system may assess points of intersection by comparing an image created by the computer system to a heart features database. A computer system may assess one or more angles 606 between one or more of papillary muscles 602 and mitral valve 604. In some embodiments, a user may virtually mark points of intersection on an image created by a computer system. The computer system may automatically calculate distances and angles from these reference points.

Figure 30:
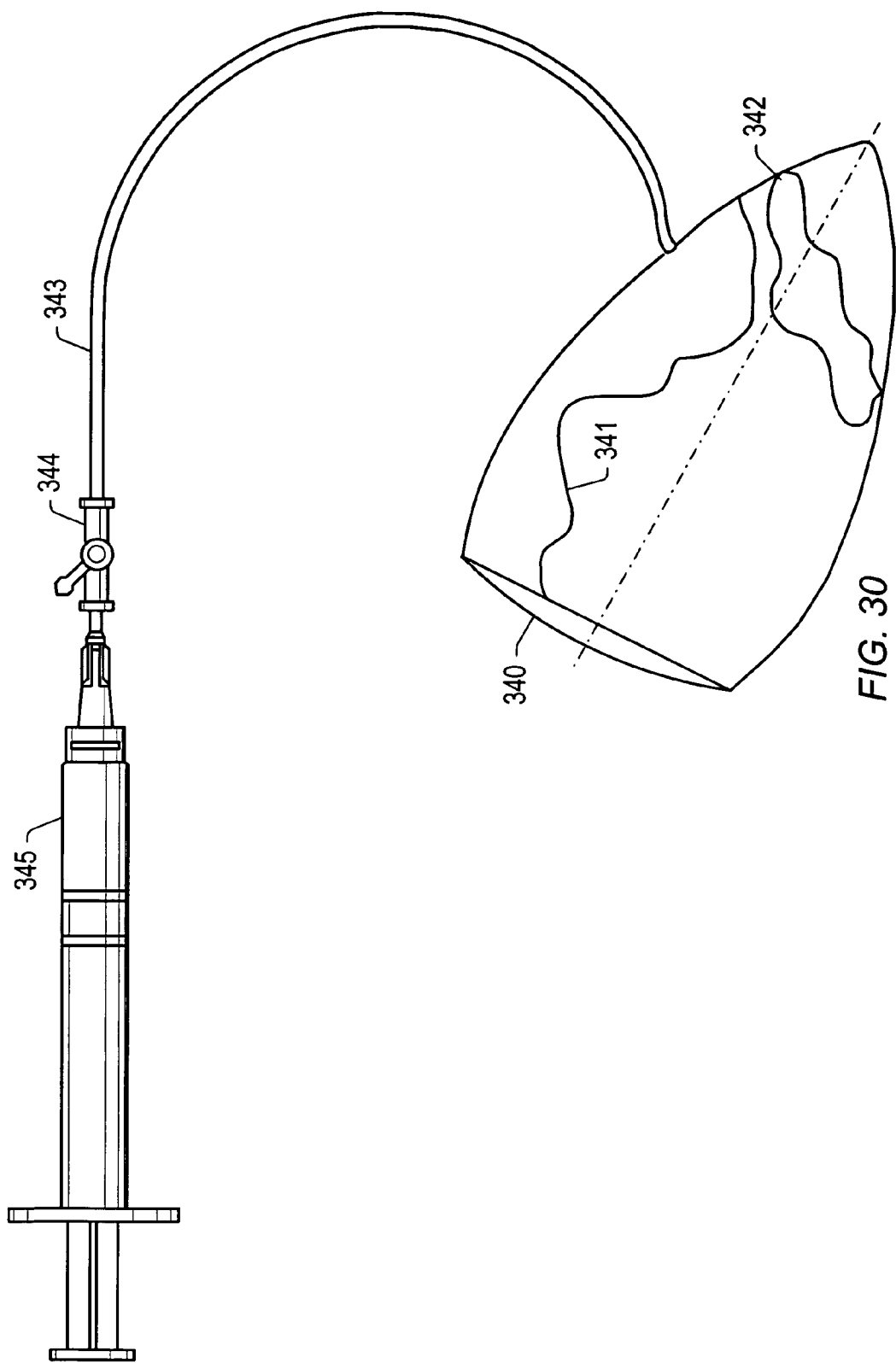
FIG. 30 depicts an embodiment of a sizing and shaping device with a location of a diseased area of a ventricle marked on its surface.

In an embodiment, a method to design surgical instruments and/or reconstruction devices based on a patient specific image of a heart may be accomplished by a computer system. For example, a method to make a custom sizing and shaping device may include generating a 3D CAD file (e.g., DXF or STL formats) that has the outline of the interior of the ventricle. A 3D CAD file may be loaded into a CNC milling machine. This machine may take the file and create a three-dimensional mandrel from the file. This mandrel may be dipped in a number of solutions such as plastisol and urethane to form a pliable balloon like object that may be taken off the mandrel. A cap of similar material may be added to the top of the shaping device. A tube for filling the shaping and sizing device with fluid may be added. FIG. 30 depicts an embodiment of a sizing and shaping device with a location of a diseased area of a ventricle marked on its surface. Shaping device 340 may be fluidly connected to elongated member 343. Elongated member 343 may be coupled to lock 344. Lock 344 may function to keep the pressure of a fluid injected into shaper 340 at a particular pressure. Fluid reservoir 345 (e.g., a syringe) may be coupled to lock 344. Fluid reservoir 345 may function to contain the fluid (e.g., a liquid or a gel). Fluid may be injected into shaping device 340 to expand shaping device 340 to a predetermined shape. Shaping device 340 may include demarcation lines 341 and 342. Demarcation lines 341 and 342 may indicate the location of a diseased area for use as a reference during an actual surgical procedure.

Figure 31:
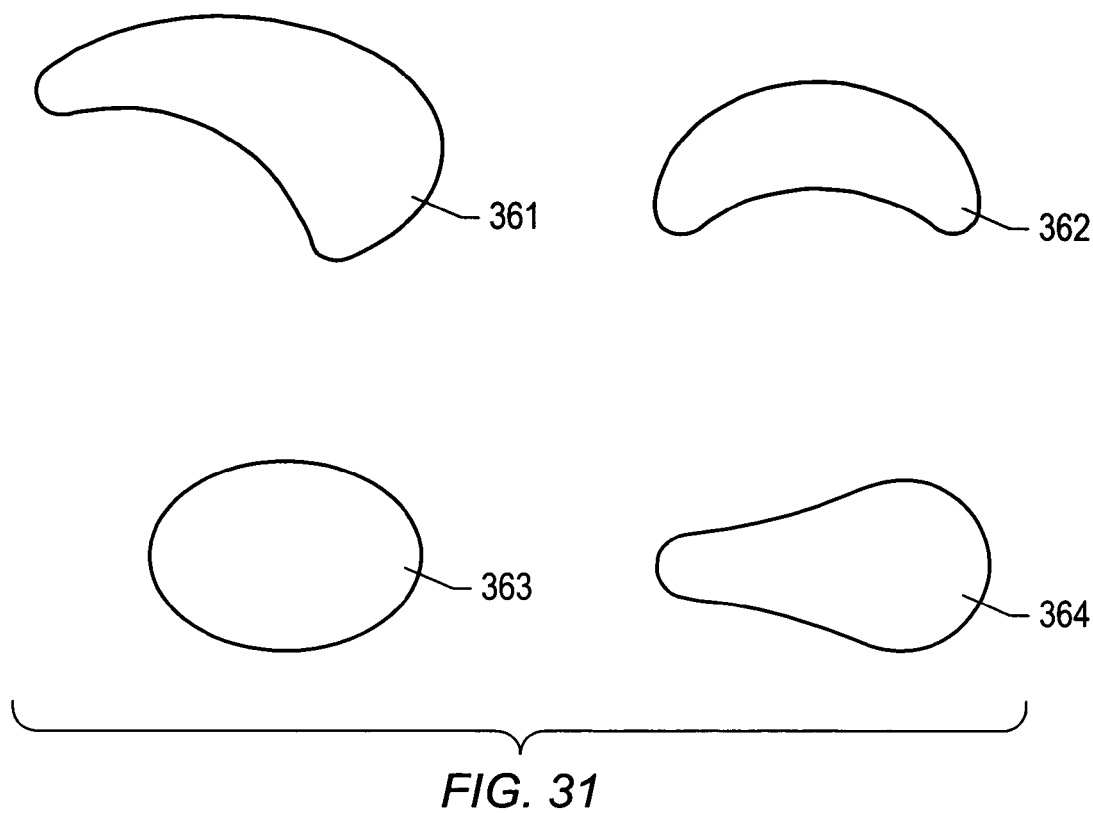
FIG. 31 depicts an embodiment of various potential patches of different sizes and shapes to seal an opening in a ventricle.

In an embodiment, an optimal solution to reconstruct a ventricle may require the use of a patch to reinforce a septum and/or close a hole remaining in the ventricle. A model may be able to show the physician what shape patch may be needed to perform the ventticular reconstruction. A specially constructed patch may be made for a patient. A method to manufacture a patient specific patch could be to purchase cardiovascular patches sold by, for example, Boston Scientific/Meadox, or W. L. Gore and Assoc. The model may generate a CAD file defining the shape of the opening in the ventricle. The shape of the opening may be printed and used as a template. The template could be placed on a patch and the patch cut to the patient specific shape and then sterilized. FIG. 31 depicts embodiments of various potential patches 361-364 of different sizes and shapes to seal an opening in a ventricle. The model may lead to other tools that help the physician implement the solution that the model has created (e.g., a patch with an apex).

Figure 32:
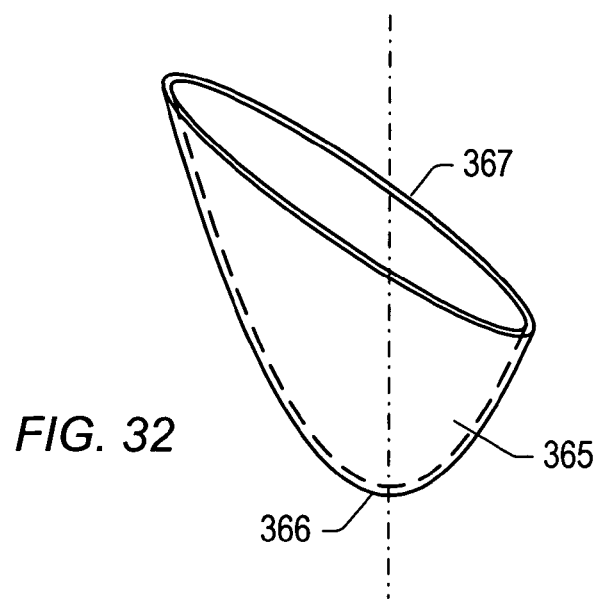
FIG. 32 depicts an embodiment of a patch that has an apical shape.

FIG. 32 depicts an embodiment of a patch that has an apical shape. Apical patch 365 may include tip 366 (e.g., an apex) and base 367. Apical patch 365 may include a concave interior surface that may function as at least a portion of the interior surface of a reconstructed ventricle. Apex 366 may function as the new apex of a reconstructed ventricle.

In an embodiment, an alternate or concurrent method may be to assess a cardiac treatment. A cardiac treatment may be assessed by constructing a patient specific model using a computer system. Specific goals may be entered by the user such as a particular size and/or shape of a left ventricle or a value for an ejection fraction. A computerized method may assess different strategies and/or procedures for achieving entered goals. The computer system may make recommendations for an optimal treatment of a diseased heart to achieve the desired goals or entered parameters. As an example of this strategy, a way of doing an SVR procedure is to start with a desired volume of the ventricle and selecting a ventricle sizer. The model may interact with the computational model of the ventricle sizer. These operations are similar to those mentioned earlier, except that the ventricle is formed over the ventricle sizer. The output of the model may be a patient specific, unique shaped patch needed to perform the intervention.

In certain embodiments, a model may interact with finite element models of many currently marketed devices such as, but not limited to: the Myocor Inc. Myosplint, depicted in FIG. 16; the Acorn Inc Corcap, depicted in FIG. 18; or a biventricular pacing from either Medtronic or Guidant. These devices and other commercially available devices may be converted into a computer model and added to a database. In each case, the model may produce outcomes of interventions using these devices. If the physician likes the outcomes, then specifications may be produced in order to transfer the results of virtual surgery to real surgery. In some instances, specific tools or devices may be generated. The physician takes these tools, devices and or specifications and conducts the procedure. In some embodiments, templates may be printed (in two-dimensional embodiments) or manufactured (in, for example, three-dimensional embodiments). Templates may assist a physician by guiding the physician through a specific procedure or cardiac intervention. A template may be "life size" (i.e., having the same dimensions as the model) or image constructed from data for a specific patient provided to a computer system.

Figure 33:
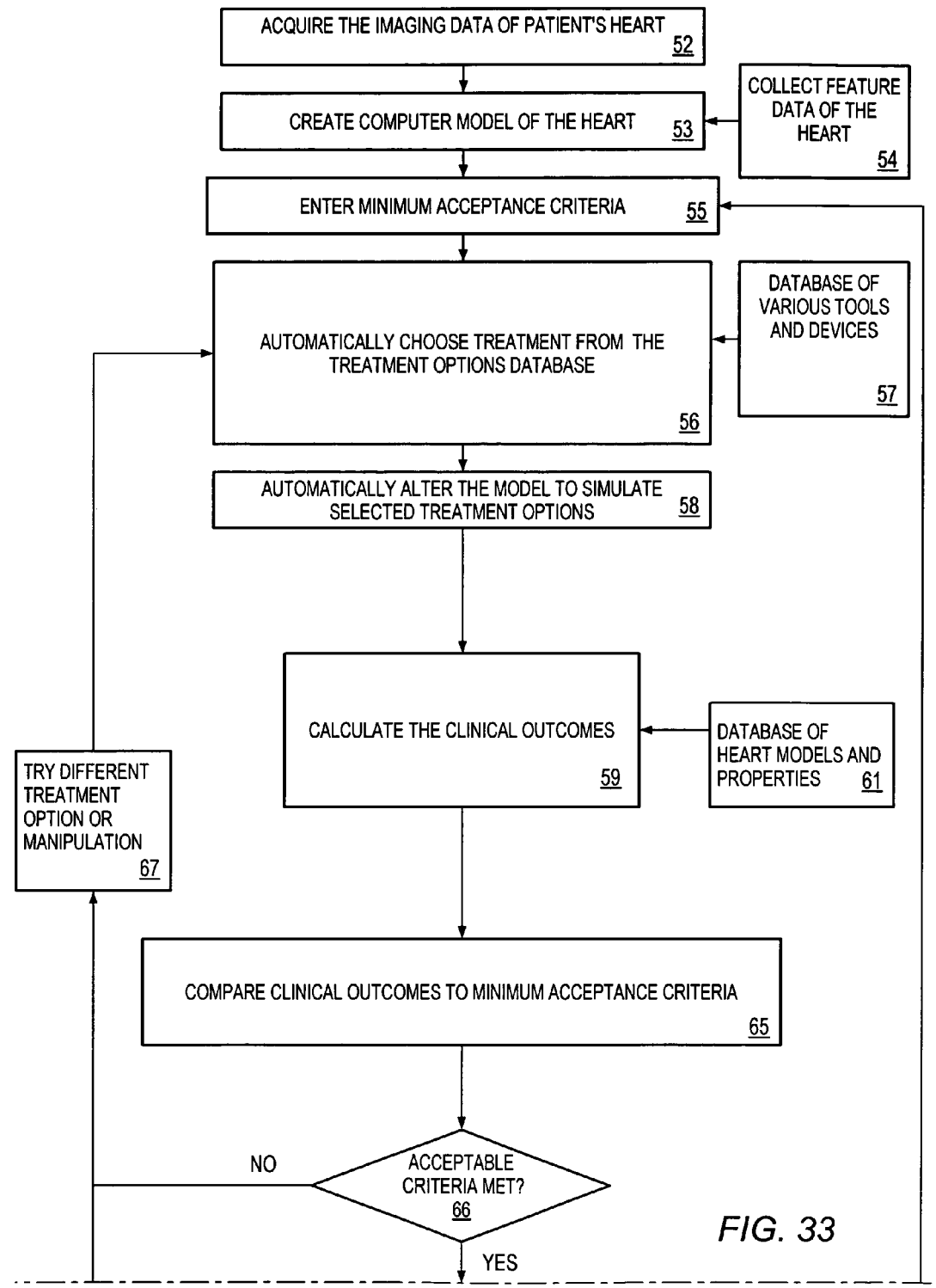
FIG. 33 depicts a flowchart illustrating an alternate embodiment of a method of a cardiac intervention.
Figure 33:
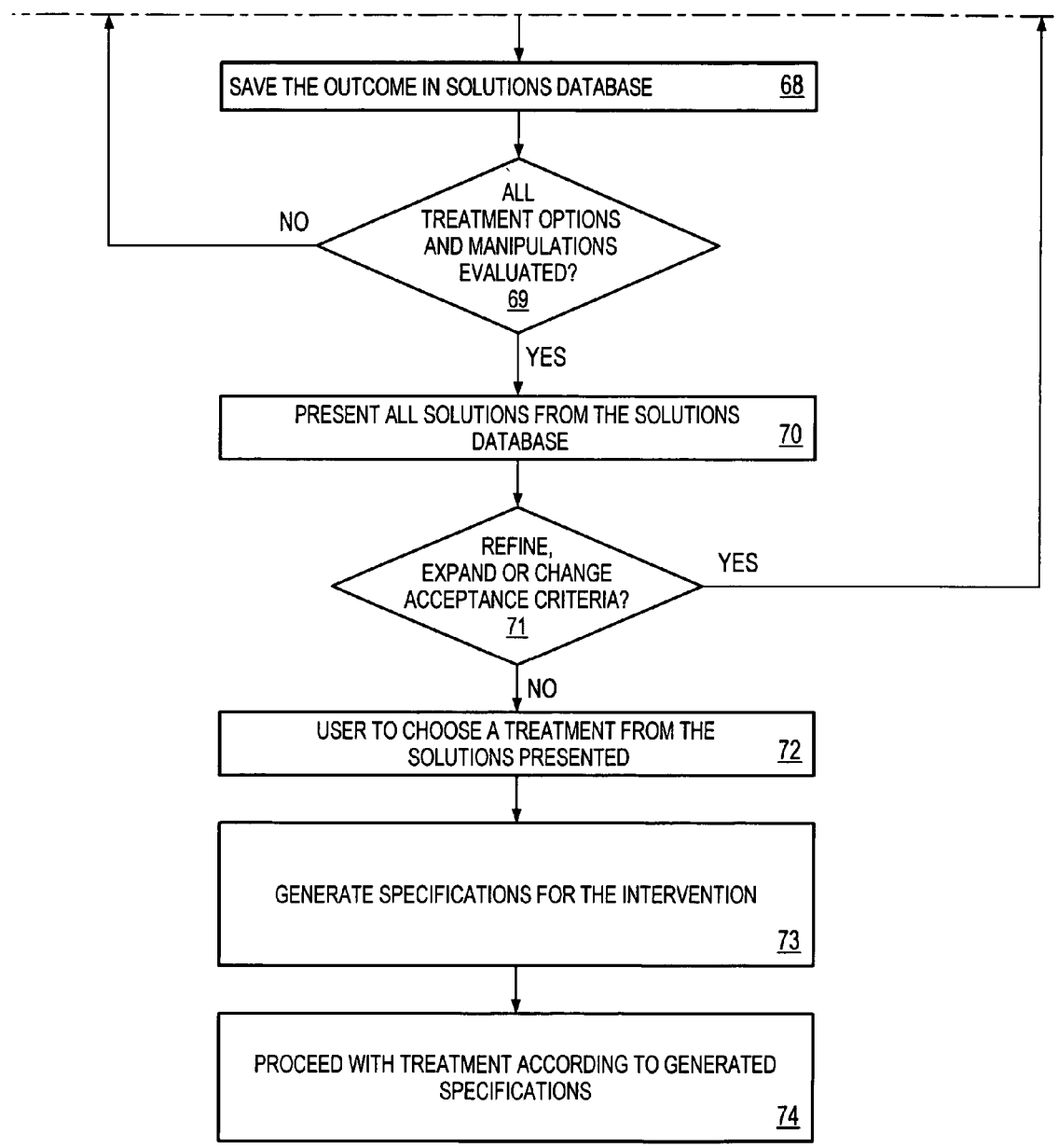

A method of modeling an intervention procedure may be performed in an automatic mode, as shown in FIG. 33. A physician could simply input a desired outcome or outcomes such as a defined ejection fraction range, ventricle volume range, etc. Software may run numerous iterations of all the different types of treatments to produce expected treatment options that meet defined criteria for that particular patient. The results may be ranked to allow the physician to select the best treatment with the best outcome. In some embodiments, software may run and supply the best possible outcome without any input from a physician besides the required data to run the software. In some embodiments, software may report to the physician that the desired outcome from a specific treatment is not possible and thereby force the physician to reconsider his selection criteria options.

FIG. 33 depicts a flowchart of an automated method for determining a treatment for a cardiac condition. The method begins with acquiring image data of the heart (52). Image data may be collected using a variety of imaging technologies that include, but are not limited to, MRI imaging, echocardiography, or PET. These imaging systems are common in most hospitals and the leading manufacturers of these systems are General Electric, Siemens, and Phillips. Additional features of the patient's heart may also be collected (54) as has been described previously.

Some or all of these features may be used to create a computer model of the patient's heart (53). In some embodiments, a computer model of the heart is a multi-dimensional finite element computer model, as described previously. Software producing the model may run on a personal computer or at a central location accessible by one or more personal computers. The computer model may be produced using a computer at one location and delivered to a different computer at another location.

A set of acceptable physiological and hemodynamic criteria may be entered in a computer model (55). Acceptable criteria include, but are not limited to, a stroke volume index, a pulmonary artery pressure, an ejection fraction and/or an end systolic volume index. The acceptable criteria may be entered by a physician or may be selected by the software based on information collected about a patient.

Software may perform an analysis of the functioning of a heart and the properties of the various components of the heart to make a diagnosis of the heart condition. Based on the diagnosis of the heart the software may choose one or more treatment options (56).

After the software has selected a treatment option, the software may automatically adjust the computer model of the patient's heart (58) to simulate the proposed treatment of the heart. The computer software, in one embodiment, may include a database (57) that includes computer models of a variety of tools and devices that may be used for a variety of treatments. Adjusting the computer model of the patient's heart may involve importing one or more of these tools or devices into the computer model from the database (57).

The computer model may be used to analyze what effects a selected virtual treatment may have on a patient's heart. The insertion of cardiac devices or the performance of a surgical technique may alter the geometry of a patient's heart. The modeling software may alter the model of the patient's heart (58) in response to the selected treatment. Additionally, the computer software may automatically determine the effect of the treatment on various features of the patient's heart (59). For example, the software may calculate physiological properties of the heart based on known properties of hearts. The results of these calculations may be used to create a new model of the patient's heart.

After the modifications have been performed on the heart, the software may assess if the modified heart meets the selected or entered minimum acceptable criteria (65). If the modified heart model does not meet these criteria, the software may alter the proposed treatment or select a different treatment (67). The altered or new treatment may be used to create a new model. This process may be repeated until the properties of the heart as modified by the selected treatment meet the minimum acceptable criteria (66).

After the minimum acceptable criteria have been met, the treatment and model of the heart after performing the treatment may be saved in an outcomes database (68). The outcomes database may include one or more potential treatments to remedy the diagnosed heart condition. An advantage of using an automated system is that all treatment options may be evaluated. Thus, after a treatment has been saved into the outcomes database, the software may assess if all treatment options have been evaluated (69). If alternate viable treatments have not been evaluated, the software may select one of the alternate treatments for evaluation. Evaluation of this alternate treatment may use the same iteration process described above to determine if any useful outcomes may be developed by alternate treatment. Any acceptable outcomes may also be stored in the outcome database. In an embodiment, the process may be repeated until all viable treatment options have been evaluated.

After at least a portion of the automated analysis has been completed, software may indicate to the physician that treatment options have been determined (70). The physician may access these treatment options and use the displayed information to diagnose the outcome of the proposed treatment on a patient's heart (70). Diagnosing the effect of the procedure on a cardiac irregularity (including, but not limited to, structural, chemical, and/or electrical irregularities) may include comparing the simulated computer model of the outcome of the treatment to what is generally accepted to one skilled in the art as a healthy/normal heart. Cardiac treatments may be assessed/determined by analysis of a model of each procedure (procedure not being limited merely to a surgical procedure). Treatments may also be assessed relative to a database of heart models 61. The database of heart models may include, but is not limited to, data from prior cardiac surgical procedures and/or treatments, expert opinions (e.g., cardiac surgeon specialist's opinion), and/or data derived or extrapolated from prior cardiac surgical procedures/treatments or expert opinions.

In some embodiments, software may not be able to find outcomes that meet the minimum acceptable criteria set forth by the physician or the software. In some embodiments, the proposed treatments and the outcomes selected by the software may be unacceptable to the physician. In either case, the physician may decide to alter the minimum acceptance criteria (71). Altering the criteria may include expanding the range of acceptable parameters. Altering the minimum acceptable criteria may restart the automatic iterative process of determining a potential treatment.

After one or more outcomes have been generated, the physician may access the outcomes database to determine if the outcomes are acceptable (72). When the physician accepts one of the potential clinical outcomes, the model may produce specifications for the selected treatment (73). These specifications may lead to the development of a template for or tools or devices to guide the physician in translating the virtual intervention on the model to the actual intervention on the heart (74). Tools and devices may include cardiac instruments such as ventricle patches, ventricle shapers, and sizers. A computer system may assist in designing cardiac instruments using the images as a model to produce patient specific devices. In some cases, templates, tools, or devices may not be needed to perform the intervention and specifications. Additional devices may be generated from the models to help the physician implement the surgical procedure that the model has predicted to provide the best outcome.

Figure 34:
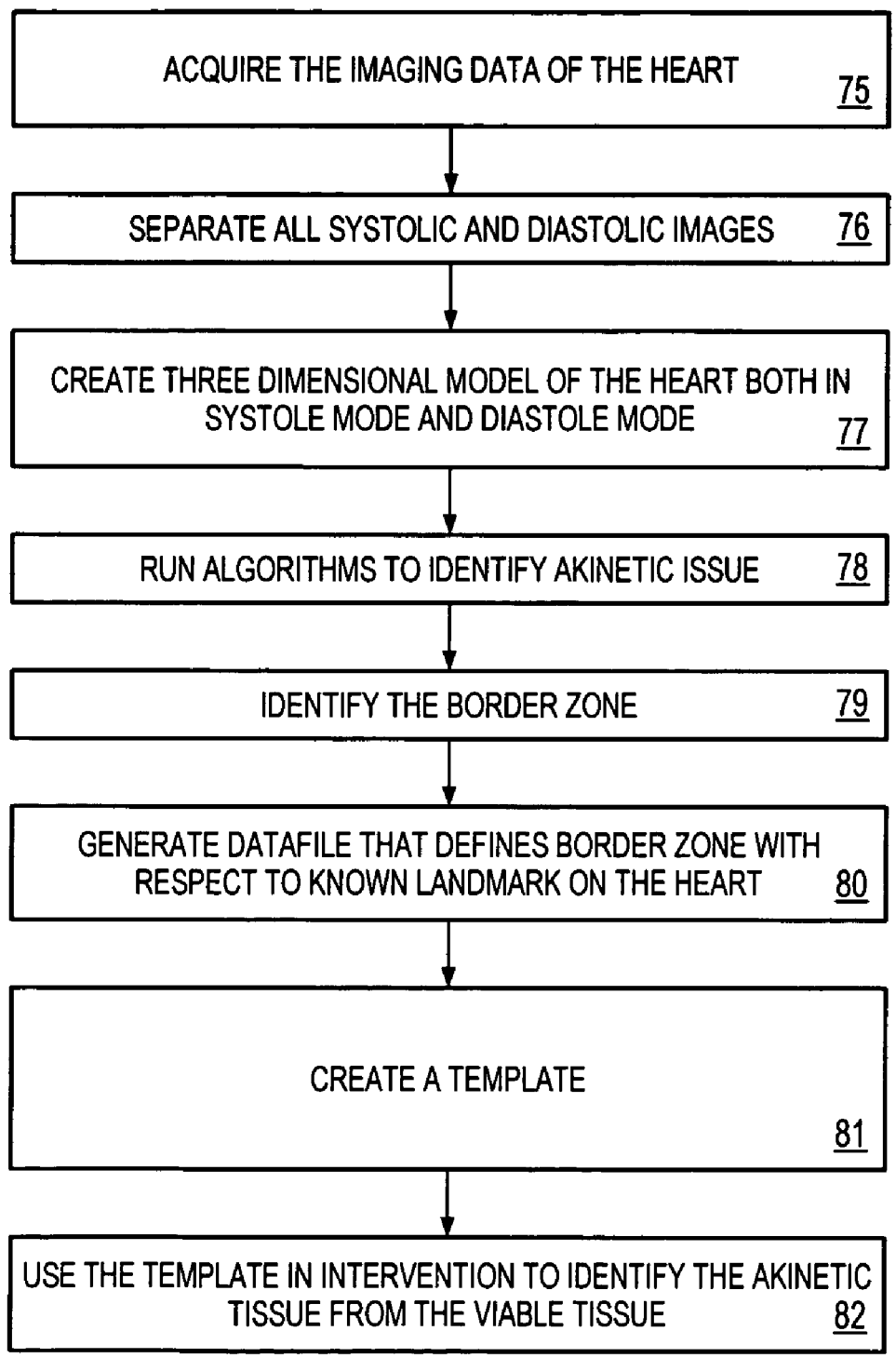
FIG. 34 depicts a flowchart illustrating an alternate embodiment of a method of a cardiac intervention.

A process for determining the akinetic segments of a patient's heart is depicted in FIG. 34. Before treatment, in order to assess which areas of the heart may need to be repaired or replaced, the patient may undergo an imaging procedure such as an MRI scan, PET scan, or an Echocardiography scan to determine the location and condition of the components of the heart. Initially, imaging data is collected of the patient's heart (75). Since the images are captured of the patient's heart while it is beating, the stage of beating that the heart is in is taken into account when creating a model of the heart. In one embodiment, the systolic and the diastolic images of the patient's heart are separated (76). These separated images may be used to create separate, three-dimensional models of the heart in systole mode and diastole mode (77).

In an embodiment, the patient's current ventricular anatomical landmarks may be determined by manually tracing the epicardium and endocardium. In certain embodiments, the patient's current ventricular anatomical landmarks may be determined by automated border detection software, which may quickly outline the location of different structures within the ventricle from the imaging data (80). This information may be converted into a multi-dimensional picture of the heart that may include all valves, arterial and venous structures of the heart (81). Parts of the valve apparatus, which may not fully appear with the automated border detection software (e.g., chordae tendinae) for example, may be quickly hand traced to complete the four-dimensional dataset. The multi-dimensional image may show regurgitation across the valves using different color gradients to show severity, as is currently done with echocardiography.

One of the problems surgeons confront while doing an SVR procedure is how to determine the demarcation line between viable and akinetic tissue. For this purpose, a non-interactive model, which may show the location of a diseased area of the ventricle (82), may be developed using a method as shown in FIG. 34. The model may show on the image areas of the ventricle that are akinetic or dyskinetic to determine areas that might be excluded during an SVR procedure. A variety of different algorithms may be used to identify akinetic tissue (78). Borders of the akinetic tissue may be identified (79).

Figure 35:
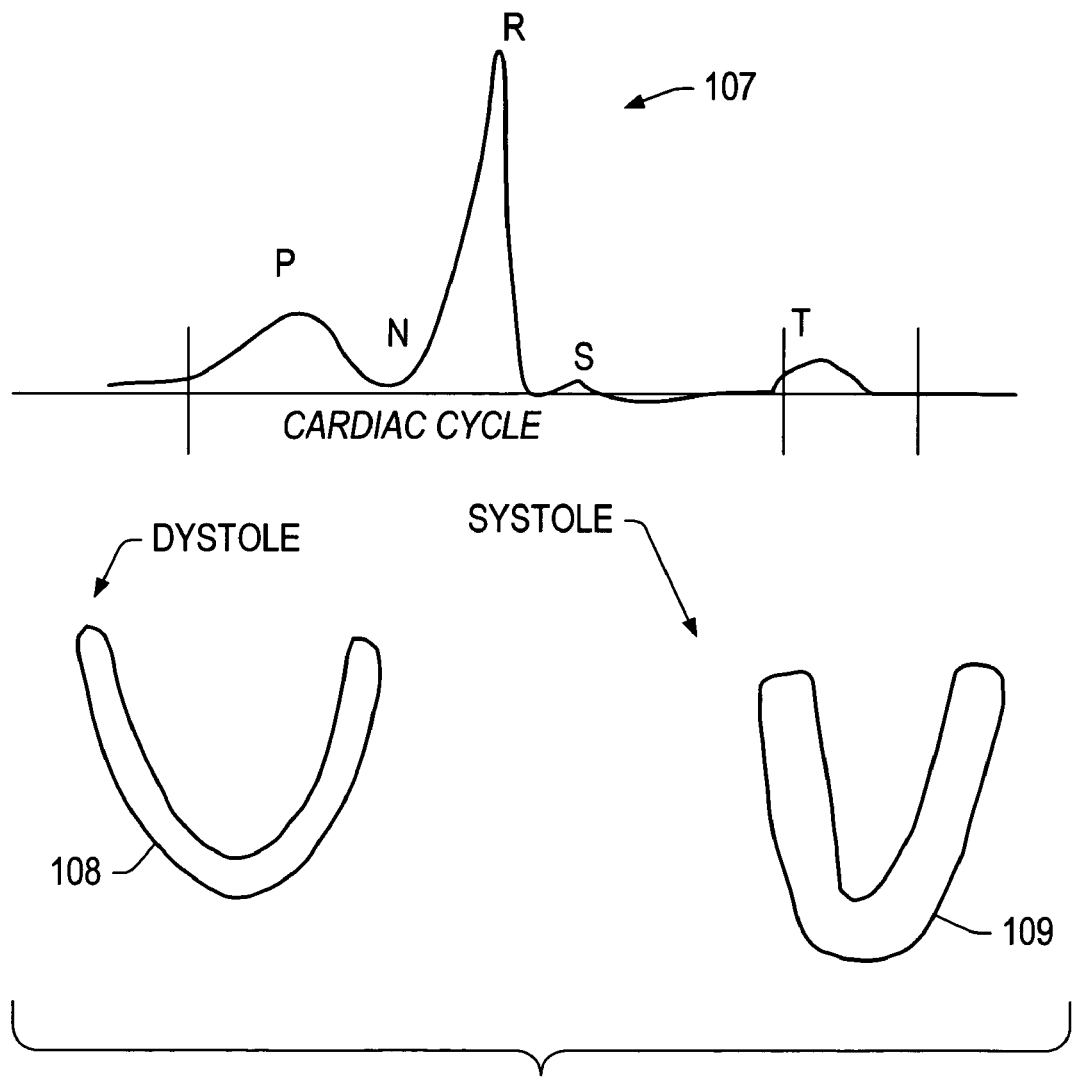
FIG. 35 depicts an electrocardiogram and images of a ventricle during various stages of a cardiac cycle.
Figure 36:
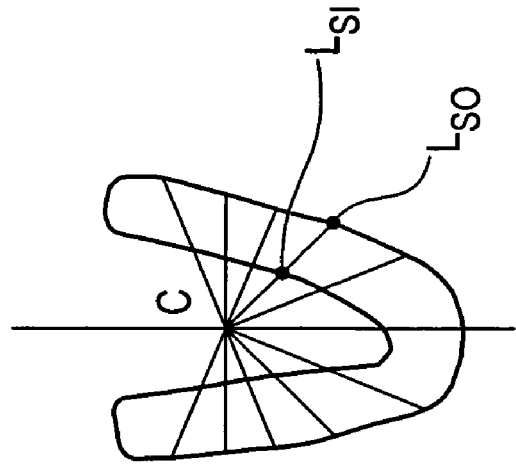
FIG. 36 depicts an embodiment of a comparison of systole and diastole images of a ventricle to show effect of wall thickening.
Figure 36:
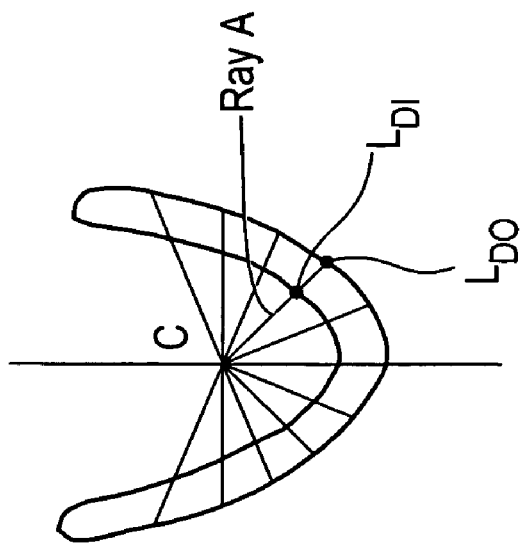
Figure 37:
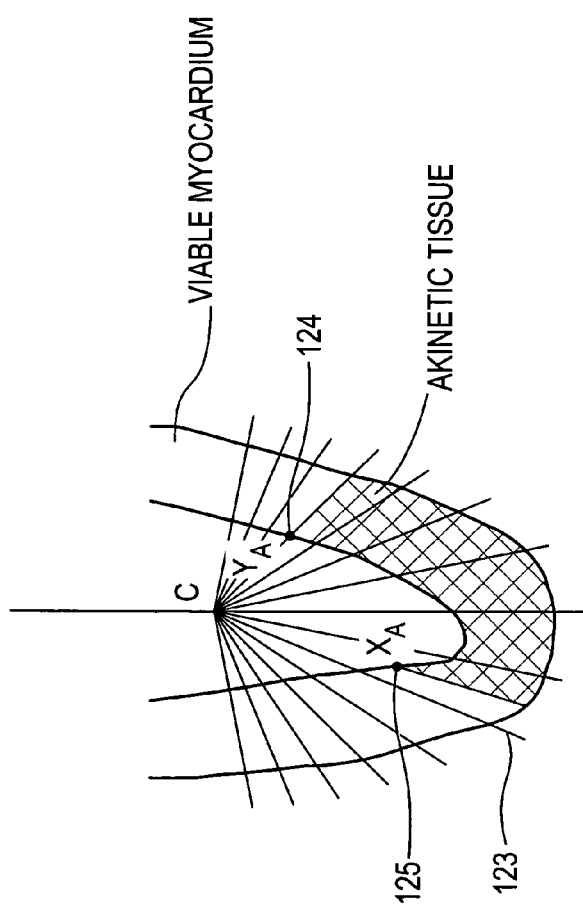
FIG. 37 depicts an embodiment of a comparison of systole and diastole images to determine a border zone between akinetic and functional tissue.

One method of identifying akinetic tissue is to use images from an MRI or echocardiography. These images may include a combination of sections of the heart imaged during one cardiac cycle, so that each section contains a complete cycle. These sections may be combined to create one composite image. FIG. 35 depicts electrocardiogram 107 displaying a full cardiac cycle from dystole 108 to systole 109 of a heart as an example of a measured cardiac cycle. The images at the end of systole and the end of diastole are identified, shown in FIG. 36. These images are overlaid by aligning markers that do not move (e.g., the aortic valve annulus) and a grid pattern is superimposed on these images, as shown in FIG. 37. Each intersection of the grid that intersects the epicardium and endocardium may be identified.

In an embodiment, a geometric center of the heart is calculated and imaginary lines (rays) 123 are drawn from the geometric center (shown in FIG. 37). Two points on each ray may be recorded. A point is defined as a point of intersection of a ray to the endocardium and/or epicardial boundary. For instance, $X_A$ 125 and $Y_A$ 124 are points on the border zone in this plane. The distance between these two points gives the wall thickness (d). Wall thickness is calculated on the diastole image $d_d$ and on the systole image $d_s$. As shown in FIG. 36, the wall thickness at the diastole is $d_d = CL_{DO} - CL_{DI}$. Similarly, the wall thickness at the systole is $d_s = CL_{SO} - CL_{SI}$. Typically, $d_s \approx d_d$ when the heart functions normally, because the myocardial wall thickens during systole to create pumping action. If a section of the heart muscle is diseased then $d_s \approx d_d$, which means that a portion of the wall is not thickening. The portion not thickening is referred to as akinetic tissue, which could be either dead or non-contributing tissue. All the rays that correspond to akinetic tissue are identified (all rays where $d_s \approx d_d$) by analysis of the collected images. A boundary layer of the akinetic area is established by comparing each of the akinetic rays to its neighboring rays. It is generally accepted that if a wall thickness of a portion of a heart is less than 5 mm, then that portion is effectively akinetic. For any given akinetic ray, if at least one of its neighboring rays is kinetic ($d_s > d_d$) then that akinetic ray is the boundary layer ray. Once all rays on the boundary layer are identified, the point of intersection of the boundary layer rays on the endocardial boundary defines the border zone between the viable and akinetic tissue. In an embodiment, a computer system may create an image of an assessed wall thickness. An image may include progressive coloring to differentiate an extent of wall thinning and/or dead tissue (e.g., when the wall thickness is less than 5 mm).

In an embodiment, a degree of transmurality of a scar (e.g., diseased or nonviable tissue) may be assessed using a computerized method based on, for example, enhanced MRI imaging. Transmurality of a scar in a portion of a heart is generally defined as the extent or depth of scar tissue through a wall of a heart. Generally, scar tissue may be found starting on the interior wall of a chamber of the heart. As scar tissue worsens, the scar tissue generally spreads outward to an exterior wall of the heart. Scar tissue typically begins forming on the interior of the heart because vessels deliver blood to the exterior tissue first and the interior tissue last. Therefore, if there is an interruption of blood flow, interior cardiac tissue may be the first to suffer stress and/or disease. Using imaging (e.g., enhanced MRI imaging) viable tissue may be assessed using a computer system to assess a contrast between different portions of an image of a heart. In an embodiment, an image may be created of an assessed transmurality. Progressive coloring may be used to display an extent of transmurality.

In an embodiment, similar methodology described above for creating a three-dimensional image and identifying a border of a portion of a heart may be employed to assess the volume of a portion of a heart. Once a three-dimensional image has been created, standard methodologies may be employed to assess the volume of a portion of a heart in the three-dimensional image. Specific examples of volumes that may be assessed include, but are not limited to, the end diastolic volume and the end systolic volume of a heart. A computer system may assess a volume of a portion of a heart in an automated fashion. Potential advantages over current technology may include increasing the accuracy of an assessed value for a volume.

In certain embodiments, viable and nonviable tissue may be assessed by creating multi-dimensional images from one image or a plurality of images. Images from enhanced MRI may be used. Images may be enhanced by using dyes ingested by the patient. These dyes dramatically increase the contrast of two-dimensional images collected by an MRI. Many dyes specifically work to increase the contrast in images between viable and nonviable tissue. The contrast increase is due at least in part to the fact that blood does not adequately circulate through nonviable tissue, which inhibits permeation of any dye into nonviable tissue. An example of an enhanced MRI imagining technique is gadolinium enhanced MRI. An increased contrast may allow a computer system to assess viable and nonviable tissue by analyzing the dye enhanced areas of the MRI images.

In an embodiment, a computer system may be provided at least two images. At least one image may include an unenhanced low contrast MRI image. At least one additional image may include a contrast-enhanced image (e.g., gadolinium contrast enhanced). A computer system may employ contrast-enhanced images to assist in assigning features of a normal or low contrast MRI image. Commonly identified features of the enhanced and unenhanced images may be used as reference points by the computer system to align the two images. Once the two images are aligned, the enhanced image may be used to identify borders and features of the unenhanced image.

In an embodiment, a computer system may take portions of provided images and divide the portions into sections. Sections may be regular or irregular. Divided sections may not necessarily be divided evenly with regard to size and/or shape. Sections may be two-dimensional or three-dimensional. A computerized method may assign a value to a section based upon a feature of that section. In an embodiment, a feature may include a color of that section. It should be noted that the term "color" may include grayscale images. A feature may include a color due to the use of enhanced MRI imaging. A color value may be used to determine a viability of that section or an adjoining section. A computer system may determine the viability of the portion of a heart by determining which sections, within the analyzed portion, are assigned a certain color value. A color value used as a standard for assessing the viability of tissue in a section may be provided by a user and/or be preprogrammed in the computer system.

Figure 39:
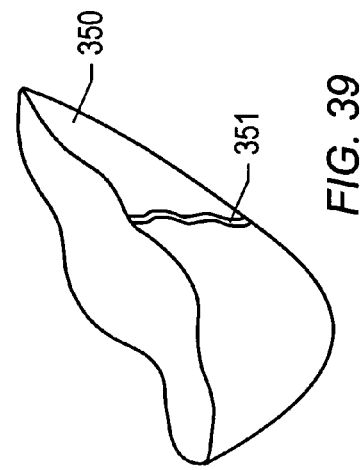
FIG. 39 depicts an embodiment of a pre-cut shape to allow a physician to identify, on a heart, a diseased tissue.
Figure 38:
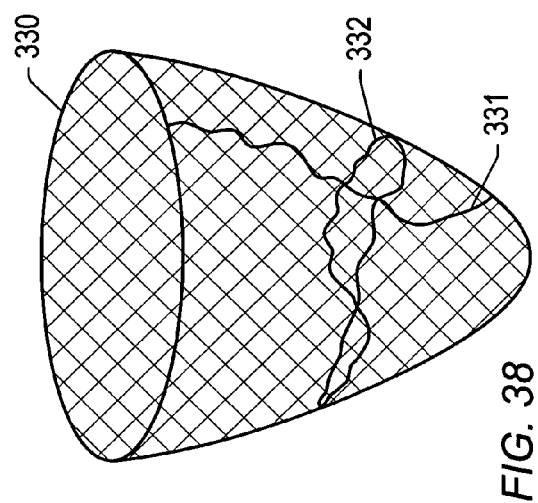
FIG. 38 depicts an embodiment of a mesh that has anatomical landmarks of a heart and a location of a diseased tissue superimposed on it.

In an embodiment, once a location of a diseased section is identified with respect to other cardiac structures, a 3D CAD file (DXF or STL files) may be generated that shows the location of the border area with respect to a known landmark on the heart. Referring to FIG. 34, a template may be created that identifies the location of the akinetic tissue. FIG. 38 depicts an embodiment of mesh structure template 330 that may be generated from a 3D CAD file with border areas 331, 332 indicated on the mesh. Mesh structure 330 may be used to assist a user in locating a diseased portion of an actual heart during a surgical procedure. FIG. 39 depicts an embodiment of an alternative template 350. A pre-cut shape is formed based on the modeling program to assist a user to identify, on a heart, a diseased tissue 351 during an actual surgical procedure.

In an embodiment, an at least three-dimensional image may be created demonstrating a diseased section. A diseased section may include "progressive coloring." Progressive coloring may assist a user in visualizing and understanding an extent of the diseased section. Progressive coloring may in general be defined as displaying an extent to which a condition exists by relating a relative extent of the condition to a relative gradient in color. For example, the greater an irregularity of a portion of heart tissue, the greater the contrast in a color of the portion is relative to another portion of heart tissue in an image. Color may include grayscale as well. A template may be created that matches the diseased area. The template may include anatomical landmarks from the heart such as left anterior descending artery or the atrial ventricular groove. The anatomical landmarks may help to align the template to the diseased area. In certain embodiments, the template may be in a form of a balloon that is patient specific with the same shape and/or size as the interior of the ventricle. The template may include a border zone marked on the template. The template may be like a glove that fits on the outside of the heart with border zone and landmark points marked on it. Such tools may be very helpful in order to execute an SVR procedure with greater precision.

In an embodiment, a method to assess the diseased area of the ventricle includes measuring the motion of the endocardium towards a centerline of the ventricle. This "centerline method" determines the region of no motion by evaluation of how motion at various points of the ventricle differs from the standard motion. In the centerline method, any tissue that moves less than 2 standard deviations from a typical movement level of a normal heart may be considered diseased. This algorithm could be applied in the above-mentioned model to identify the border zone. The model may generate an image using different color gradients (e.g., progressive coloring) to depict the range of lack of motion from the standard. Color grading may give the physician a precise location for tissue to exclude and allow the physician to not exclude any viable tissue. Another advantage of progressive coloring may be that it allows a user to make a more informed decision when it comes to, for example, excluding nonviable tissue. In some cases, a user may choose not to exclude some tissue that is potentially nonviable in order to use that tissue to assist in a reconstruction of a left ventricle. A template showing the status of the myocardium stated above may be provided to the physician to use as an aid in excluding the tissue. The gradient image may be used for both idiopathic and ischemic cardiomyopathy patient assessment. In addition, percent asynergy may be assessed by dividing a number of diseased sections, as assessed by, for example, the centerline method, by a total number of sections and multiplying by one hundred.

Figure 41:
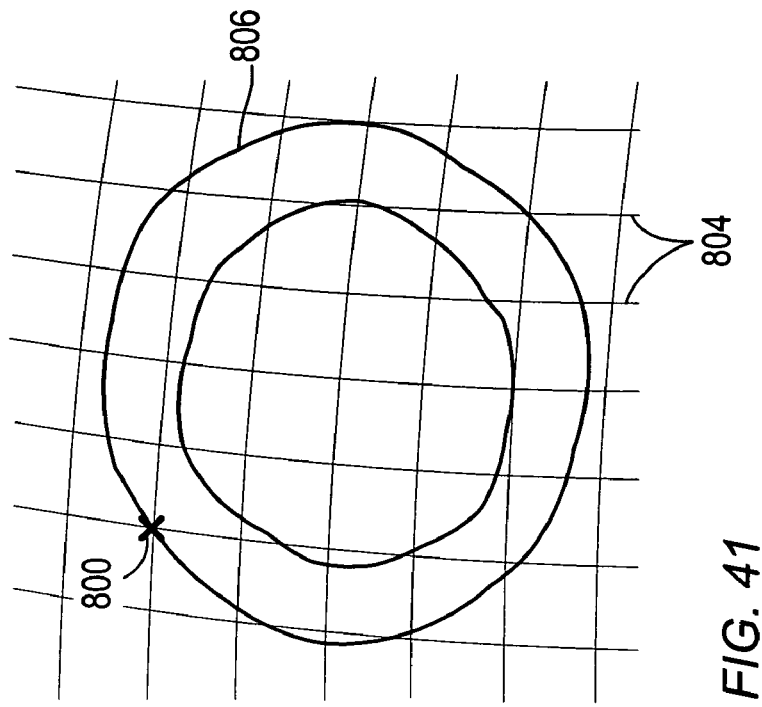
FIG. 41 depicts an embodiment of an image of a portion of a heart in a substantially contracted condition.
Figure 40:
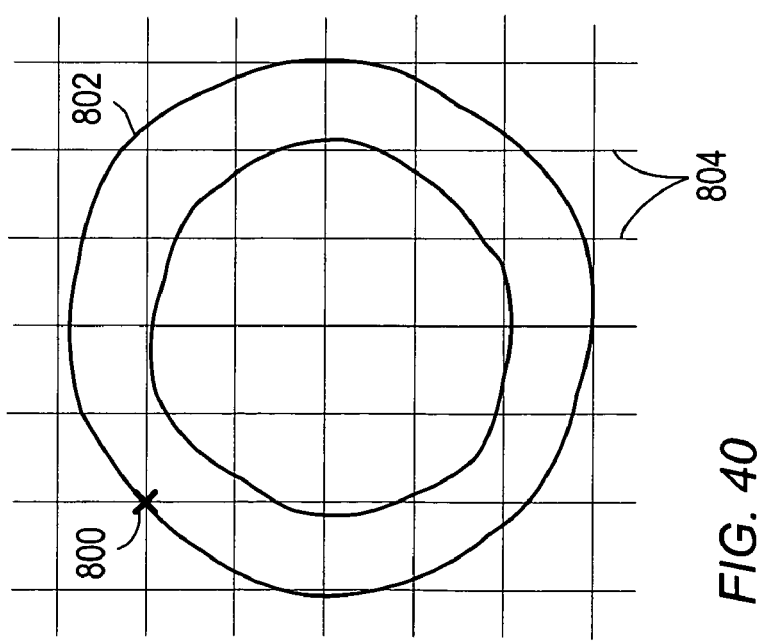
FIG. 40 depicts an embodiment of an image of a portion of a heart in a substantially expanded condition.

In some embodiments, a method to assess a viability of a portion of a heart may employ "tagging" portions of an image of a heart. Tagging may include assigning points of reference to an image of a heart. In an embodiment, point of reference 800 may be part of a larger grid 804 overlayed on image 802 (depicted in FIGS. 40 and 41). Image 802 may be provided to a computer system alone or in combination with a plurality of images. The computer system may assign points of reference 800 and/or grid 804 to a created image 802 of a heart. FIG. 40 depicts image 802 of a portion of a heart in a substantially expanded condition with grid 804 and reference point 800. FIG. 41 depicts image 806 of an equivalent portion of the heart in a substantially contracted condition with grid 804 and reference point 800. By following or tracking the movement of reference point 800 and/or the distortion of grid 804, a user may assess the activity of (e.g., viable) a particular section of a portion of a heart. The computer system may track reference points 800 and automatically calculate the movement distance of the points. The computer system may assess the viability of human heart tissue using movement data. In an embodiment, a computer system may create a multi-dimensional image of the assessed motion or viability of the heart. The model may include progressive coloring to display the extent of damage of the heart.

In an embodiment, a method to assess a shape of a portion of a heart may be employed. Shape analysis is an important feature of a heart for assessing a condition of a heart before and/or after a cardiac intervention. Shape of a heart and/or portion of a heart may be assessed, in one embodiment, by employing a similar method as described for assessing a motion of a portion of a heart. For example, a computer-automated version of the "centerline method" may be used to assess a shape of a heart. An image of a heart may be created by a computer system from at least one of a plurality of images. A portion of the image may be divided into sections. Curvature of one or more sections may be assessed by the computer system. A computer system may sum the curvatures of all or a portion of the sections to assess a shape of a portion of a heart. In an embodiment, an image of the assessed shape may be created using a computer system. The image may be at least two-dimensional and may be three or four-dimensional.

Figure 42:
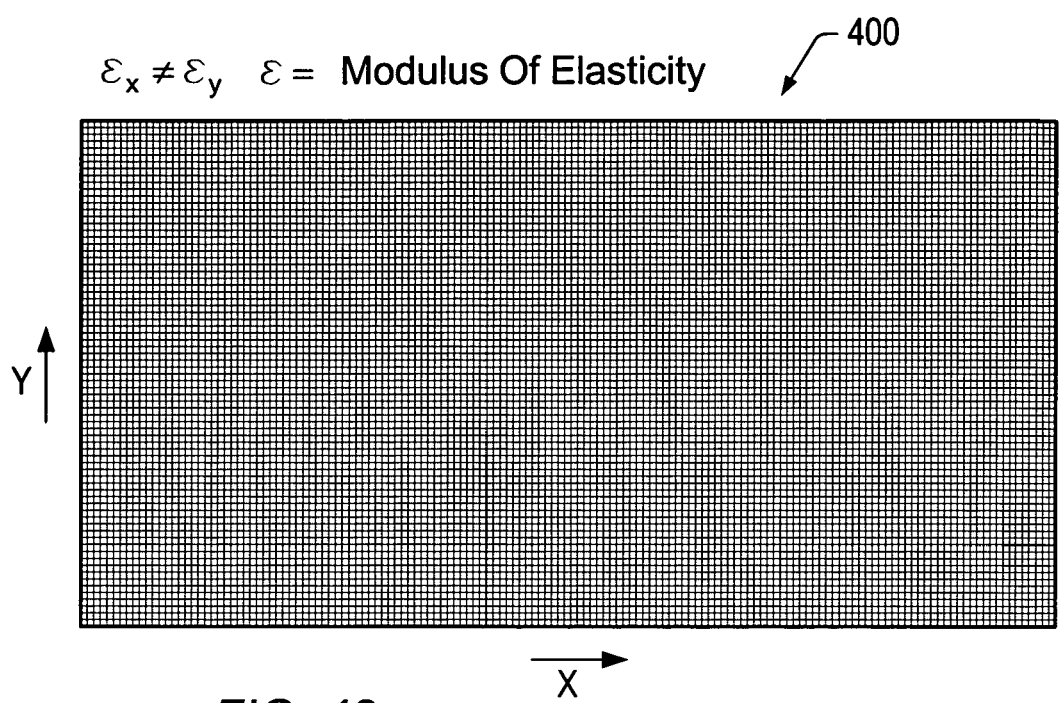
FIG. 42 depicts an embodiment of a patch with fibers that have strength in one axis different from a strength in another axis.

In an embodiment, when tissue is excluded as described herein, there may be a hole left in the ventricle that a surgeon will fill. One device that might fill or cover the hole is a patch that could aid in the contraction of the left ventricle. One form of a patch may be made of a fabric that is pretensioned and stretched to fill a hole left in a ventricle. The pretensioning places stress on the fibers, that assist the ventricle in contraction when going back to the relaxed state during systole. In some embodiments, short axis fibers are of a different strength than long axis fibers. Different strength fibers in the short and long axes may provide greater contraction along the short axis, as shown in FIG. 42. FIG. 42 depicts an embodiment of a patch 400 with fibers that have strength in one axis different from a strength in another axis. The patch could have pretensioned fibers only in the center of the patch, decreasing the tension exerted by the patch on the ventricle walls, while still providing some assistance to the ventricle during contraction.

Figure 43:
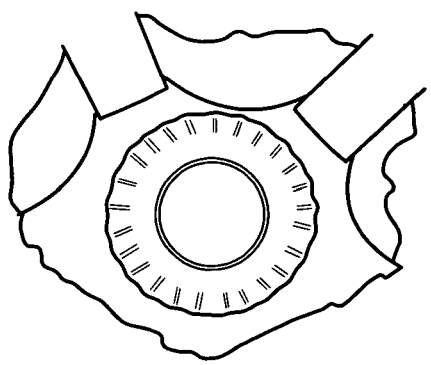
FIG. 43 depicts an embodiment of completed bypass graft.

In an embodiment, an apparatus and/or method described herein may be used to plan for bypass or stent interventions. Bypass or stent interventions may be planned by showing the location and condition of the arterial system of the heart. Imaging of the arterial system with identification of lesions and blockage has been performed using ventriculograms. This process injects a dye into the aortic root, which supplies the cardiac arterial system with blood. The dye flows through the arterial system with the blood and may be imaged with X-rays to identify where the constricted points of the arterial vessels are located. The arterial system may be mapped using the flow of dye. A finite element model may be applied to the system to determine the width of the vessels, location of constrictions, etc. The model may predict how much blood is flowing to each portion of the heart. This prediction may be correlated to displays of viable tissue so that if the patient has had a myocardial infarction and has dead tissue, the physician does not use the best graftable conduits (FIG. 43) to graft to vessels feeding these areas or place stents on these vessels. In some embodiments, the physician may choose to not graft or stent at all in these locations. A model may give the physician the opportunity to place different grafts or stents on different vessels to analyze the perfusion effect on the heart for different combinations. The grafts or stent models may come from a database of surgical equipment and devices. The model may be run to show a user the effect that grafts or stents may likely have on an entire cardiac and circulatory system so that the best combination of locations for that particular patient may be selected.

In an embodiment, an apparatus and method may also be used to show the effects that interventions performed on the left ventricle outflow tract and aortic valve (i.e., flow across the aorta (FAC)) may have on other elements or the entire heart. The outflow tract changes position as people age and an acute angle in the left ventricle outflow tract may contribute to poor performance of the ventricle and/or the aortic valve. The model may show the positioning of the left ventricle outflow tract and may show the physician turbulence or restrictions in blood flow through this area. One model for analysis of flow dynamics is available from CDFRC (Huntsville, Ala.) and published by Makhijani et al. "Three-dimensional coupled fluid—Structure simulation of pericardial bioprosthetic aortic valve function", ASAIO Journal 1997; 43:M387-M392, which is incorporated herein by reference. If desired, a physician may virtually manipulate the left ventricle outflow tract into different positions and run one or more models to see which position of the tract provides the best flow dynamics. The system may tell the user to adjust the positioning of the left ventricle outflow tract, if needed, and may show the effects that a new position will have on the performance of the heart.

Figure 44:
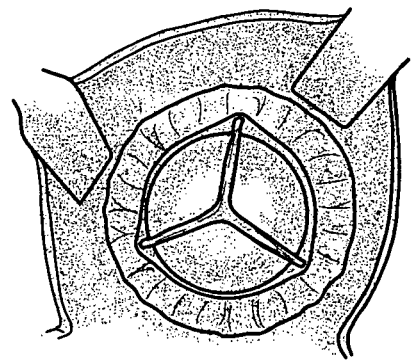
FIG. 44 depicts an embodiment of replacing an aortic valve.

In an embodiment, at least one or a plurality of images may be provided to a computer system. A velocity of a blood flow may be provided to the computer system. A time over which a valve (e.g., the aortic valve) may be open for one cycle may be provided to a computer system. A computer system may then assess the area of an open aortic valve. A computer system may use the assessed area, blood flow velocity, and time for which the valve was open to assess blood flow across a valve. Poor performance of the aortic valve may limit the amount of blood that the ventricle may eject. The model may display the aortic valve and allow a user to virtually manipulate the valve and assess if the manipulations have increased the performance of the valve and/or increased the performance of the cardiac system as a whole. A user may take the desired results and perform those manipulations on the actual valve. FIG. 44 depicts a representation of an actual replacement of an aortic valve.

In an embodiment, a method and apparatus may be used to simulate the effects of drugs on the heart and its components. A database of drugs and their effects may be developed and the physician may interact with the model by selecting a type of drug and dosage amount. A model may give the physician the results of the treatment (e.g., whether the drug has resulted in a change in the geometry of the heart and its components and/or if the performance of the heart has improved). For example, the model may simulate the effects of vasodilators that diminish the afterload of the heart. In some embodiments, the effect of norepinephrine, which increases the contractility of the heart, may be assessed using the model. In an embodiment, a user may adjust the parameters of a particular drug already stored in the database. For example, a user may choose to adjust the percent of a particular chemical making up a particular chemical composition. In certain embodiments, it may be possible for a user to input parameters into a database for a new pharmaceutical composition. A user may compare known data about the new composition to data for compositions currently in the database, allowing the user to enter reasonably accurate parameters for a pharmaceutical composition not in the database.

In an embodiment, a method and apparatus may be used to simulate the placement of mechanical devices in or on the heart to determine the benefits of the devices. The physical and functional characteristics of these devices may be determined through testing and reduced to a finite element model. These finite element models may be placed in a database. The physician may interact with the model by choosing the device by its common name or product name (e.g., Myosplint or Corecap). The physician may direct placement of a device by methods described above (e.g., methods for specifying location, attachment means etc.). Left ventricular assist devices may also be added to the database. All these mechanical devices may be simulated to show their effects on the whole heart and its components. These effects may be compared to other less invasive treatments to determine if the increased invasiveness and cost of these devices is warranted by any increase in the heart's performance.

In an embodiment, a method and apparatus may be used to assess results or effects other than structural effects resulting from proposed procedures and/or treatments. One example may be assessing effects of procedures and/or treatments on an electrical system of a heart. The method may assess an electrical effect, for example, of reconstructing a left ventricle of a human heart. For example, the method may determine if arrhythmia results from a reconstruction of a particular patient's heart. In an embodiment, an electrical result from a modification of a feature of a heart may be assessed by comparing the modification to a database containing similar procedures. A computer system may create an image of assessed electrical effects from a proposed procedure.

In an embodiment, mitral regurgitation may be assessed using an imaging method and/or system described herein. One image or a plurality of images may be provided to a computer system. A computer system may use at least some of the images to assess mitral regurgitation for a human heart. A system may use images to generate an end diastolic volume (EDV), an end systolic volume (ESV), and a FAC (i.e., flow across the aorta). A value for a mitral regurgitation may be assessed from this data using EQN. 1:

$$\text{Mitral Regurgitation} = (EDV - ESV) - FAC \qquad (1).$$

Methods of assessing EDV, ESV, and/or FAC are disclosed herein. The computer system may be provided two or more images. The computer system may assess an area of an interior chamber of the heart when a provided image of the heart depicts the chamber in a substantially expanded condition (i.e., EDV). The computer system may assess an area of an interior chamber of the heart when a provided image of the heart depicts the chamber in a substantially contracted condition (i.e., ESV). FAC may be assessed by providing at least one or a plurality of images to a computer system. In certain embodiments, a velocity of a blood flow may be provided to the computer system. A time over which a valve may be open for one cycle may be provided to a computer system. A computer system may assess the area of an open aortic valve. A computer system may use the assessed area, blood flow velocity, and time for which the valve was open to assess blood flow across a valve. Mitral regurgitation may be used by a user or a computer system to assess a condition of a heart before or after a procedure.

In an embodiment, the user may design procedures and/or treatments using mitral regurgitation as a standard for a computer system to assess a proposed procedure or treatment. The user may enter data for a diseased heart as well as set a desired mitral regurgitation to a value that the user wishes a proposed procedure to achieve. The computer system, using the patient specific model, may modify one or more features of a heart during a virtual procedure. The computer system may repeatedly modify one or more features until the assessed effect of the procedure achieves the mitral regurgitation value desired by the user.

In an embodiment, an ejection fraction may be assessed using parts of the system and method described herein. An ejection fraction is a useful parameter for a computer system and/or a user to assess a condition of a heart. It is therefore a useful value to assess viability of using the methods described herein. Ejection fraction (EF) is typically calculated by EQN. 2:

$$EF = (100) \times [(EDV - ESV)/(EDV)]. \qquad (2)$$

EQN. 2 calculates EF as a percentage from EDV and ESV. Therefore, using the methods and/or systems described herein for assessing EDV and ESV, a computer system may then calculate percent EF.

In an embodiment, a computer system may be provided a plurality of images of human heart tissue. At least a three-dimensional image of the heart may be created by the computer system from the plurality of images. Features of the heart may be derived directly from the images. In some embodiments, features of the heart may be extrapolated from the images. Extrapolated features may used by the computer system to fill in missing data not found directly in provided images. Features may be identified by the computer system by comparing varying contrasts of portions of the provided images. An image of the assessed ejection fraction percentage may be created by the computer system. In one embodiment, a four-dimensional image representing the ejection fraction percentage of the heart may be created. The four-dimensional image may display the heart going through an entire cardiac cycle, from systolic to diastolic.

In an embodiment, a user may design procedures and/or treatments using an ejection fraction as a standard for a computer system to assess a proposed procedure or treatment. The user may enter data for a diseased heart as well as set a desired ejection fraction percentage for a proposed procedure to achieve. The computer system, using the patient specific model, may modify one or more features of a heart during a virtual procedure. The computer system may repeatedly modify one or more features until the assessed effect of the procedure includes the desired ejection fraction percentage.

In an embodiment, a model may be accessed at a central location and the images of pre- and post-treatment images may be stored and categorized by disease type, surgical procedure, outcome, etc. at the central location. A database may be used in performing retrospective studies on the efficacy of different procedures and approaches for different disease states and/or patients. A database and analysis may contribute to the advancement and refinement of models and help improve their viability. A database may be used to analyze treatments to compare and empirically demonstrate which are the better treatments for certain patients. A database may allow users to compare results with the database population. A user may see if his selection of and performance of treatment options are better, equal to, or worse than a group as a whole. If he is worse than the group, the surgeon may use a database to help improve his treatment selection process and/or his technique. In an embodiment, a database may include data and/or parameters based on "expert opinion." Expert opinion may include data (e.g., parameters and features) extrapolated and/or derived from personal knowledge and/or experience of specialists within a particular field. The database may be constantly updated and refined as needed or desired.

In response to these and other problems, an improved apparatus and method is provided for capturing the geometry of a heart and its components using imaging technologies such as, but not limited to, MRI imaging, echocardiography, or PET. Using imaging information, along with other factors, may be used to create a multi-dimensional finite element computer model of a heart. A model may display not only the three dimensions of the geometry of the heart but may also depict the geometry as it changes over time. A model may run on a personal computer, may run at a central location or the model may be processed at one location and delivered to another location to be run. A multi dimensional model may allow a user to visually inspect the status of all the elements of the heart. A method and system may be used to determine a variety of information, either pre-treatment, during the treatment, or post-treatment, including, but not limited to:

a. The areas of the mitral apparatus, aortic, tricuspid or pulmonary valves that may need to be repaired or replaced and what affect each repair may have on the other components;

b. What vessels are blocked and may need to be grafted, where to graft, and what affect the revascularized muscle may have on the other components;

c. What areas of the ventricle are akinetic, dyskinetic, or hibernating, to show what areas may be excluded during ventricular restoration and what effect the exclusion may have on the other components and aspects of the ventricle and heart;

d. How this patient's heart may respond to medication treatment;

e. The effects of placement of an Acorn, Myocor, or other device on the outside of the ventricle and how such placement may affect the heart;

f. The effects of chordae length adjustment or papillary base relocation and how such changes may affect the heart;

g. The effects of placement of any ventricular assist device and the affect such devices may have on the heart;

h. What vessels are blocked and may need to be stented, where to stent, and what affect the revascularized muscle may have on the other components of the heart;

i. A volume of a portion of a heart including, but not limited to, an interior chamber of a heart (e.g., end diastolic volume or end systolic volume);

j. An ejection fraction of a heart;

k. Percentage and position of viable and nonviable human heart tissue;

l. An assessment of motion of a portion of a heart (assessed motion may allow a system or user to assess a viability of human heart tissue);

m. A degree of transmurality of scar tissue in a heart (the method may also assess a wall thickness of a heart);

n. Distance and angle between papillary muscles, which may assist in assessing a condition of a mitral valve in a heart;

o. A shape of a heart;

p. Results of virtual plication procedures may be assessed to find an optimal procedure; and q. Cardiac electrical activity may be assessed after a virtual procedure has been carried out.

A method and/or apparatus may allow a physician to select a treatment option and allow the physician to manipulate the image and model. A model may analyze what effects the virtual treatment likely has on the cardiac system and display the potential clinical outcomes to a user. The potential outcomes displayed may be, but are not limited to, the following:

a. An estimated performance of the valves and ventricle after the procedure (e.g., regurgitation, reduced flow across the valves, ejection fraction, etc.);

b. A volume and contractile state of the ventricle after excluding tissue;

c. A positioning and performance of the valve apparatuses after reconstruction of the ventricle;

d. A diagnosis of possible diseases and/or irregularities associated with a portion of a heart modeled;

e. Treatment suggestions for an irregularity or disease; and f. Outcomes for proposed cardiac surgery procedures.

The physician may select a displayed intervention. In some embodiments, the physician may choose to try another treatment. In certain embodiments, the physician may choose to modify the current intervention and the cycle may repeat itself. When the physician accepts the potential clinical outcomes, the model may produce specifications for the intervention. The specifications may lead to the development of templates, tools, and/or devices to guide the physician in translating the virtual intervention on the model to the actual intervention on the heart. In some embodiments, no template, tools, or devices may be needed to perform an interventions. For example, the specification for some surgical procedures (e.g., altering the length of a chordae tendinae) may be sufficient output from the model to allow the physician to perform the intervention. In some embodiments, devices may be generated from the models to help the physician implement the procedure that the model may have predicted to provide the desired outcome. Furthermore, the use of some or all of above listed factors may be used to evaluate the post-treatment condition of the patient. A database of surgical pathologies, treatments, and outcomes may be gathered, maintained, and analyzed to further refine the treatment of cardiac diseases and disorders.

In an embodiment, a database may assist in determining, before the treatment, what likely effects the treatment may have on one or more elements of the heart. The database may help to optimize the treatment of each component relative to other components in order to achieve the desired performance of the entire cardiac and/or circulatory system. The method and apparatus may allow the physician to simulate numerous interventions and allow him to compare the different simulations so that he may perform the option that provides the desired outcome. Some of these interventions include, but are not limited to, placement of a Myosplint (Myocor Inc., Maple Groove, Minn.), placement of Corcap restraining device (Acorn cardiovascular Inc, St. Paul, Minn.), valve replacement (St. Jude Medical, St. Paul, Minn.), annuloplasty (Edward Lifesciences, Irvine, Calif.), surgical ventricular restoration (Chase Medical, Richardson, Tex.) stent placement (Medtronic, Minneapolis, Minn.), valve repair (Edward Lifesciences, Irvine, Calif.), bypass grafting, pacing, Biventricular pacing (Medtronic, Minneapolis, Minn.), and ventricle assist device (Abiomed, Danvers, Mass.). Surgical Ventricular Restoration (SVR) may be improved by providing a method and apparatus where a physician may take an image of a patient's heart or ventricle and create an interactive multi-dimensional model with features. The physician may manipulate the model by deleting, adding, or rearranging features to simulate the SVR procedure. The model may integrate all the manipulations relative to each other and interact with other models such as, but not limited to, physiological and hemodynamic models. The interactive multidimensional model may recreate the patient's heart or ventricle based on the manipulations conducted by the physician. The model may depict the new ventricle or heart and display cardiac performance characteristics and parameters. The physician may perform this simulation numerous times and compare the performance characteristics and select the optimal or desired procedure. The model may produce specifications for the selected procedure from which templates or tools may be created to aid the physician in translating the virtual procedure to the real procedure.

In this patent, certain U.S. patents, U.S. patent applications, and/or other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to assess treatments for disease of a human heart, comprising:
   a CPU; and
   a system memory coupled to the CPU, wherein the system memory stores one or more computer programs executable by the CPU;
   wherein one or more computer programs are executable to:
      perform a first modification of at least one feature of one or more first images of heart tissue;
      perform at least one second modification of at least one of the features, wherein the second modification is performed independent of the first modification;
      compare at least one effect of the first modification to at least one effect of the second modification, or compare at least one effect of the second modification to at least one effect of the first modification;
      determine at least a first and second volume of a portion of the heart tissue and blood flow through a portion of the heart; and
      assess a mitral regurgitation with a provided velocity of a fluid through at least a portion of the aorta.

2. A computer-readable medium configured to store program instructions, wherein the program instructions are executable to implement a method to assess treatments for a human heart, comprising:
   performing a first modification of at least one feature of one or more first images of heart tissue;
   performing at least one second modification of at least one of the features, wherein the second modification is performed independent of the first modification;
   comparing at least one effect of the first modification to at least one effect of the second modification, or comparing at least one effect of the second modification to at least one effect of the first modification;
   determining at least a first and second volume of a portion of the heart tissue and blood flow through a portion of the heart; and
   assessing a mitral regurgitation with a provided velocity of a fluid through at least a portion of the aorta.

3. The system of claim 1, wherein the first and at least second modifications of at least one feature are compared automatically by at least one of the computer programs based on at least some user input.

4. The system of claim 1, wherein at least one of the features comprises an image.

5. The system of claim 1, wherein at least one of the features comprises at least a portion of an image.

6. The system of claim 1, wherein at least one of the features comprises a numerical feature.

7. The system of claim 1, wherein at least one of the features comprises a numerical feature derived at least in part from at least a portion of a first image.

8. The system of claim 1, wherein the first and at least second modifications of at least one feature are compared automatically by at least one of the computer programs by comparing the first and at least second modifications of at least one feature to a database.

9. The system of claim 8, wherein the database comprises data derived from expert opinion.

10. The system of claim 8, wherein one or more computer programs are further executable to divide at least one first image into a plurality of sections.

11. The system of claim 8, wherein the database comprises clinical data.

12. The system of claim 11, wherein the clinical data comprises data derived from surgical procedures.

13. The system of claim 1, wherein one or more computer programs are further executable to extrapolate at least one portion of at least one feature from at least two first images of human heart tissue.

14. The system of claim 1, wherein one or more computer programs are further executable to:
   use at least two first images of human heart tissue to create at least a second image of human heart tissue, wherein at least a portion of the second image appears at least three-dimensional.

15. The system of claim 1, wherein one or more computer programs are further executable to:
   use at least some of a plurality of first images of human heart tissue to create at least a second image of human heart tissue, wherein at least a portion of the second image appears at least four-dimensional.

16. The system of claim 15, wherein one of the dimensions comprises time.

17. The system of claim 15, wherein at least one of the dimensions comprises at least one physiological factor.

18. The system of claim 17, wherein at least one physiological factor comprises hormone B-type natriuretic peptide.

19. The system of claim 1, wherein one or more computer programs are further executable to create at least one image of the assessed condition of the heart.

20. The system of claim 19, wherein at least one image of the assessed condition comprises at least a portion appearing three-dimensional.

21. The system of claim 19, wherein at least one image of the assessed condition of the heart comprises progressive coloring.

22. The system of claim 21, wherein progressive coloring comprises grayscale.

23. The system of claim 1, wherein at least one of the computer programs is further executable to assess a volume of at least a portion of the heart tissue.

24. The system of claim 1, wherein at least one of the computer programs is further executable to:
compare a contrast between two or more sections in at least one first image; and
assess a viability of the heart tissue.

25. The system of claim 1, wherein at least one of the computer programs is further executable to:
evaluate motion of at least one portion of at least one feature of one or more first images of heart tissue; and
assess asynergy of the heart tissue.

26. The system of claim 1, wherein at least one of the computer programs is further executable to:
evaluate a curvature of at least a section of a portion of a heart comprising the heart tissue; and
assess a shape of at least the portion of the heart.

27. The system of claim 1, wherein at least one of the computer programs is further executable to:
assign at least one reference point to at least two first images of the heart tissue;
evaluate a relative movement of at least one of the reference points between at least two first images of the heart tissue; and
assess a viability of the heart tissue.

28. The computer-readable medium of claim 2, wherein the first and at least second modifications of at least one feature are compared automatically by at least by at least some of the program instructions based on at least some user input.

29. The computer-readable medium of claim 2, wherein at least one of the features comprises an image.

30. The computer-readable medium of claim 2, wherein at least one of the features comprises at least a portion of an image.

31. The computer-readable medium of claim 2, wherein at least one of the features comprises a numerical feature.

32. The computer-readable medium of claim 2, wherein at least one of the features comprises a numerical feature derived at least in part from at least a portion of a first image.

33. The computer-readable medium of claim 2, wherein the first and at least second modifications of at least one feature are compared automatically by at least some of the program instructions by comparing the first and at least second modifications of at least one feature to a database.

34. The computer-readable medium of claim 33, wherein the database comprises data derived from expert opinion.

35. The computer-readable medium of claim 33, wherein the program instructions are further executable to divide at least one first image into a plurality of sections.

36. The computer-readable medium of claim 33, wherein the database comprises clinical data.

37. The computer-readable medium of claim 36, wherein the clinical data comprises data derived from surgical procedures.

38. The computer-readable medium of claim 2, wherein the program instructions are further executable to implement a method comprising:
extrapolating at least one portion of at least one feature from at least two first images of human heart tissue.

39. The computer-readable medium of claim 2, wherein the program instructions are further executable to implement a method comprising:
using at least two first images of human heart tissue to create at least a second image of human heart tissue, wherein at least a portion of the second image appears at least three-dimensional.

40. The computer-readable medium of claim 2, wherein the program instructions are further executable to implement a method comprising:
using at least some of a plurality of first images of human heart tissue to create at least a second image of human heart tissue, wherein at least a portion of the second image appears at least four-dimensional.

41. The computer-readable medium of claim 40, wherein one of the dimensions comprises time.

42. The computer-readable medium of claim 40, wherein at least one of the dimensions comprises at least one physiological factor.

43. The computer-readable medium of claim 42, wherein at least one physiological factor comprises hormone B-type natriuretic peptide.

44. The computer-readable medium of claim 2, wherein the program instructions are further executable to implement a method comprising:
creating at least one image of the assessed condition of the heart.

45. The computer-readable medium of claim 44, wherein at least one image of the assessed condition comprises at least a portion appearing three-dimensional.

46. The computer-readable medium of claim 44, wherein at least one image of the assessed condition of the heart comprises progressive coloring.

47. The computer-readable medium of claim 46, wherein progressive coloring comprises grayscale.

48. The computer-readable medium of claim 2, wherein the program instructions are further executable to implement:
assessing a volume of at least a portion of the heart tissue.

49. The computer-readable medium of claim 2, wherein the program instructions are further executable to implement:
comparing a contrast between two or more sections in at least one first image; and
assessing a viability of the heart tissue.

50. The computer-readable medium of claim 2, wherein the program instructions are further executable to implement:
evaluating motion of at least one portion of at least one feature of one or more first images of heart tissue; and
assessing asynergy of the heart tissue.

51. The computer-readable medium of claim 2, wherein the program instructions are further executable to implement:
evaluating a curvature of at least a section of a portion of a heart comprising the heart tissue; and
assessing a shape of at least the portion of the heart.

52. The computer-readable medium of claim 2, wherein the program instructions are further executable to implement:
   assigning at least one reference point to at least two first images of the heart tissue;
   evaluating a relative movement of at least one of the reference points between at least two first images of the heart tissue; and
   assessing a viability of the heart tissue.

53. A system configured to assess treatments for disease of a human heart, comprising:
   a CPU; and
   a system memory coupled to the CPU, wherein the system memory stores one or more computer programs executable by the CPU;
   wherein one or more computer programs are executable to:
      perform a modification of at least one feature of one or more first images of heart tissue;
      compare the modification to at least one reference modification in a database to assess an effect of the modification:
      determine at least a first and second volume of a portion of the heart tissue and blood flow through a portion of the heart; and
      assess a mitral regurgitation with a provided velocity of a fluid through at least a portion of the aorta.

54. The system of claim 53, wherein the modification of at least one feature are compared automatically to a reference modification by at least one of the computer programs based on at least some user input.

55. The system of claim 54, wherein one or more computer programs are further executable to divide at least one first image into a plurality of sections.

56. The system of claim 53, wherein at least one of the features comprises an image.

57. The system of claim 53, wherein at least one of the features comprises at least a portion of an image.

58. The system of claim 53, wherein at least one of the features comprises a numerical feature.

59. The system of claim 53, wherein at least one of the features comprises a numerical feature derived at least in part from at least a portion of a first image.

60. The system of claim 53, wherein the database comprises data derived from expert opinion.

61. The system of claim 53, wherein the database comprises-clinical data.

62. The system of claim 61, wherein the clinical data comprises data derived from surgical procedures.

63. The system of claim 53, wherein one or more computer programs are further executable to extrapolate at least one portion of at least one feature from at least two first images of human heart tissue.

64. The system of claim 53, wherein one or more computer programs are further executable to:
   use at least two first images of human heart tissue to create at least a second image of human heart tissue, wherein at least a portion of the second image appears at least three-dimensional.

65. The system of claim 53, wherein one or more computer programs are further executable to:
   use at least some of a plurality of first images of human heart tissue to create at least a second image of human heart tissue, wherein at least a portion of the second image appears at least four-dimensional.

66. The system of claim 65, wherein one of the dimensions comprises time.

67. The system of claim 65, wherein at least one of the dimensions comprises at least one physiological factor.

68. The system of claim 67, wherein at least one physiological factor comprises hormone B-type natriuretic peptide.

69. The system of claim 53, wherein one or more computer programs are further executable to create at least one image of the assessed condition of the heart.

70. The system of claim 69, wherein at least one image of the assessed condition comprises at least a portion appearing three-dimensional.

71. The system of claim 69, wherein at least one image of the assessed condition of the heart comprises progressive coloring.

72. The system of claim 71, wherein progressive coloring comprises grayscale.

73. The system of claim 53, wherein at least one of the computer programs is further executable to assess a volume of at least a portion of the heart tissue.

74. The system of claim 53, wherein at least one of the computer programs is further executable to:
   compare a contrast between two or more sections in at least one first image; and
   assess a viability of the heart tissue.

75. The system of claim 53, wherein at least one of the computer programs is further executable to:
   evaluate motion of at least one portion of at least one feature of one or more first images of heart tissue; and
   assess asynergy of the heart tissue.

76. The system of claim 53, wherein at least one of the computer programs is further executable to:
   evaluate a curvature of at least a section of a portion of a heart comprising the heart tissue; and
   assess a shape of at least the portion of the heart.

77. The system of claim 53, wherein at least one of the computer programs is further executable to:
   assign at least one reference point to at least two first images of the heart tissue;
   evaluate a relative movement of at least one of the reference points between at least two first images of the heart tissue; and
   assess a viability of the heart tissue.

78. A computer-readable medium configured to store program instructions, wherein the program instructions are executable to implement a method to assess treatments for a human heart, comprising:
   performing a modification of at least one feature of one or more first images of heart tissue;
   comparing the modification to one or more reference modifications in a database to assess at least one effect of the modification;
   determining at least a first and second volume of a portion of the heart tissue and blood flow through a portion of the heart; and
   assessing a mitral regurgitation with a provided velocity of a fluid through at least a portion of the aorta.

79. The computer-readable medium of claim 78, wherein the modification of at least one feature is compared automatically to a reference modification by the program instructions based on at least some user input.

80. The computer-readable medium of claim 79, wherein the program instructions are further executable to divide at least one first image into a plurality of sections.

81. The computer-readable medium of claim 78, wherein at least one of the features comprises an image.

82. The computer-readable medium of claim 78, wherein at least one of the features comprises at least a portion of an image.

83. The computer-readable medium of claim 78, wherein at least one of the features comprises a numerical feature.

84. The computer-readable medium of claim 78, wherein at least one of the features comprises a numerical feature derived at least in part from at least a portion of a first image.

85. The computer-readable medium of claim 78, wherein the database comprises data derived from expert opinion.

86. The computer-readable medium of claim 78, wherein the database comprises clinical data.

87. The computer-readable medium of claim 86, wherein the clinical data comprises data derived from surgical procedures.

88. The computer-readable medium of claim 78, wherein the program instructions are further executable to implement a method comprising:
extrapolating at least one portion of at least one feature from at least two first images of human heart tissue.

89. The computer-readable medium of claim 78, wherein the program instructions are further executable to implement a method comprising:
using at least two first images of human heart tissue to create at least a second image of human heart tissue, wherein at least a portion of the second image appears at least three-dimensional.

90. The computer-readable medium of claim 78, wherein the program instructions are further executable to implement a method comprising:
using at least some of a plurality of first images of human heart tissue to create at least a second image of human heart tissue, wherein at least a portion of the second image appears at least four-dimensional.

91. The computer-readable medium of claim 90, wherein one of the dimensions comprises time.

92. The computer-readable medium of claim 90, wherein at least one of the dimensions comprises at least one physiological factor.

93. The computer-readable medium of claim 92, wherein at least one physiological factor comprises hormone B-type natriuretic peptide.

94. The computer-readable medium of claim 78, wherein the program instructions are further executable to implement a method comprising:
creating at least one image of the assessed condition of the heart.

95. The computer-readable medium of claim 94, wherein at least one image of the assessed condition comprises at least a portion appearing three-dimensional.

96. The computer-readable medium of claim 94, wherein at least one image of the assessed condition of the heart comprises progressive coloring.

97. The computer-readable medium of claim 96, wherein progressive coloring comprises grayscale.

98. The computer-readable medium of claim 78, wherein the program instructions are further executable to implement:
assessing a volume of at least a portion of the heart tissue.

99. The computer-readable medium of claim 78, wherein the program instructions are further executable to implement:
comparing a contrast between two or more sections in at least one first image; and
assessing a viability of the heart tissue.

100. The computer-readable medium of claim 78, wherein the program instructions are further executable to implement:
evaluating motion of at least one portion of at least one feature of one or more first images of heart tissue; and
assessing asynergy of the heart tissue.

101. The computer-readable medium of claim 78, wherein the program instructions are further executable to implement:
evaluating a curvature of at least a section of a portion of a heart comprising the heart tissue; and
assessing a shape of at least the portion of the heart.

102. The computer-readable medium of claim 78, wherein the program instructions are further executable to implement:
assigning at least one reference point to at least two first images of the heart tissue;
evaluating a relative movement of at least one of the reference points between at least two first images of the heart tissue; and
assessing a viability of the heart tissue.

* * * * *